(12) United States Patent
Sato

(10) Patent No.: US 10,432,035 B2
(45) Date of Patent: *Oct. 1, 2019

(54) WIRELESS COMMUNICATION DEVICE, METHOD FOR CONTROLLING WIRELESS COMMUNICATION DEVICE, GAME SYSTEM, AND MEMORY SYSTEM

(71) Applicant: TOSHIBA MEMORY CORPORATION, Tokyo (JP)

(72) Inventor: Keisuke Sato, Yokohama (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,587

(22) Filed: Sep. 18, 2018

(65) Prior Publication Data

US 2019/0018616 A1   Jan. 17, 2019

Related U.S. Application Data

(63) Continuation of application No. 15/138,827, filed on Apr. 26, 2016, now Pat. No. 10,146,476.

(30) Foreign Application Priority Data

Apr. 28, 2015 (JP) ................. 2015-092407
Jun. 3, 2015 (JP) ................. 2015-113538

(51) Int. Cl.
*H02J 50/20* (2016.01)
*H04B 5/00* (2006.01)

(52) U.S. Cl.
CPC ............ *H02J 50/20* (2016.02); *H04B 5/0037* (2013.01)

(58) Field of Classification Search
CPC ...... G06F 3/0659; G06F 3/061; G06F 3/0688; H02J 50/20; H04B 5/0037
See application file for complete search history.

(56) References Cited

U.S. PATENT DOCUMENTS 7,757,958 B2   7/2010 Ito
7,769,867 B2   8/2010 Fukada
(Continued)

FOREIGN PATENT DOCUMENTS

JP       4-323980     11/1992
JP    2004-356902    12/2004
(Continued)

*Primary Examiner* — Ann J Lo
*Assistant Examiner* — Jane Wei
(74) *Attorney, Agent, or Firm* — Oblon, McClelland, Maier & Neustadt, L.L.P.

(57) ABSTRACT

According to one embodiment, a wireless communication device includes a first interface, a first memory, a wireless antenna, a second memory and a second interface. The first interface is capable to electrically connect to a first host device. The first interface communicates with the first host device in accordance with an SD interface. The first memory includes a nonvolatile memory which operates based on power supplied through the first interface from the first host device. The wireless antenna generates power based on a radio wave from a second host device. The second memory is capable to operate based on power generated by the wireless antenna. The second memory has a memory capacity lower than the first memory. The second interface is capable to operate based on power generated by the wireless antenna. The second interface is connected to the second memory and the first interface.

6 Claims, 44 Drawing Sheets

(56) References Cited

U.S. PATENT DOCUMENTS

| | | |
|---|---|---|
| 8,731,583 B2 | 5/2014 | Wengrovitz |
| 8,990,482 B2 | 3/2015 | Ito et al. |
| 2004/0236899 A1 | 11/2004 | Teicher |
| 2008/0268938 A1 | 10/2008 | Doutriaux |
| 2010/0167648 A1 | 7/2010 | Doutriaux |
| 2010/0169548 A1* | 7/2010 | Kanda .................. G06K 17/00 711/103 |
| 2012/0210046 A1 | 8/2012 | Ito et al. |
| 2015/0199546 A1* | 7/2015 | Sato .................. G06K 7/10316 340/10.51 |
| 2015/0244422 A1* | 8/2015 | Ohashi ................ H04B 5/0031 455/41.1 |
| 2015/0254547 A1* | 9/2015 | Sato ................ G06K 19/07732 235/492 |

FOREIGN PATENT DOCUMENTS

| | | |
|---|---|---|
| JP | 2006-507608 A | 3/2006 |
| JP | 2007-501474 A | 1/2007 |
| JP | 2009-77277 | 4/2009 |
| JP | 2010-525472 A | 7/2010 |
| JP | 2012-168866 A | 9/2012 |
| JP | 2013-218498 A | 10/2013 |
| JP | 2014-211887 A | 11/2014 |

* cited by examiner

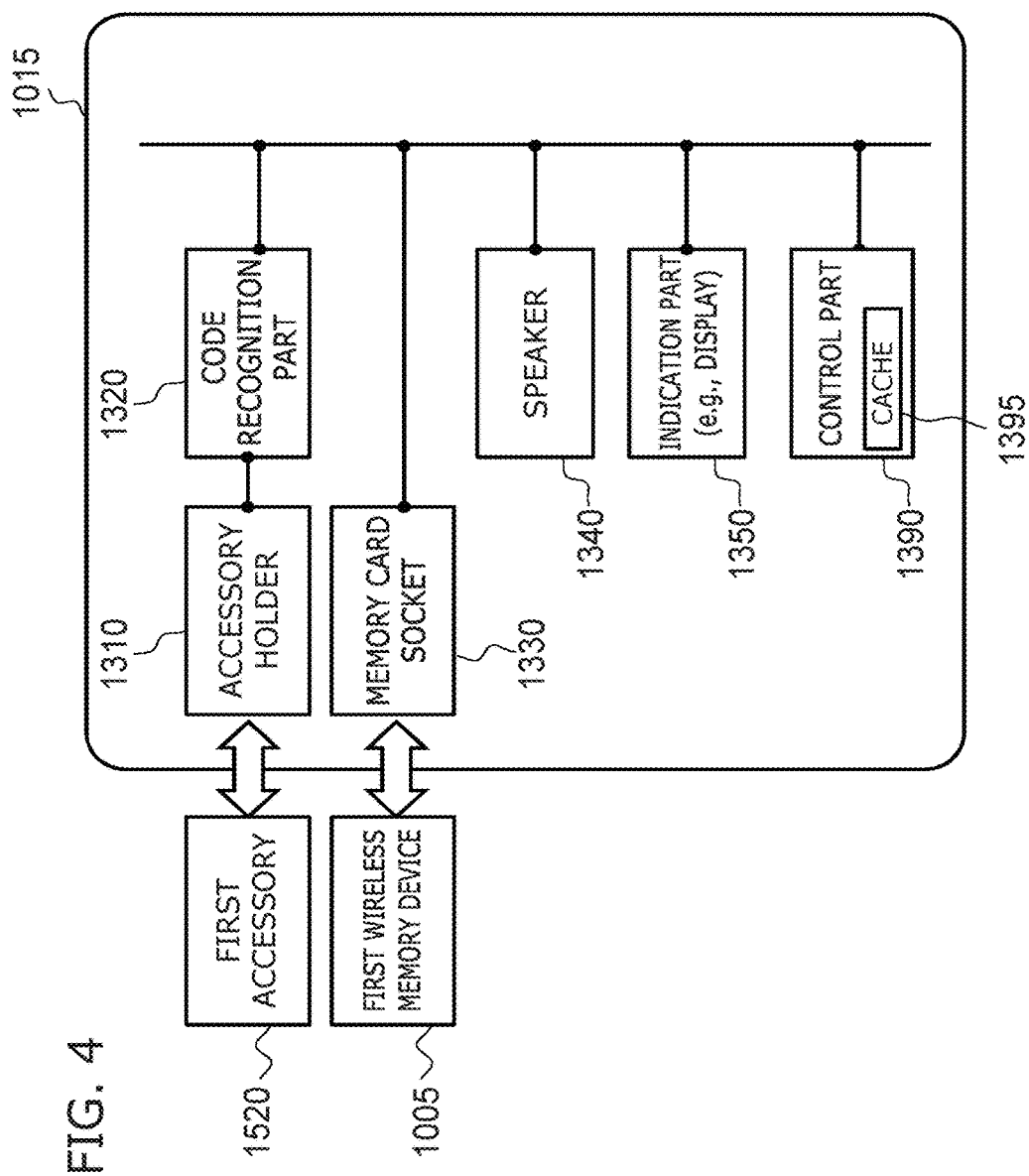

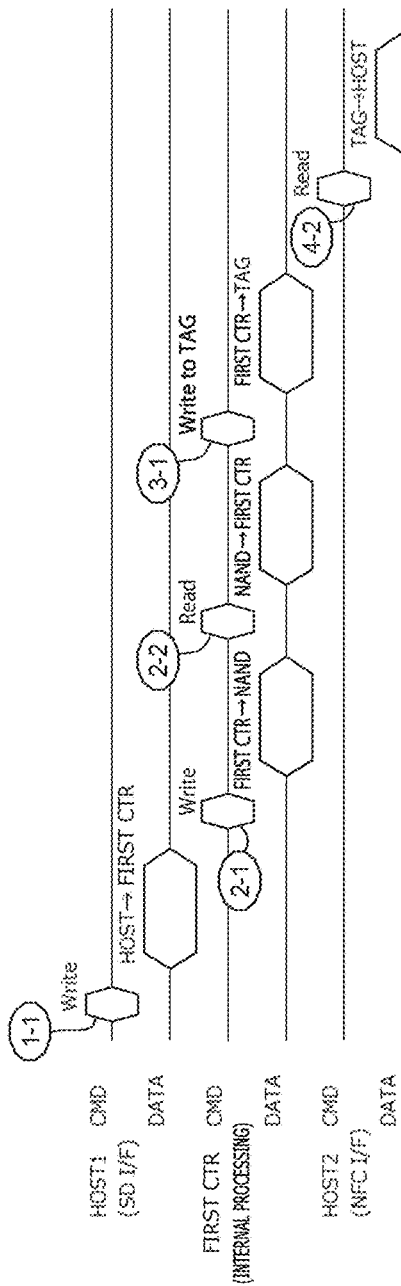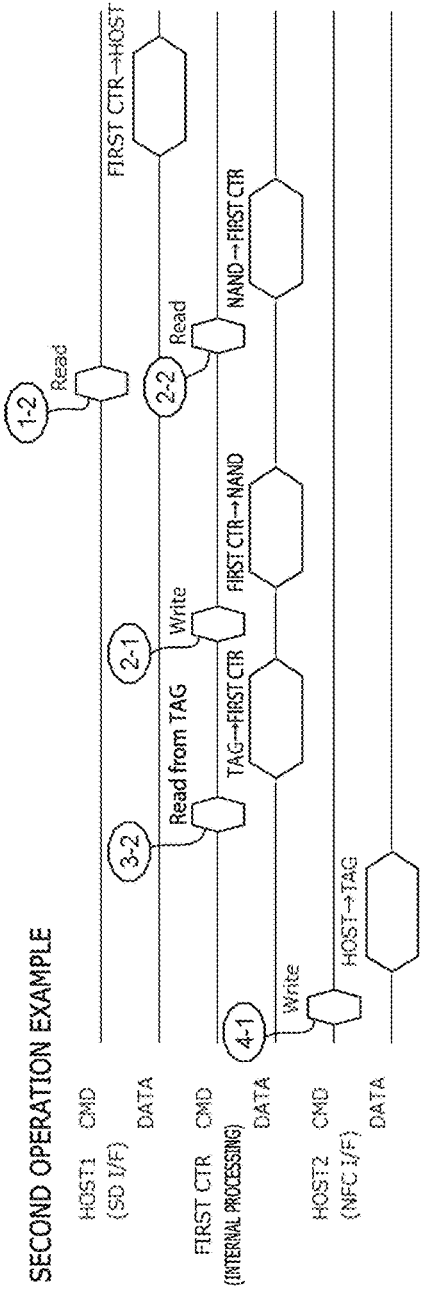

| | FIRST HOST (1800) | NONVOLATILE SEMICONDUCTOR MEMORY (1025) | | FIRST MEMORY PART (1040) | | SECOND HOST (1850) | ADVANTAGES |
|---|---|---|---|---|---|---|---|
| FIRST OPERATION EXAMPLE | O | O | ⇒ | | ⇒ | | • DATA CAN BE OBTAINED FROM FIRST MEMORY PART WITHOUT POWER SUPPLY TO FIRST WIRELESS MEMORY DEVICE<br>• DATA IS AUTOMATICALLY TRANSMITTED FROM NONVOLATILE SEMICONDUCTOR MEMORY TO FIRST MEMORY PART WHEN FIRST WIRELESS MEMORY DEVICE IS POWERED (FIRST HOST IS ACCESSIBLE BY NORMAL CMD) |
| SECOND OPERATION EXAMPLE | O | O | ⇐ | | ⇐ | | • DATA CAN BE TRANSMITTED TO FIRST MEMORY PART WITHOUT POWER SUPPLY TO FIRST WIRELESS MEMORY DEVICE<br>• DATA IS AUTOMATICALLY TRANSMITTED FROM FIRST MEMORY PART TO NONVOLATILE SEMICONDUCTOR MEMORY WHEN FIRST WIRELESS MEMORY DEVICE IS POWERED (FIRST HOST IS ACCESSIBLE BY NORMAL CMD) |
| THIRD OPERATION EXAMPLE | O | ⇒ | | O | ⇒ | O | • DATA CAN BE OBTAINED FROM FIRST MEMORY PART WITHOUT POWER SUPPLY TO FIRST WIRELESS MEMORY DEVICE |
| FOURTH OPERATION EXAMPLE | O | ⇐ | | O | ⇐ | O | • DATA CAN BE TRANSMITTED TO FIRST MEMORY PART WITHOUT POWER SUPPLY TO FIRST WIRELESS MEMORY DEVICE |
| FIFTH OPERATION EXAMPLE | O | ⇒ | O | ⇒ | | O | • SECOND HOST CAN OBTAIN DATA FROM NONVOLATILE SEMICONDUCTOR MEMORY WITHOUT LIMIT TO CAPACITY |
| SIXTH OPERATION EXAMPLE | O | ⇐ | O | ⇐ | | O | • SECOND HOST CAN TRANSMIT DATA TO NONVOLATILE SEMICONDUCTOR MEMORY WITHOUT LIMIT TO CAPACITY |
| SEVENTH OPERATION EXAMPLE | O | ⇔ | O | ⇔ | | O | • SECOND HOST CAN EXCHANGE DATA WITH FIRST HOST WITHOUT LIMIT TO CAPACITY |

1005, 1015, 1520 — FIRST WIRELESS MEMORY DEVICE (e.g., MEMORY CARD) FIRST ACCESSORY FIRST WIRELESS COMMUNICATION TERMINAL (e.g., GAME CONSOLE)

- CONTROL PART INSTRUCTS CODE RECOGNITION PART TO PERFORM RECOGNITION — S3501
- CODE RECOGNITION PART READS CODE DATA AND OUTPUTS IT TO CONTROL PART — S3502
- CONTROL PART INSTRUCTS STORING CODE DATA IN FIRST CONTROLLER — S3503
- CONTROL PART READS CODE DATA OF SECOND ACCESSORY FROM SECOND WIRELESS MEMORY DEVICE — S3504
- CONTROL PART MAKES COMPARISON BETWEEN CODE DATA OF FIRST ACCESSORY AND CODE DATA OF SECOND ACCESSORY, AND GENERATES WIN/LOSS DATA — S3505
- CONTROL PART TRANSMITS WIN/LOSS DATA — S3506
- INDICATION PART INDICATES BATTLE SCENE AND WIN/LOSS RESULT — S3507

1510, 1017, 1520 — SECOND WIRELESS MEMORY DEVICE (e.g., MEMORY CARD) SECOND ACCESSORY SECOND WIRELESS COMMUNICATION TERMINAL (e.g., GAME CONSOLE)

- CONTROL PART INSTRUCTS CODE RECOGNITION PART TO PERFORM RECOGNITION — S3501'
- CODE RECOGNITION PART READS CODE DATA AND OUTPUTS IT TO CONTROL PART — S3502'
- CONTROL PART INSTRUCTS STORING CODE DATA IN FIRST CONTROLLER — S3503'
- CONTROL PART READS CODE DATA OF FIRST ACCESSORY FROM FIRST WIRELESS MEMORY DEVICE — S3504'
- CONTROL PART MAKES COMPARISON BETWEEN CODE DATA OF SECOND ACCESSORY AND CODE DATA OF FIRST ACCESSORY, AND GENERATES WIN/LOSS DATA — S3505'
- CONTROL PART TRANSMITS WIN/LOSS DATA — S3506'
- INDICATION PART INDICATES BATTLE SCENE AND WIN/LOSS RESULT — S3507'

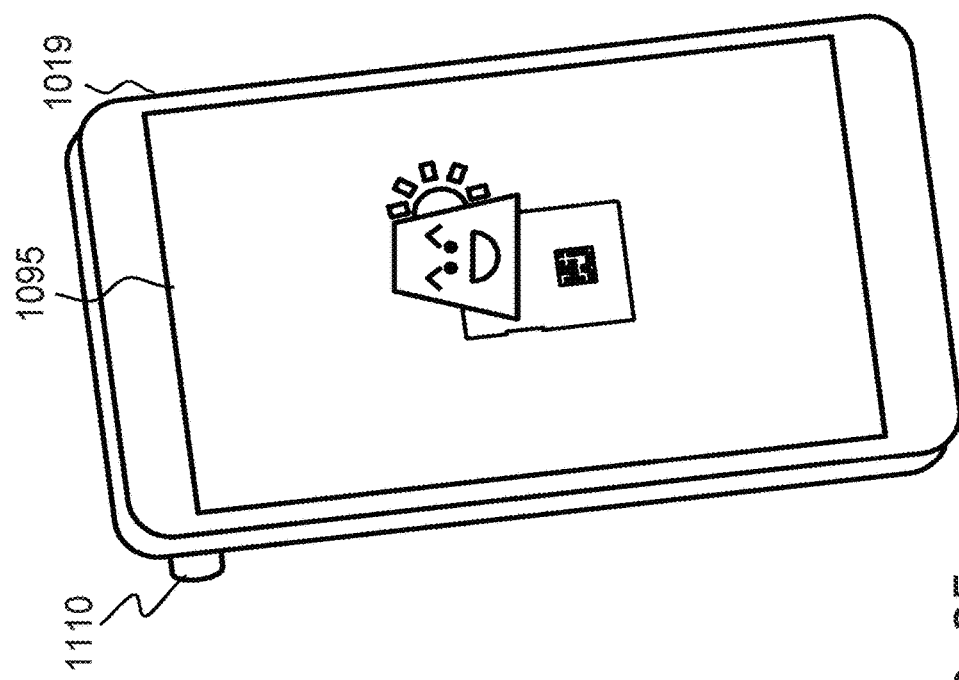
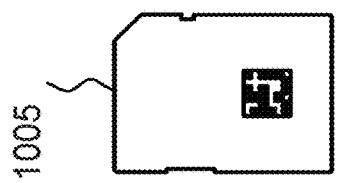
FIG. 35

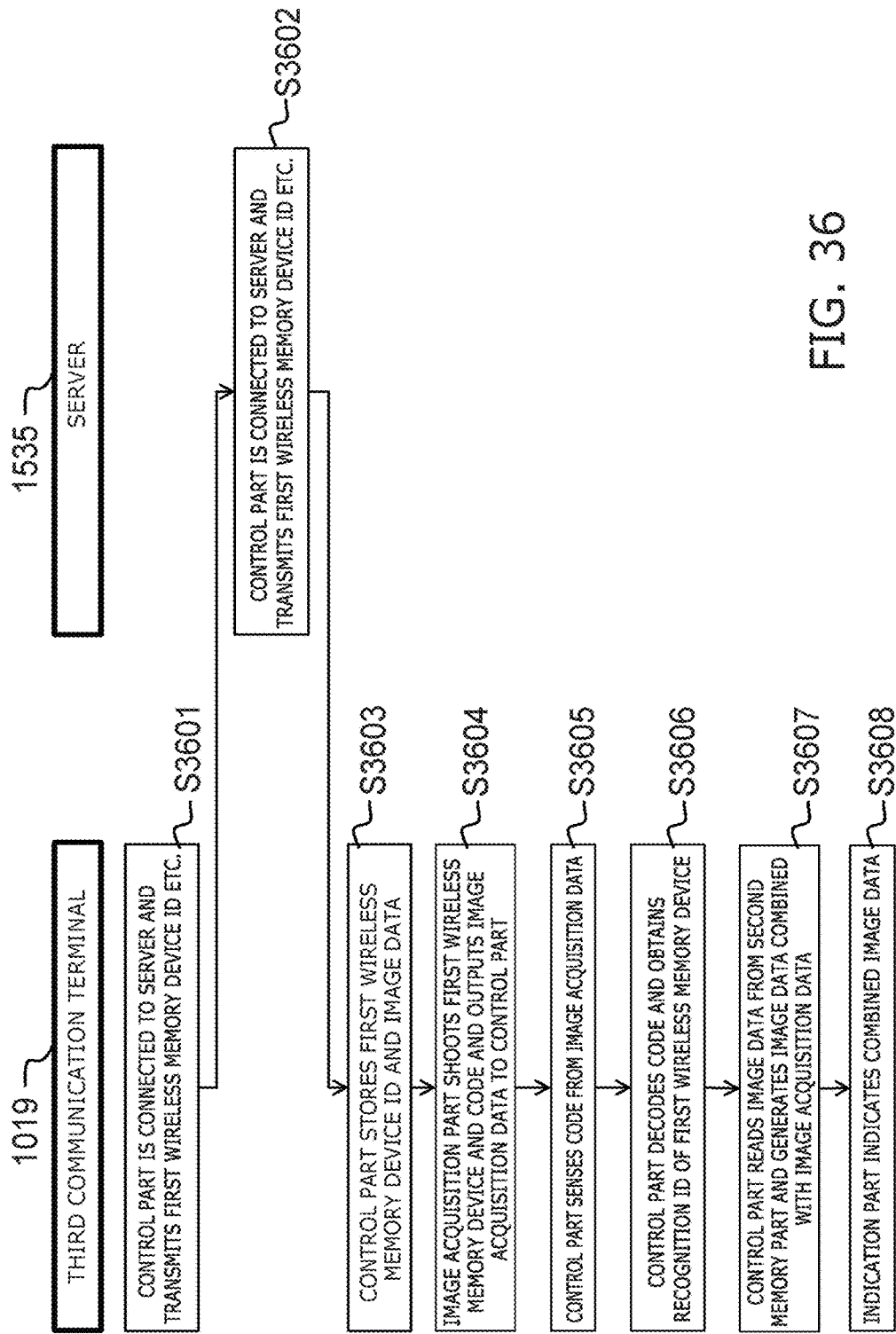

| | FIRST HOST (1800) | | NONVOLATILE SEMICONDUCTOR MEMORY (1025) | | FIRST MEMORY PART (1040) | | SECOND HOST (1850) | STEP | | | | | |
|---|---|---|---|---|---|---|---|---|---|---|---|---|---|
| FIRST OPERATION EXAMPLE | ○ | ⇑ | ○ | ⇑ | ○ | ⇑ | ○ | - | S3201~S3207 | S3301~S3307 | S3401~S3407 | S3501~S3507 |
| SECOND OPERATION EXAMPLE | ○ | ⇓ | ○ | ⇓ | ○ | ⇓ | ○ | S3101~S3111 | - | S3301~S3307 | - | S3501~S3507 |
| THIRD OPERATION EXAMPLE | ○ | ⇑ | ⇑ | ⇑ | ○ | ⇑ | ○ | - | S3201~S3207 | S3301~S3307 | S3401~S3407 | S3501~S3507 |
| FOURTH OPERATION EXAMPLE | ○ | ⇓ | ⇓ | ⇓ | ○ | ⇓ | ○ | S3101~S3111 | - | S3301~S3307 | - | S3501~S3507 |
| FIFTH OPERATION EXAMPLE | ○ | ⇑ | ○ | ⇑ | ⇑ | ⇑ | ○ | - | S3201~S3207 | S3301~S3307 | S3401~S3407 | S3501~S3507 |
| SIXTH OPERATION EXAMPLE | ○ | ⇓ | ○ | ⇓ | ⇓ | ⇓ | ○ | S3101~S3111 | - | S3301~S3307 | - | S3501~S3507 |
| SEVENTH OPERATION EXAMPLE | ○ | ⇔ | ⇔ | ⇔ | ⇔ | ⇔ | ○ | S3101~S3111 | S3201~S3207 | S3301~S3307 | S3401~S3407 | S3501~S3507 |

FIG. 37

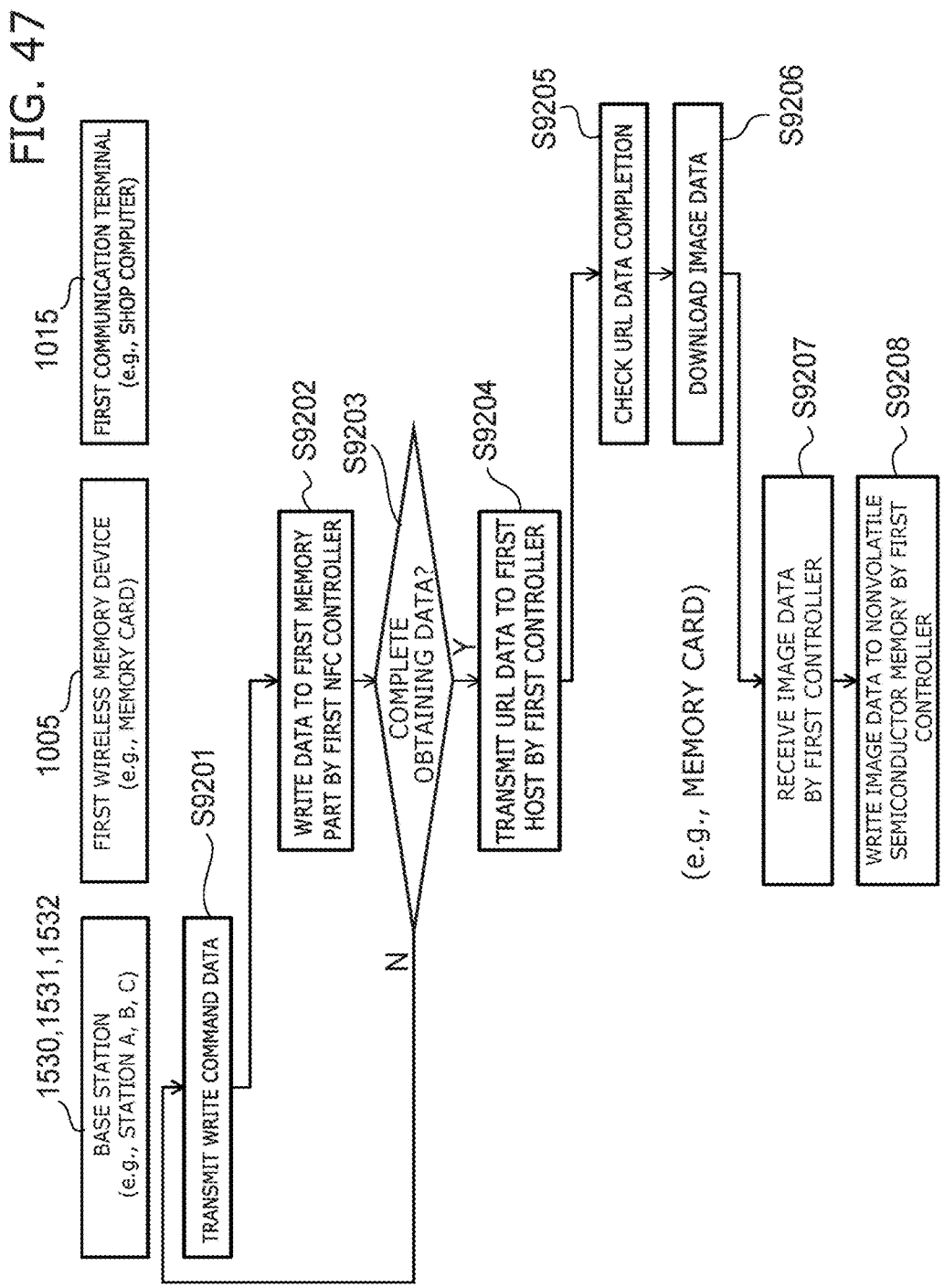

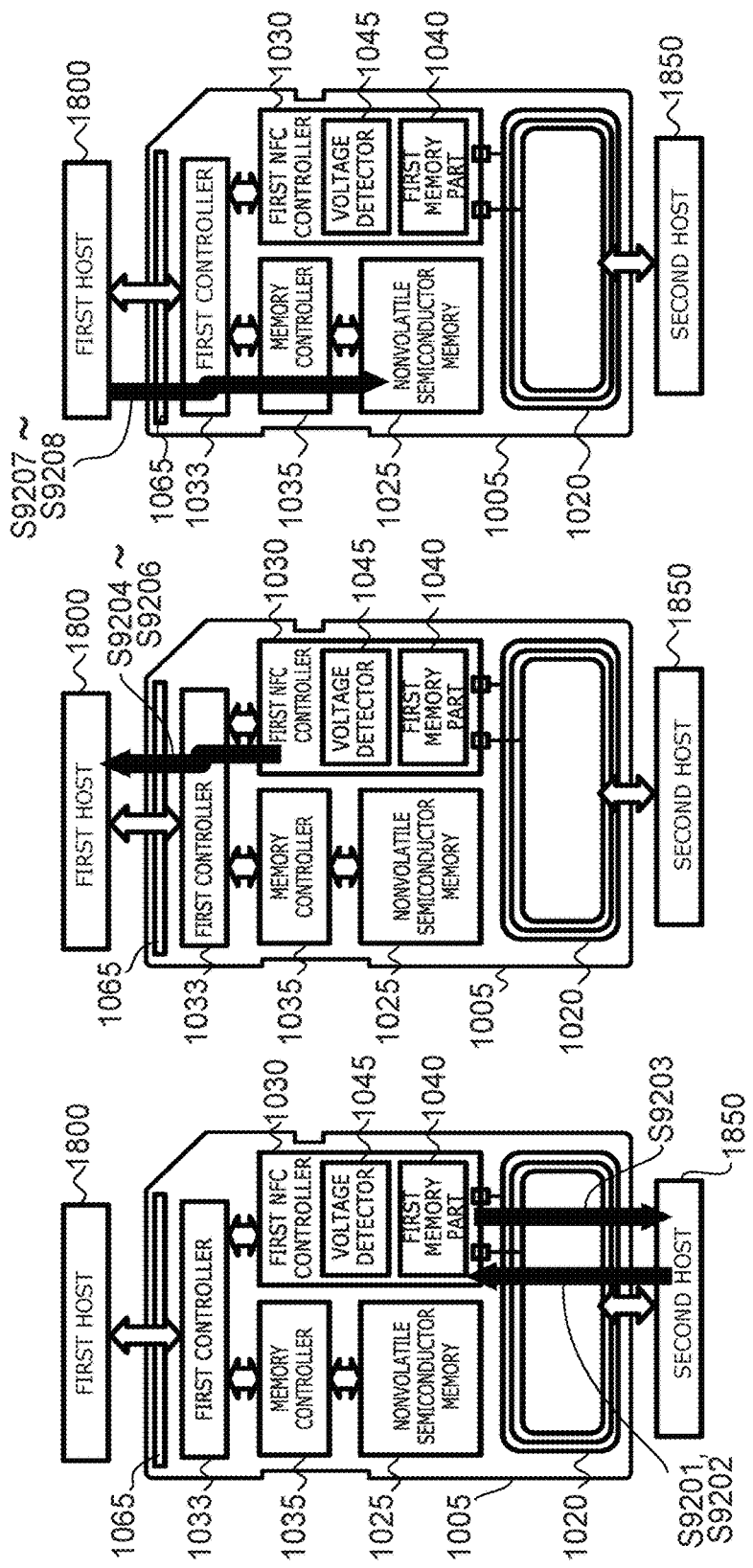

WIRELESS COMMUNICATION DEVICE, METHOD FOR CONTROLLING WIRELESS COMMUNICATION DEVICE, GAME SYSTEM, AND MEMORY SYSTEM

CROSS-REFERENCE TO RELATED APPLICATIONS

This application is a continuation of U.S. application Ser. No. 15/138,827 filed Apr. 26, 2016, and is based upon and claims the benefit of priority from Japanese Patent Applications No. 2015-092407, filed on Apr. 28, 2015 and No. 2015-113538, filed on Jun. 3, 2015; the entire contents of each of which are incorporated herein by reference.

FIELD

Embodiments described herein relate to a wireless communication device, method for controlling wireless communication device, a game system and a memory system.

BACKGROUND

There is known an SD memory card provided with e.g. an NFC antenna.

BRIEF DESCRIPTION OF THE DRAWINGS

FIG. 4 is a block diagram describing a configuration of the first communication terminal according to the first embodiment.

FIG. 21 is a timing chart showing the first operation example of the first wireless memory device according to the first embodiment.

FIG. 22 is a timing chart showing the second operation example of the first wireless memory device according to the first embodiment.

FIG. 28 is a table summarizing the first operation example through seventh operation example according to the first wireless memory device.

FIG. 34 is a flow chart illustrating a fifth scenario of the game system according to the first embodiment.

FIG. 35 is a schematic plan view illustrating a sixth scenario of the game system according to the first embodiment.

FIG. 36 is a flow chart illustrating the sixth scenario of the game system according to the first embodiment.

FIG. 37 is a table summarizing relations between the scenarios of the game system and the operation examples of the first wireless memory device.

FIG. 47 is a schematic flow chart showing the operation of the memory system according to fifth embodiment.

FIG. 48A is a schematic block diagram showing the operation of the first wireless memory device according to the fifth embodiment.

FIG. 48B is a schematic block diagram showing the operation of the first wireless memory device according to the fifth embodiment.

FIG. 48C is a schematic block diagram showing the operation of the first wireless memory device according to the fifth embodiment.

DETAILED DESCRIPTION

Figure 1:
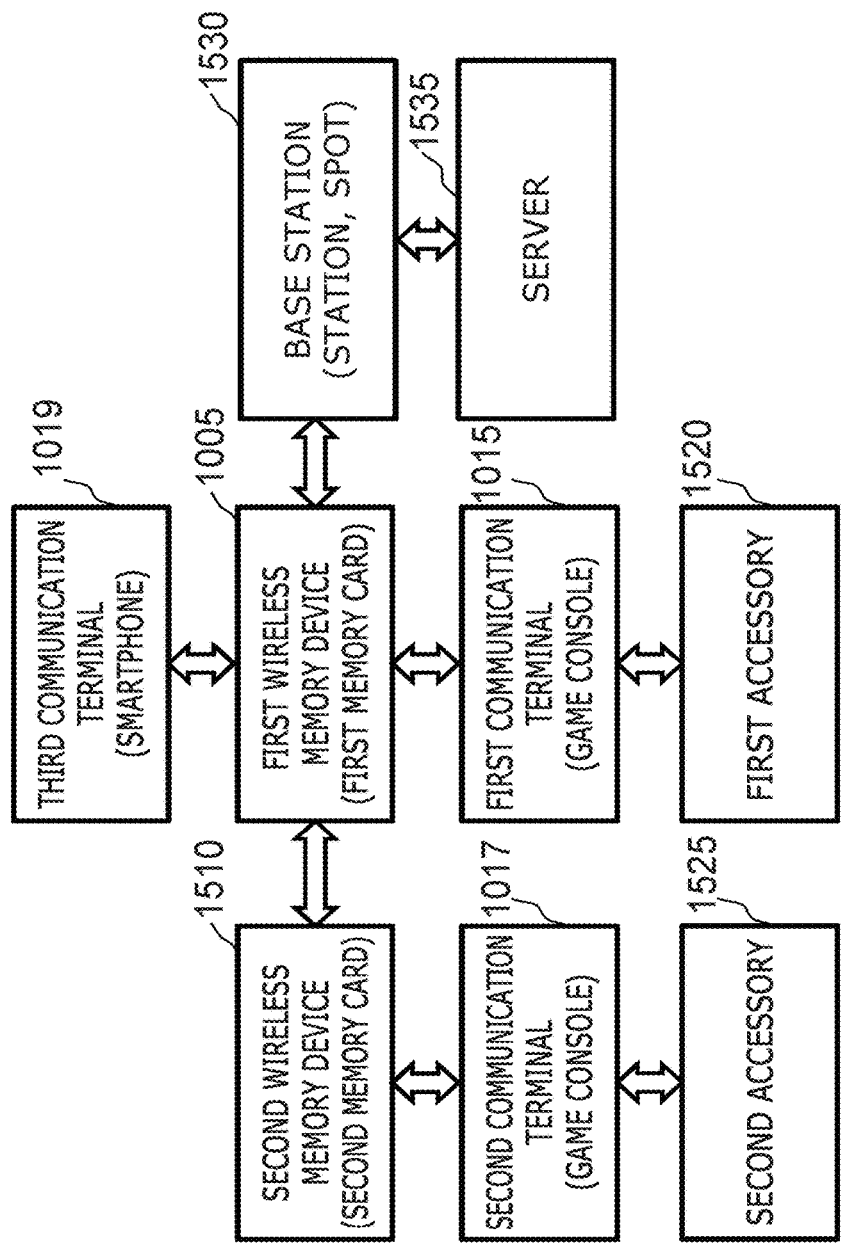
FIG. 1 is a block diagram describing a wireless communication method and a configuration of a wireless communication system according to a first embodiment.

According to an embodiment, a wireless communication device includes a first interface, a first memory part, a wireless antenna, a second memory part and a second interface. The first interface is capable to electrically connect to a first host device. The first interface communicates with the first host device in accordance with an SD interface. The first memory part includes a nonvolatile memory which operates based on power supplied through the first interface from the first host device. The wireless antenna generates power based on a radio wave from a second host device different from the first host device. The second memory part is capable to operate based on power generated by the wireless antenna. The second memory part has a memory capacity lower than the first memory part. The second interface is connected to the second memory part and the first interface. The second interface is capable to operate based on power generated by the wireless antenna. The second interface communicates with the second host device in compliance with an NFC. When the first interface is electrically connected to the first host device, the first interface sends a first data read from at least one of the first memory part and the second memory part to the first host device in accordance with a first command sent from the first host device. The second interface sends a second data read from at least one of the first memory part and the second memory part to the second host device in accordance with a second command received through the wireless antenna from the second host device. And when the first interface is electrically disconnected to the first host device, the second interface sends the second data through the wireless antenna to the second host device in accordance with a third command received through the wireless antenna from the second host device.

Embodiments will now be described with reference to the drawings. In the following description, generally identical functions and components are labeled with like reference numerals. It is not essential that the functional blocks be separated as in the following examples. For instance, some functions may be performed by functional blocks different from the illustrated functional blocks. Furthermore, the illustrated functional blocks may be split into smaller functional subblocks.

First Embodiment

FIG. 1 is a block diagram describing the configuration of a game system according to this embodiment.

The game system includes a first wireless memory device 1005, a first communication terminal (game console) 1015, a first accessory 1520, a second wireless memory device 1510, a second communication terminal (game console) 1017, a second accessory 1525, a third communication terminal 1019, a base station 1530, and a server 1535. For convenience of description, the game system of this embodiment is described with reference to the case of including two communication terminals 1015, 1017. The number of communication terminals is not limited to two. The game system may include e.g. four or ten communication terminals.

The components will be described later in detail. Thus, only the communication relationship and the overview of the components are described here.

The first wireless memory device 1005 is e.g. a memory card having a wireless communication function. The wireless communication function is an arbitrary wireless communication function such as wireless LAN and NFC (near field communication). The first wireless memory device 1005 can communicate with the first communication terminal 1015, the second wireless memory device 1510, the third communication terminal 1019, and the base station 1530.

The first wireless memory device 1005 can be inserted into e.g. the first communication terminal 1015. When the first wireless memory device 1005 is inserted into the first communication terminal 1015, the first wireless memory device 1005 is electrically connected to the first communication terminal 1015 through a connection terminal. As a result, the first wireless memory device 1005 can communicate with the first communication terminal 1015.

The first wireless memory device 1005 wirelessly communicates with the second wireless memory device 1510, the third communication terminal 1019, and the base station 1530.

The first communication terminal 1015 is e.g. a game console. The first communication terminal 1015 can bidirectionally communicate with the first accessory 1520 in addition to the first wireless memory device 1005. The communication between the first communication terminal 1015 and the first accessory 1520 is not limited to bidirectional communication. For instance, the first communication terminal 1015 may unidirectionally read a code attached to the first accessory 1520 without bidirectional communication.

The first accessory 1520 is an accessory of the first communication terminal 1015. More specifically, the first accessory 1520 is e.g. a keychain, strap, medal, or card. A code is attached to the surface of the first accessory 1520. This code can be read by the first communication terminal 1015.

The third communication terminal 1019 is e.g. a smartphone. The third communication terminal 1019 can communicate with the first wireless memory device 1005 through wireless communication.

The base station 1530 is a communication terminal placed in e.g. a shopping mall, an electric shop, or a game console shop. The base station 1530 is e.g. a station or spot. The base station 1530 communicates with the first wireless memory device 1005 through wireless communication. The base station 1530 communicates with the server 1535 through wireless communication or wireline communication.

The server 1535 performs processing in response to a request from the base station 1530. The server 1535 stores data.

The second wireless memory device 1510 is e.g. a memory card having a wireless communication function like the first wireless memory device 1005. The second wireless memory device 1510 can communicate with the second communication terminal 1017 in addition to the first wireless memory device 1005.

The second communication terminal 1017 is similar in configuration and function to the first communication terminal 1015. The second communication terminal 1017 can communicate with the second accessory 1525 in addition to the second wireless memory device 1510.

The first communication terminal 1015 and the second communication terminal 1017 do not need to be of the same kind. For instance, the first communication terminal 1015 and the second communication terminal 1017 may be game consoles of the same kind, but different in part number. Alternatively, they may be game consoles of different kinds (e.g., a keychain-shaped game console and a watch-shaped game console). Alternatively, one may be an application on a smartphone, and the other may be a watch-shaped game console.

The second accessory 1525 is similar in configuration and function to the first accessory 1520. The first accessory 1520 and the second accessory 1525 do not need to be of the same kind as in the relationship between the first communication terminal 1015 and the second communication terminal 1017.

(First Wireless Memory Device 1005)

Figure 2:
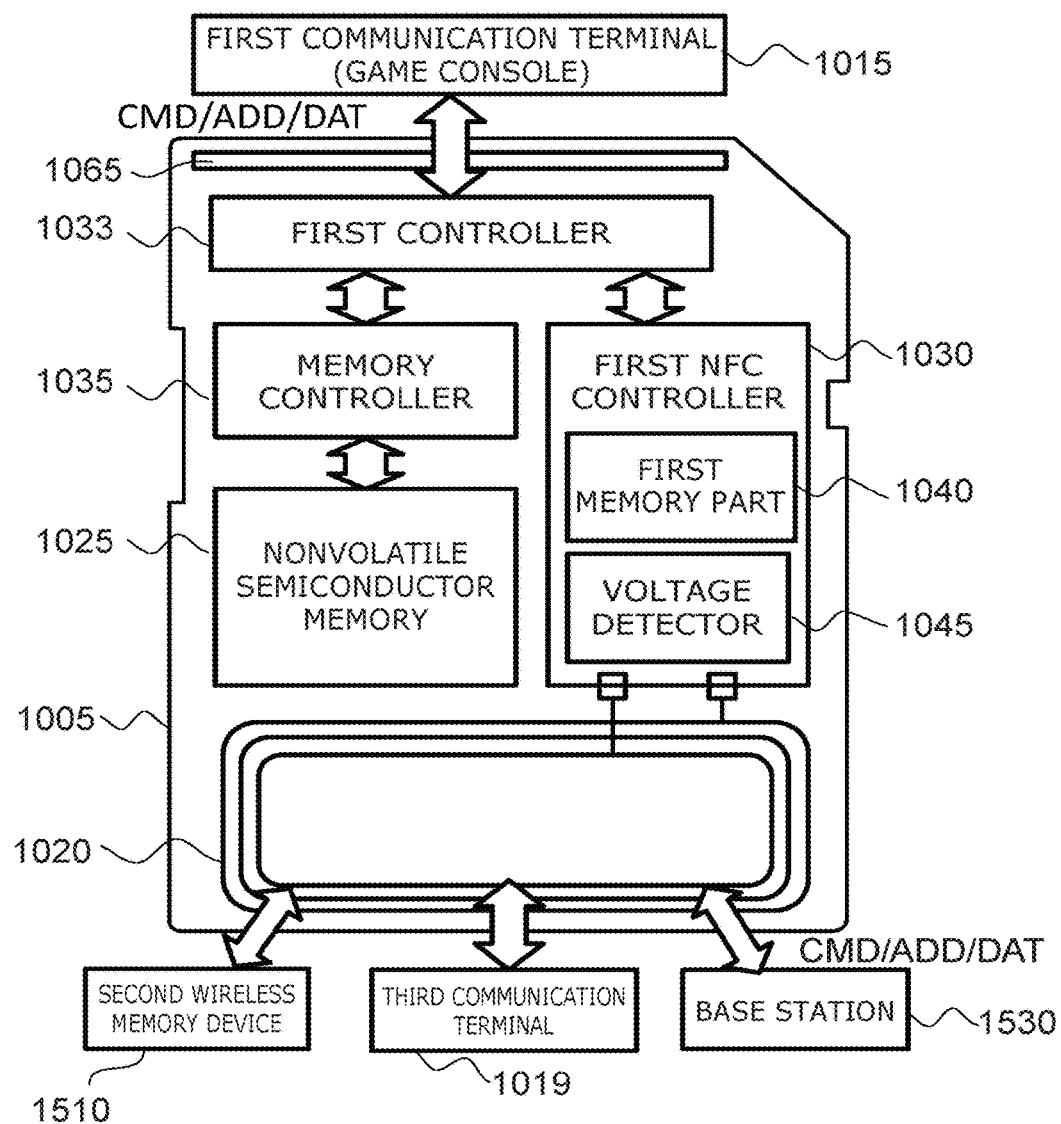
FIG. 2 is a block diagram showing the configuration of a first wireless memory device according to the embodiment.

FIG. 2 is a block diagram showing the configuration of the first wireless memory device 1005 according to this embodiment and its correlation with the first communication terminal 1015, the second wireless memory device, the third communication terminal, and the base station therearound. The operation method and the like of the first wireless memory device 1005 will be described later in detail. Thus, each component is described here.

The first wireless memory device 1005 exchanges data and commands with the first communication terminal 1015 in accordance with e.g. the SD interface. The first wireless memory device 1005 may use a different interface. The first wireless memory device 1005 exchanges data and commands with the third communication terminal 1019 in compliance with e.g. the NFC interface. The first wireless memory device 1005 may use a different wireless communication interface.

The first wireless memory device 1005 includes a first controller 1033, a first wireless antenna 1020, a nonvolatile semiconductor memory 1025, a first NFC controller 1030, a memory controller 1035, and a connection terminal 1065. The first controller 1033, the memory controller 1035, and the first NFC controller 1030 do not necessarily need to be provided separately. An arbitrary combination thereof may be provided integrally.

The first wireless memory device 1005 is operated by electric power supplied from the first communication terminal 1015 electrically connected thereto. The first wireless memory device 1005 has a function of writing and reading data.

The first wireless memory device 1005 is at least partly operable also by electric power generated (induced) by electromagnetic induction of the first wireless antenna 1020. For instance, the first wireless memory device 1005 can perform communication in compliance with the near field wireless communication standard (NFC) at a frequency of e.g. 13.56 MHz to write and read data in the second wireless memory device 1510, the third communication terminal 1019, and the base station 1530. That is, the first wireless memory device 1005 is operable even without supply of power from the first communication terminal 1015. The NFC communication is operable at lower power than commonly-used wireless LAN communication.

Specifically, the first controller 1033, the memory controller 1035, and the nonvolatile semiconductor memory 1025 are operated when the first wireless memory device 1005 is powered by the first communication terminal 1015. The first controller 1033, the memory controller 1035, and the nonvolatile semiconductor memory 1025 do not need to be operated when the first wireless memory device 1005 is powered only through the first wireless antenna 1020.

On the other hand, the first NFC controller 1030 is operable even when the first wireless memory device 1005 is powered only through the first wireless antenna 1020. That is, when the first wireless antenna 1020 receives a wireless radio wave of a prescribed frequency compliant with NFC, the first NFC controller 1030 is made operable. That is, the first wireless memory device 1005 is made operable for NFC-based communication.

The first controller 1033 receives commands CMD, addresses ADD, and data DAT from the first communication terminal 1015, the memory controller 1035, and the first NFC controller 1030.

The first controller 1033 outputs e.g. commands CMD, addresses ADD, and data DAT to the memory controller 1035, the first NFC controller 1030, and the first communication terminal 1015 based on the received command CMD.

The memory controller 1035 controls the nonvolatile semiconductor memory 1025. The memory controller 1035 writes data to the nonvolatile semiconductor memory 1025 based on e.g. the command CMD inputted from the first controller 1033. The memory controller 1035 reads data from the nonvolatile semiconductor memory 1025 based on e.g. the command CMD inputted from the first controller 1033 and outputs the data to the first controller 1033. The memory controller 1035 may communicate with the first NFC controller 1030 and the first communication terminal 1015 without the intermediary of the first controller 1033.

The nonvolatile semiconductor memory 1025 is e.g. a NAND flash memory. The nonvolatile semiconductor memory 1025 may be a different nonvolatile semiconductor memory such as a NOR flash memory, an MRAM (magnetoresistive random access memory), a PRAM (phase change random access memory), an ReRAM (resistive random access memory), and an FeRAM (ferroelectric random access memory). For instance, the nonvolatile semiconductor memory 1025 may be changed to a different nonvolatile memory or the like.

The nonvolatile semiconductor memory 1025 is operated when the first wireless memory device 1005 is powered by the first communication terminal 1015.

The first wireless antenna 1020 is e.g. an antenna based on the pattern of a PCB (printed circuit board). The frequency band enabling the operation of the first wireless antenna is set to a prescribed frequency band compliant with NFC.

The first wireless antenna 1020 can generate power by electromagnetic induction based on radio waves from e.g. the third communication terminal 1019. The first wireless antenna 1020 supplies the generated power to the first NFC controller 1030.

The first wireless antenna 1020 receives commands CMD, addresses ADD, and data DAT from the second wireless memory device 1510, the third communication terminal 1019, and the base station 1530. The first wireless antenna 1020 outputs the received command CMD and the like to the first NFC controller 1030.

The first wireless antenna 1020 outputs the command CMD and the like inputted from the first NFC controller 1030 to the second wireless memory device 1510, the third communication terminal 1019, and the base station 1530.

The first NFC controller 1030 includes a first memory part 1040 and a voltage detector 1045. The first NFC controller 1030 and the first memory part 1040 may be separated in configuration.

The first controller 1033 receives commands CMD, addresses ADD, and data DAT from the first communication terminal 1015, the memory controller 1035, and the first NFC controller 1030.

The first controller 1033 outputs e.g. commands CMD, addresses ADD, and data DAT to the memory controller 1035, the first NFC controller 1030, and the first communication terminal 1015 based on the received command CMD.

The first NFC controller 1030 communicates with e.g. the third communication terminal 1019 through the first wireless antenna 1020.

The first NFC controller 1030 receives e.g. commands CMD, addresses ADD, and data DAT from the first controller 1033 and the first wireless antenna 1020. The first NFC controller 1030 outputs data DAT and the like to e.g. the first controller 1033 and the first wireless antenna 1020 based on the received command CMD.

The first NFC controller 1030 reads data DAT from the first memory part 1040 based on e.g. the received command CMD and address ADD. The first NFC controller 1030 outputs the data DAT to the first controller 1033 and the first wireless antenna 1020.

Furthermore, the first NFC controller 1030 writes data DAT to the first memory part 1040 based on e.g. the received command CMD, address ADD, and data DAT.

The commands CMD, addresses ADD, data DAT and the like communicated among e.g. the first communication terminal 1015, the first controller 1033, the memory controller 1035, the first NFC controller 1030, and the first wireless antenna 1020 do not necessarily need to coincide in form. The commands CMD, addresses ADD, data DAT and the like do not need to coincide in form with those communicated in the other portions as long as the communicating parties can recognize the commands CMD, addresses ADD, and data DAT.

When the first NFC controller 1030 receives a related data generation command CMD and data DAT through the first controller 1033 or the first wireless antenna 1020, the first NFC controller 1030 may generate related data DAT' and write it to the first memory part 1040.

The first NFC controller 1030 does not necessarily need to have the function of writing to the third communication terminal 1019 side. That is, the first NFC controller 1030 does not need to have the function of writing to e.g. an NFC tag outside the first wireless memory device 1005. When the third communication terminal 1019 writes data to the first memory part 1040 through the first wireless antenna 1020, the third communication terminal 1019 may write it directly to the first memory part 1040. That is, the data write to the first memory part 1040 does not necessarily need to be performed by the first NFC controller 1030.

The first memory part 1040 is e.g. a nonvolatile memory. The first memory part 1040 stores data in accordance with the control by the first NFC controller 1030 or the memory controller 1035. The data storage in the first memory part 1040 may be temporary. The first memory part 1040 is e.g. EEPROM (electrically erasable programmable read-only memory). The first memory part 1040 may be one of various memories like the aforementioned nonvolatile semiconductor memory 1025.

In order to enable operation by power supplied from the first wireless antenna 1020, the nonvolatile memory used for the first memory part 1040 is preferably lower in power consumption per unit capacity than the nonvolatile semiconductor memory 1025. Specifically, the first memory part 1040 may be a NOR memory.

The data stored in the first memory part 1040 include e.g. related data of the first wireless memory device 1005 (part of data stored in the nonvolatile semiconductor memory 1025 (such as image data, sound data (such as music data and audio data), and video data), data related to the data stored in the nonvolatile semiconductor memory 1025, and data related to the nonvolatile semiconductor memory 1025 and the first wireless memory device 1005), data related to the first communication terminal 1015, data related to the first accessory 1520 connected to the first communication terminal 1015, and information of commands CMD received from e.g. the first controller 1033 and the third communication terminal 1019.

The data are now described with reference to specific examples. These examples are illustrative only. It is not intended to limit the data stored in the first memory part 1040 to these examples.

The data related to the image data stored in the nonvolatile semiconductor memory 1025 includes e.g. file name data, the first or last portion of the image data, or thumbnail image data of the image data, file creation time data, image acquisition time data, data ID and the like.

The data related to the sound data stored in the nonvolatile semiconductor memory 1025 includes e.g. file name data, the first or last portion of the sound data, or replay time data of the sound data, file creation time data, data ID and the like.

The data related to the nonvolatile semiconductor memory 1025 includes e.g. data on the memory capacity of the nonvolatile semiconductor memory 1025, data on the remaining capacity, data on the number of stored files and the like.

The data related to the first wireless memory device 1005 includes recognition ID data (identification number arbitrarily assigned to each first wireless memory device 1005 such as unique product ID assigned at manufacturing time and ID arbitrarily assigned for each first wireless memory device 1005 later), comment (text data associated with the first wireless memory device 1005 that the user has stored in the first wireless memory device 1005 through the first communication terminal 1015) and the like.

The data related to the first communication terminal 1015 includes recognition ID data of the first communication terminal 1015, firmware update information of the first communication terminal 1015, flag information generated based on the foregoing information and the like.

The data related to the first accessory 1520 includes recognition ID data of the first accessory 1520, data included in the code provided on the first accessory 1520, flag information generated from that data and the like.

The voltage detector 1045 is electrically connected to the first wireless antenna 1020. The voltage detector 1045 detects the voltage supplied from the first wireless antenna 1020 to the first NFC controller 1030. Then, the voltage detector 1045 issues a reset command of NFC-compliant communication until reaching a prescribed voltage enabling operation of the first NFC controller 1030. The first NFC controller 1030 does not perform NFC-compliant communication during receiving this reset command. This reset command can prevent abnormal activation and operation of NFC-compliant communication. Alternatively, the voltage detector 1045 may be configured to output an operation enabling command to the first NFC controller 1030 when a prescribed voltage is reached. The first NFC controller 1030 performs NFC-compliant communication only in the case of receiving the operation enabling command.

The connection terminal 1065 is e.g. a standardized connection terminal. The connection terminal 1065 is connectable to the first communication terminal 1015.

The first wireless memory device 1005 according to this embodiment may be based on e.g. the configuration and the operation method described in U.S. patent application Ser. No. 14/477,200 titled "MEMORY DEVICE INCLUDING WIRELESS ANTENNA". The entire contents of this patent application are incorporated herein by reference.

Figure 3B:
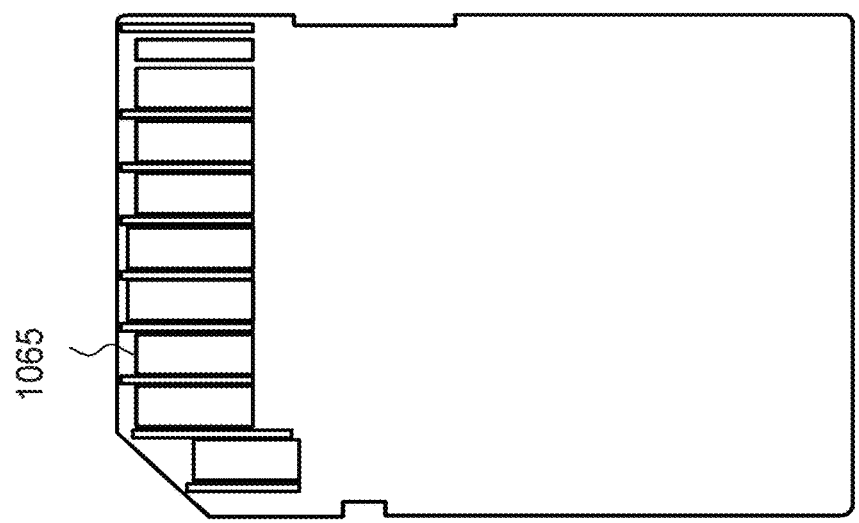
FIG. 3B is a schematic plan view showing a rear surface of the first wireless memory device according to the first embodiment.
Figure 3A:
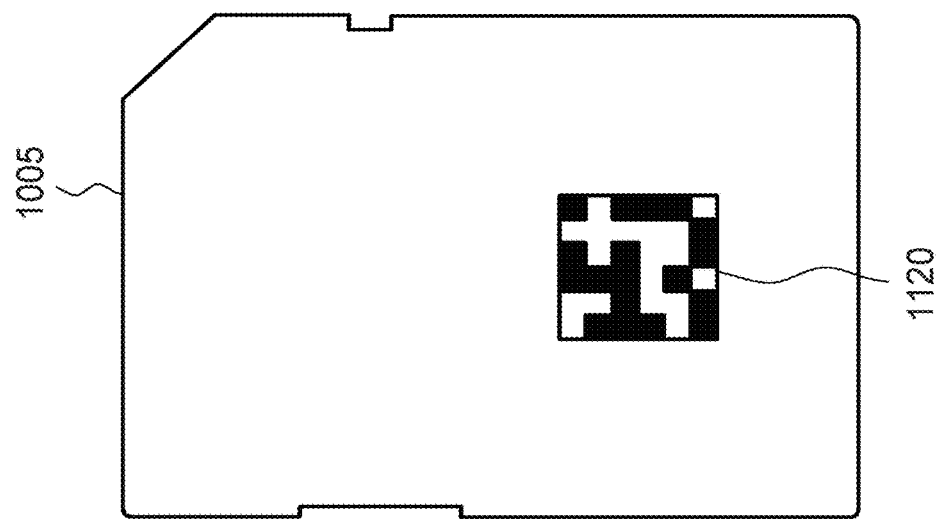
FIG. 3A is a schematic plan view showing a front surface of the first wireless memory device according to the first embodiment.

FIGS. 3A and 3B are schematic plan views showing the front surface and the rear surface of the first wireless memory device 1005.

As shown in FIG. 3A, the first wireless memory device 1005 has a code 1120 on its front surface. The code 1120 can be sensed by e.g. an image acquisition part (CMOS sensor) provided in the third communication terminal 1019 or a code recognition part provided in the first communication terminal 1015.

The code 1120 is e.g. a two-dimensional code including information in two dimensions of the vertical direction and the horizontal direction. As shown in FIG. 3A, the code 1120 is e.g. a two-dimensional matrix code made of black and white dots. The code 1120 may be a stack code. Alternatively, the code 1120 may be a one-dimensional bar code. Alternatively, the code 1120 may imitate the shape of a character.

The code 1120 is shaped like e.g. a seal. The code 1120 may be affixed by the user after purchase, or may be affixed at the manufacturing time. The code 1120 may be placed directly on the casing of the first wireless memory device 1005 by e.g. printing. The code 1120 may be placed on both the front surface and the rear surface of the first wireless memory device 1005.

Furthermore, the code 1120 does not need to be placed directly on the first wireless memory device 1005, but may be placed indirectly. For instance, the code 1120 may be placed on the front surface of a casing provided to cover at least part of the first wireless memory device 1005. The casing thus provided spares the user the trouble of recognizing the entirety of the first wireless memory device 1005. This can enhance e.g. the immersive feeling for the first communication terminal 1015 serving as a game console.

The code 1120 includes e.g. information (first information) of the recognition ID of the first wireless memory device 1005. In other words, first information such as recognition ID is indicated on the outer surface of the first wireless memory device 1005.

As shown in FIG. 3B, the first wireless memory device 1005 has a plurality of connection terminals 1065 on its rear surface side. The plurality of connection terminals 1065 are placed along one end side of the first wireless memory device 1005.

As described above, the first wireless memory device 1005 is e.g. a memory card packaged in a single or common enclosure or housing. The first wireless memory device 1005 may be a memory system separately including part or all of the aforementioned components. For instance, the memory system may include a memory module, an NFC module, and a control device. The memory module includes the memory controller 1035 and the nonvolatile semiconductor memory 1025. The NFC module includes the first wireless antenna 1020, the first NFC controller 1030, the first memory part 1040, and the voltage detector 1045. The control device includes the first controller 1033. The first controller 1033 is connected to the NFC module by e.g. SPI interface. The first controller 1033 may be included in e.g. the control part 1390, described later, included in the first communication terminal 1015. The first controller 1033 may be implemented as a step of the program executed by the control part 1390.

(First Communication Terminal)

FIG. 4 is a schematic block diagram describing the configuration of the first communication terminal (game console) 1015.

The first communication terminal 1015 includes an accessory holder 1310, a code recognition part 1320, a memory card socket 1330, and a speaker 1340. The second communication terminal 1017 may have the same configuration as the first communication terminal 1015. Thus, the detailed description of the second communication terminal 1017 is omitted.

The memory card socket 1330 can receive a memory device such as a memory card inserted from outside.

For convenience of description, it is assumed that the first wireless memory device 1005 such as a memory card including an NFC chip has already been held in the memory card socket 1330.

The accessory holder 1310 has the function of holding an accessory. The accessory holder 1310 holds e.g. an accessory inserted from outside. The accessory holder 1310 may hold an accessory not inserted from outside. For instance, the accessory holder 1310 may be a ring-shaped accessory holder for holding a keychain-shaped accessory. For convenience of description, it is assumed that the first accessory 1520 has already been held in the accessory holder 1310.

The first accessory 1520 is e.g. a card with a character depicted thereon. One first accessory 1520 has e.g. one character depicted thereon. The first accessory 1520 is not limited thereto. A plurality of characters may be depicted on one first accessory 1520. One first accessory 1520 stores information on the depicted character. The first accessory 1520 stores this information in the form of e.g. a code. The first accessory 1520 is not limited thereto. For instance, the first accessory 1520 may include an NFC chip, which may store such information.

The information on the depicted character may be stored as a code. In this case, when the accessory is held in the accessory holder 1310, the code of the accessory is opposed to (faces) the code recognition part 1320.

The code recognition part 1320 reads the information on the depicted character from the code of the accessory in response to an external instruction. The code recognition part 1320 transfers such information to the memory card. The information on the character includes information on the address to be read in the nonvolatile semiconductor memory included in the memory card.

The first controller 1033 of the memory card reads the corresponding information in response to the information on the character. Specifically, the first controller 1033 outputs a read instruction and an address to the memory controller 1035. The memory controller 1035 reads data from the memory at the address corresponding to the information on the character and outputs it to the first controller 1033. The memory card outputs this data to the speaker 1340.

The speaker 1340 converts the data to audio data through a DA converter (not shown) and outputs it to the outside. The user can hear the audio data corresponding to the first accessory 1520 inserted into the first communication terminal 1015.

The first communication terminal 1015 may include an indication part (display) 1350. The data read from the memory card may include audio data and video data. In this case, the video data may be indicated on the indication part 1350 in addition to outputting the audio data from the speaker 1340. The video data may be indicated on the indication part 1350 without outputting the audio data from the speaker 1340.

The control part 1390 controls the code recognition part 1320, the speaker 1340, and the indication part 1350. The control part 1390 communicates with the first wireless memory device 1005. The control part 1390 may include a cache memory 1395.

The cache memory 1395 can temporarily store data.

Figure 5:
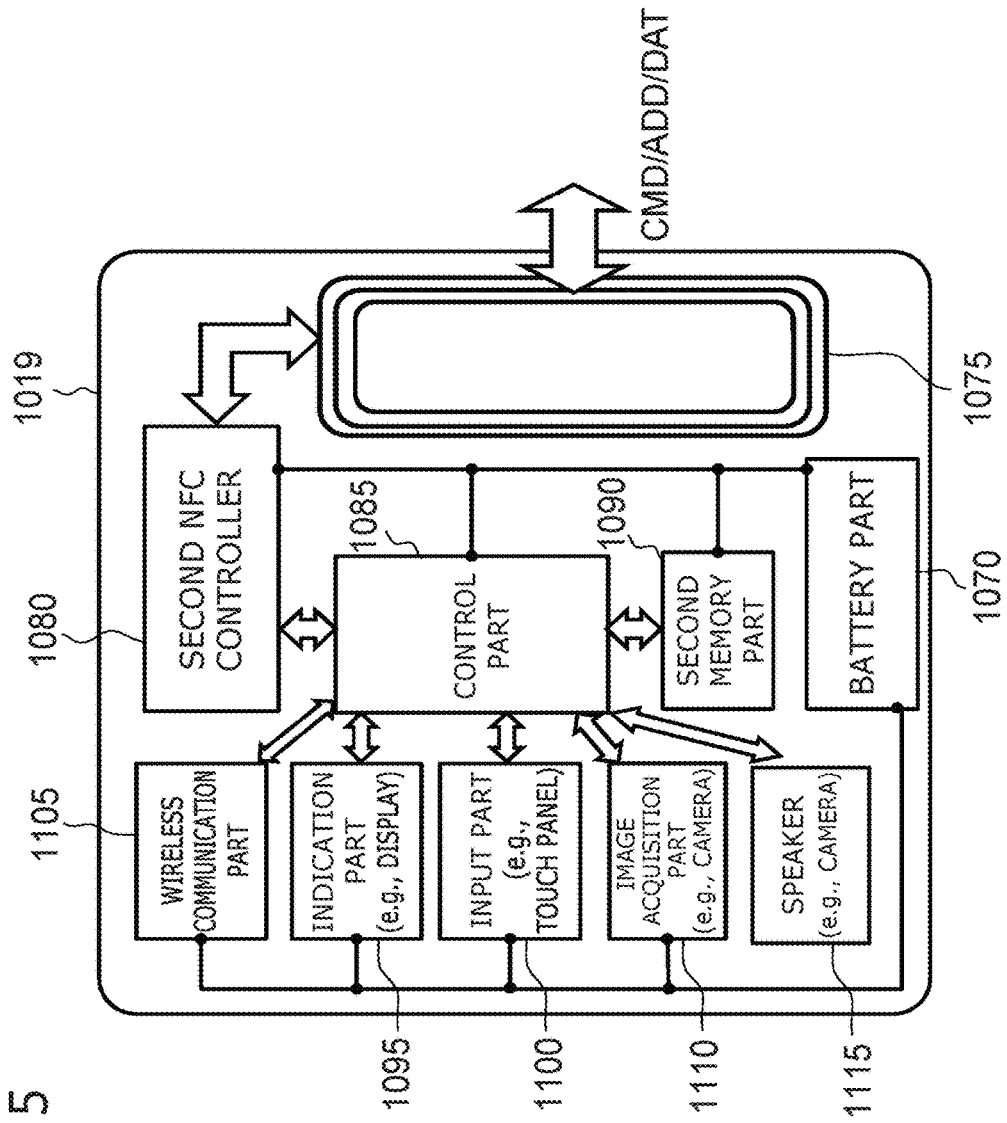
FIG. 5 is a block diagram illustrating a third communication terminal according to the first embodiment.

FIG. 5 is a block diagram illustrating the third communication terminal 1019 according to this embodiment. A similar configuration is also applicable to the case where the first communication terminal 1015 is a smartphone.

The third communication terminal 1019 is a device having a wireless communication function such as a smartphone, PDA, and tablet terminal.

The third communication terminal 1019 includes a battery part 1070, a second wireless antenna 1075, a second NFC controller 1080, a control part 1085, a second memory part 1090, an indication part 1095, an input part 1100, a wireless communication part 1105, an image acquisition part 1110, and a speaker 1115. The second NFC controller 1080 and the control part 1085 may be implemented as one controller.

The third communication terminal 1019 is enabled for operation and communication by power supplied from the battery part 1070.

The third communication terminal 1019 can exchange data in compliance with e.g. the NFC interface. The third communication terminal 1019 may use a different wireless communication interface.

The battery part 1070 is a power supply for providing power to the third communication terminal 1019. The battery part 1070 includes e.g. battery cells. The battery part 1070 may include e.g. dry battery cells, rechargeable cells, or fuel cells. More specifically, the battery part 1070 may include lithium-ion cells. The battery part 1070 may be located outside the third communication terminal 1019. The battery part 1070 may be e.g. an AC adaptor connected to the commercial power supply.

The frequency band enabling the operation of the second wireless antenna 1075 is set to a prescribed frequency band compliant with NFC.

The second wireless antenna 1075 receives commands CMD, addresses ADD, and data DAT. The second wireless antenna 1075 outputs the received data to the second NFC controller 1080. The second wireless antenna 1075 outputs the command CMD, address ADD, and data DAT inputted from the second NFC controller 1080. The second wireless antenna 1075 is e.g. a PCB pattern antenna.

The second NFC controller 1080 controls the second wireless antenna 1075.

The second NFC controller 1080 receives e.g. commands CMD, addresses ADD, and data DAT from the control part 1085. The second NFC controller 1080 can output them through the second wireless antenna 1075. The second NFC controller 1080 can output the data received by the second wireless antenna 1075 to the control part 1085.

The control part 1085 controls the operations of various parts based on the input from e.g. the input part 1100, the wireless communication part 1105, the image acquisition part 1110, and the first wireless memory device 1005. Based on the inputted data or the calculation result of the data, the control part 1085 controls various parts and outputs e.g. commands to various parts as necessary.

The control part 1085 is e.g. a semiconductor chip, a circuit formed on a substrate, or a combination of one or more thereof. The control part 1085 may include what is called a cache memory or register for temporarily storing data.

The control part 1085 can output e.g. commands CMD, addresses ADD, and data DAT to the second wireless antenna 1075 through the second NFC controller 1080. The control part 1085 receives the commands CMD, addresses ADD, and data DAT received by the second wireless antenna 1075. The control part 1085 receives the data read from the first wireless memory device 1005.

When the control part 1085 writes data to the first wireless memory device 1005, the control part 1085 outputs the data inputted from various parts or the calculation result of the data, a write command CMD, and an address ADD to the second NFC controller 1080.

The control part 1085 is electrically connected to various parts and electrically communicates with various parts. That is, the control part 1085 can receive data from various parts, and output the data or the calculation result of the data. For instance, the control part 1085 can calculate (generate) composite image data by highlighting the image acquisition data shot by the image acquisition part, and output it to the indication part 1095. For instance, the control part 1085 can calculate (generate) composite image data based on the image data read from the second memory part 1090, and output it to the indication part 1095. These are illustrative only. The control part 1085 can receive data from various parts and output the calculation result of the data.

The second memory part 1090 outputs the stored data to the control part 1085 and stores the data received from the control part 1085 based on communication with the control part 1085.

The second memory part 1090 includes e.g. a memory controller and a nonvolatile memory. The nonvolatile memory may be one of various nonvolatile memories listed with reference to the nonvolatile semiconductor memory 1025. The memory controller controls the nonvolatile memory. The second memory part 1090 may be e.g. HDDs (hard disk drives) or SSDs (solid state disks).

The indication part 1095 outputs the data received from the control part 1085 in a user-recognizable form.

The indication part 1095 is e.g. a display. The user can visually recognize the indication on the display. Specifically, the indication part 1095 may be one of various displays such as a liquid crystal display, a plasma display, an organic EL display, and a three-dimensional display. The indication part 1095 indicates the data received from the control part 1085 on the display. The indication part 1095 can indicate the image or video data shot by the image acquisition part 1110 in approximately real time.

The input part 1100 receives the user's input and outputs it as input data to the control part 1085.

The input part 1100 is e.g. a touch panel provided on the display. When the user taps an indication on the display, the input part 1100 senses the tapped position on the touch panel and outputs the positional information as input data to the control part 1085. Specifically, the input part 1100 may be based on switches arranged in a matrix, or one of various touch panels of the resistive film type, surface acoustic wave type, infrared radiation type, electromagnetic induction type, and capacitance type.

The input part 1100 may be e.g. a microphone. When the user utters a voice, the input part 1100 may sense the voice, extract input data by speech conversion, and output it to the control part 1085.

The wireless communication part 1105 includes a wireless antenna and a wireless controller. The wireless communication part 1105 exchanges data by wireless communication with the outside. The wireless communication part 1105 outputs the data received from outside to the control part 1085. The wireless communication part 1105 transmits the data received from the control part 1085 to the outside.

The image acquisition part 1110 can shoot a still image, a video image, or both of them. The image acquisition part 1110 outputs image acquisition data (first image data), i.e., still image or video data, to the control part 1085. The image acquisition used herein does not necessarily include storing the image acquisition data.

The image acquisition part 1110 can shoot the code 1120 placed on the surface of the first wireless memory device 1005 shown in FIG. 2.

The image acquisition part 1110 is e.g. a camera. More specifically, the image acquisition part 1110 is a camera based on e.g. a CCD (charge coupled device) sensor or CMOS (complementary metal oxide semiconductor) sensor.

The speaker 1115 replays the sound data inputted from the control part 1085.

Figure 6:
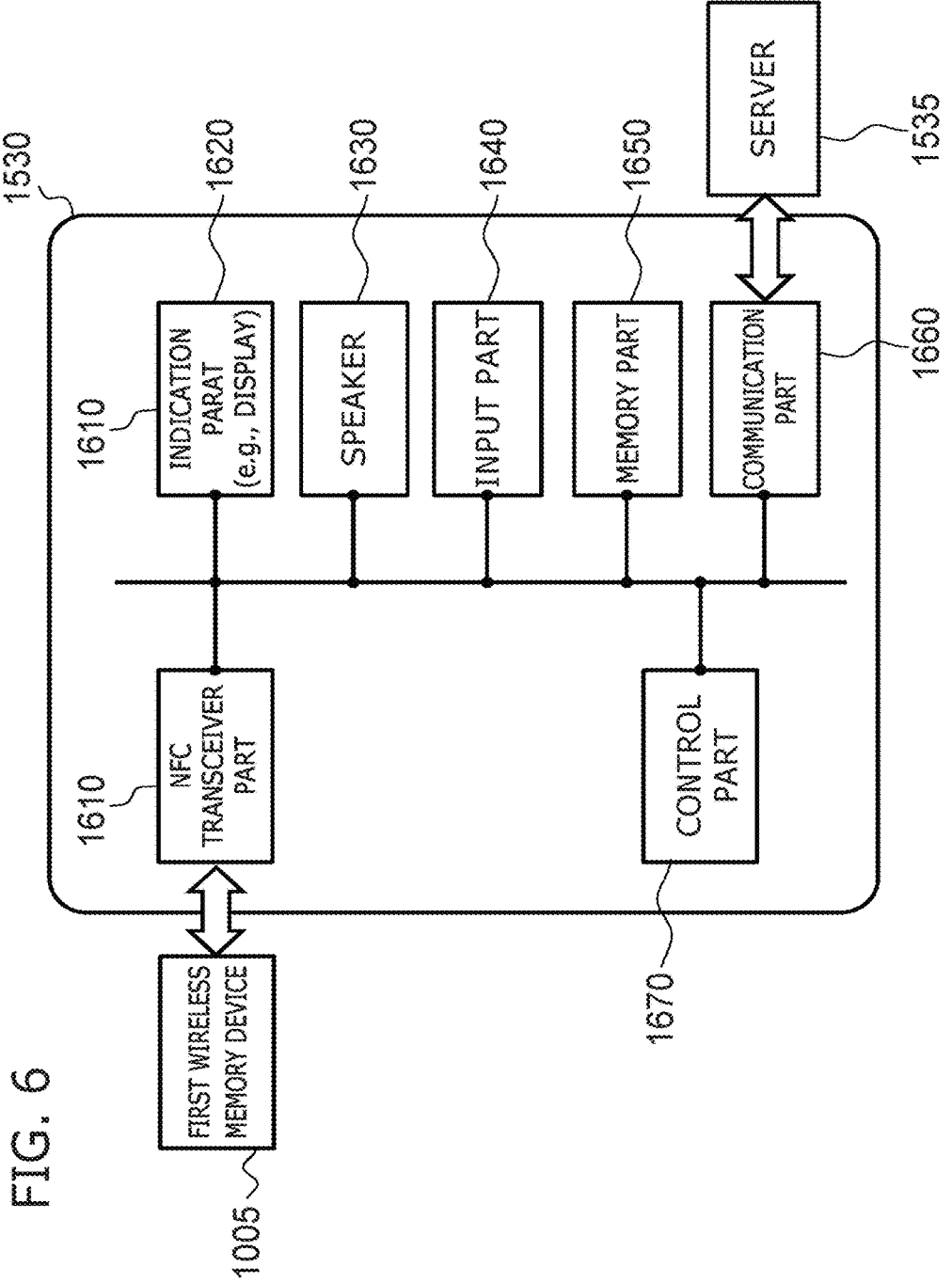
FIG. 6 is a block diagram schematically showing a base station according to the first embodiment.

FIG. 6 is a block diagram schematically showing the base station 1530.

The base station 1530 includes an NFC transceiver part 1610, an indication part (display) 1620, a speaker 1630, an input part 1640, a memory part 1650, a communication part 1660, and a control part 1670.

The NFC transceiver part 1610 performs NFC communication with the outside of the base station 1530 in accordance with the instruction of the control part 1670. For instance, the NFC transceiver part 1610 performs NFC communication with the first wireless memory device 1005.

The indication part 1620 is e.g. an arbitrary display such as a liquid crystal display and an organic EL display. For instance, the indication part 1620 indicates that NFC communication is underway during NFC communication. The indication part 1620 indicates the completion of communication when the communication is completed.

The speaker 1630 rings a sound in accordance with the instruction of the control part 1670.

The input part 1640 is e.g. a keyboard or button. Alternatively, the input part 1640 is a touch panel in the case where the indication part 1620 is a display doubling as a touch panel.

The memory part 1650 includes arbitrary memory elements such as HDDs, SSDs, and flash memories. The memory part 1650 stores e.g. data to be transmitted to the outside. This data includes e.g. the audio data and video data of the character.

The communication part 1660 communicates with e.g. the server 1535 outside the base station 1530 through wireline or wireless communication in accordance with the instruction of the control part 1670. The communication part 1660 obtains data to be stored in the memory part 1650 from the external server 1535.

The control part 1670 controls the NFC transceiver part 1610, the indication part 1620, the speaker 1630, the input part 1640, the memory part 1650, and the communication part 1660.

Figure 7B:
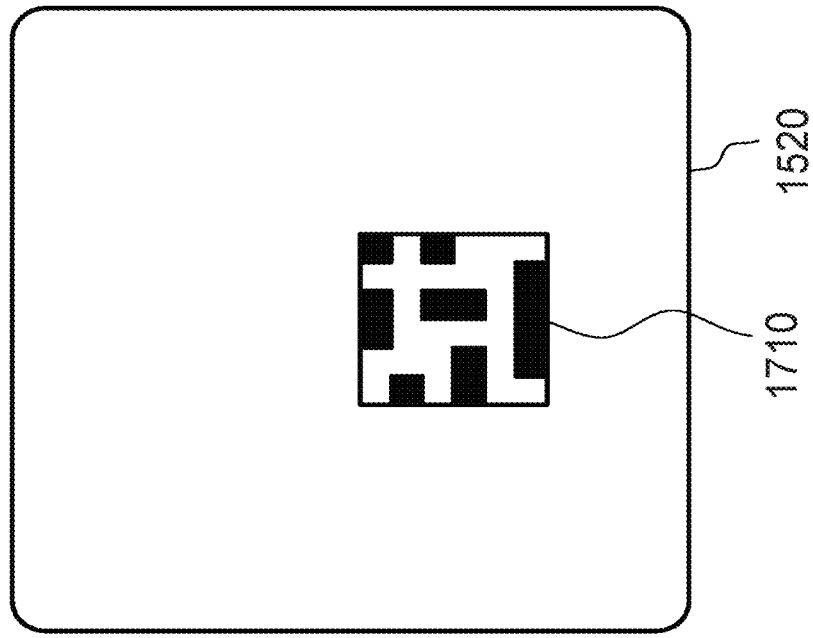
FIG. 7B is a schematic plan view showing a rear surface of a schematic example of the first accessory according to the first embodiment.
Figure 7A:
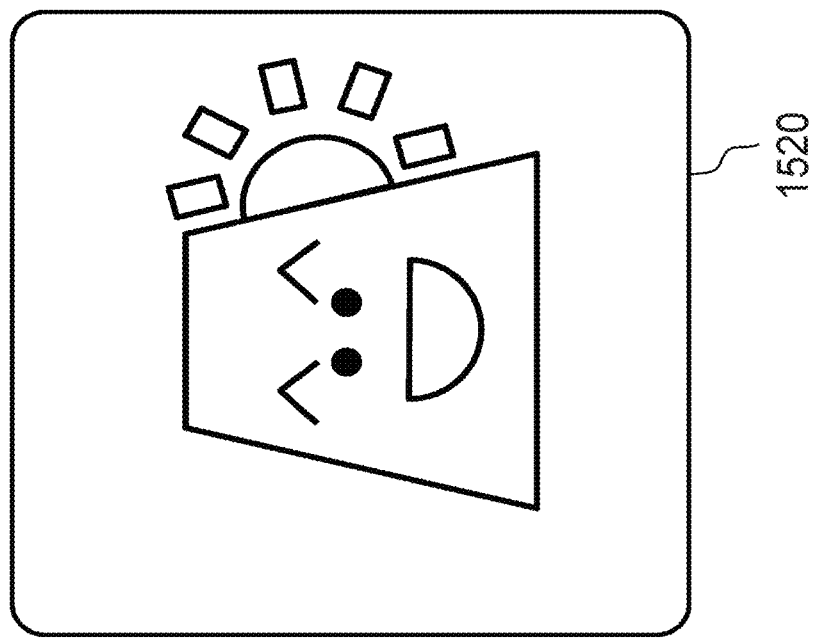
FIG. 7A is a schematic plan view showing a front surface of a schematic example of the first accessory according to the first embodiment.

FIGS. 7A and 7B are schematic plan views showing the front surface and the rear surface of a schematic example of the first accessory 1520.

The first accessory 1520 is e.g. a card with a character depicted thereon.

As shown in FIG. 7A, the first accessory 1520 has e.g. one character depicted thereon. The first accessory 1520 is not limited thereto. A plurality of characters may be depicted on one first accessory 1520.

As shown in FIG. 7B, the first accessory 1520 has a code 1710 on its rear surface. The code 1710 can be sensed using the code recognition part 1320 provided in the first communication terminal 1015.

The code 1710 can be a code similar to the code 1120.

One first accessory 1520 stores information on the depicted character. The first accessory 1520 stores this information in e.g. the code 1710.

The first accessory 1520 is not limited thereto. For instance, the first accessory 1520 may include an NFC chip or NFC tag, which may store such information. In this case, the first accessory 1520 does not need to have the code 1710 on the rear surface. In the case of an NFC chip or NFC tag, the data can be changed later. This has the advantage of e.g. facilitating upgrade of the character on the game system.

The first accessory 1520 is not limited to cards. The first accessory 1520 may be a keychain, strap, or medal.

(Method for Operating the First Wireless Memory Device)

Operation examples of the first wireless memory device 1005 according to this embodiment are described below with reference to FIGS. 8 to 21. For convenience of description, the terminal communicating with the first wireless memory device 1005 through the connection terminal 1065 is referred to as first host (first communication terminal) 1800. The terminal communicating with the first wireless memory device 1005 through the first wireless antenna is referred to as second host 1850. One of the second wireless memory device 1510, the third communication terminal 1019, and the base station 1530 is generically referred to as second host 1850. The description of the matters common to different operation examples is omitted in the later operation examples without specific notice for the content described in the previous operation example.

First Operation Example

Figure 8:
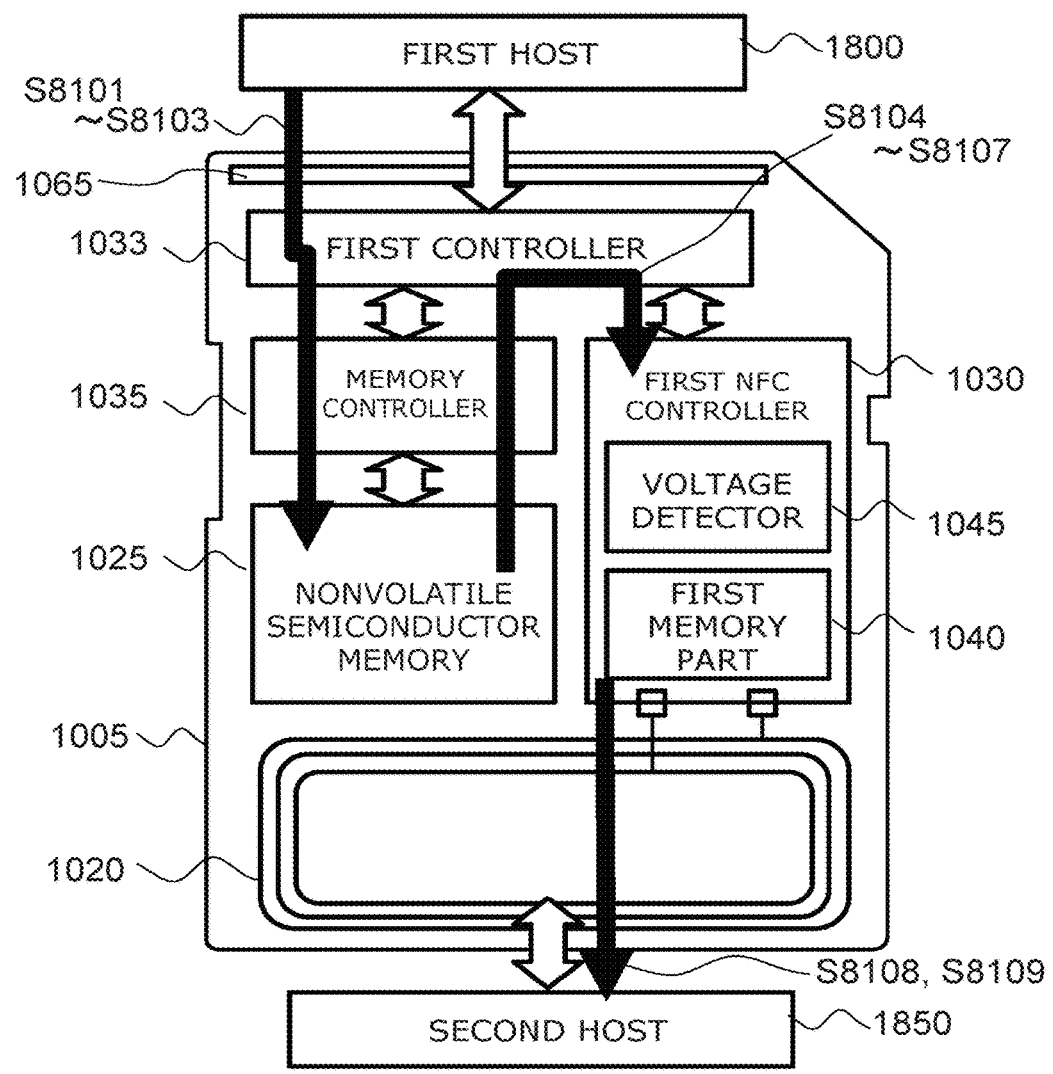
FIG. 8 is the block diagram showing a flow of data in a first operation example of the first wireless memory device according to the first embodiment.
Figure 9:
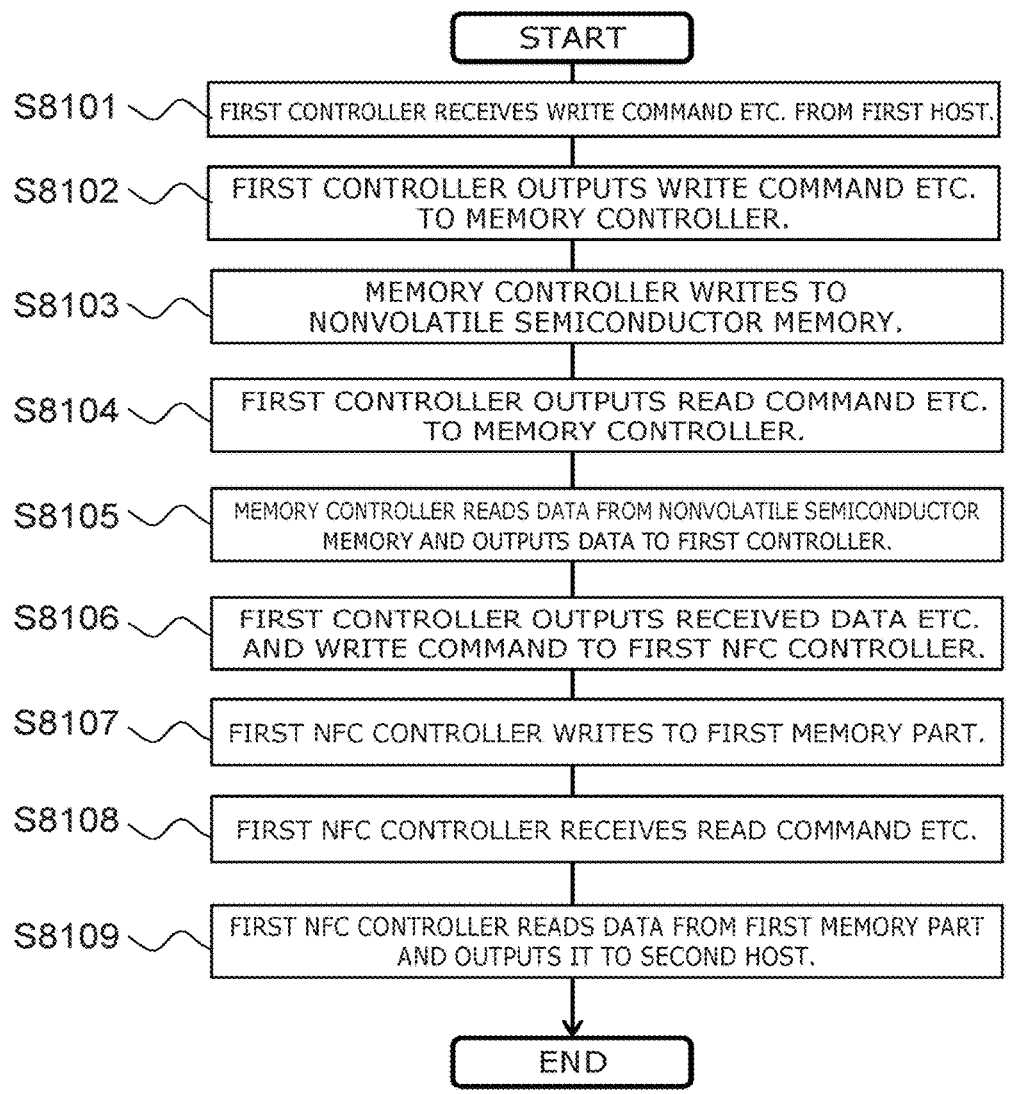
FIG. 9 is a flow chart showing a first operation example of the first wireless memory device according to the first embodiment.

FIG. 8 schematically shows the flow of data in a first operation example. FIG. 9 illustrates the first operation example as a flow chart.

In the first operation example, the data stored in the nonvolatile semiconductor memory 1025 from the first host 1800 is stored in the first memory part 1040. The second host 1850 reads data from the first memory part 1040.

In step S8101, the first controller 1033 receives a write command CMD, an address ADD, and data DAT from the first host 1800 through the connection terminal 1065.

In step S8102, the first controller 1033 outputs a write command CMD, an address ADD, and data DAT to the memory controller 1035. As described above, the write commands CMD in step S8101 and step S8102 do not need to coincide in form. This also applies to the address ADD and data DAT. Furthermore, this also applies to the following description unless otherwise specified.

In step S8103, the memory controller 1035 writes to the nonvolatile semiconductor memory 1025 based on e.g. the received command CMD.

In step S8104, the first controller 1033 outputs a read command CMD and an address ADD to the memory controller 1035.

In step S8105, the memory controller 1035 reads data DAT from the nonvolatile semiconductor memory 1025 based on e.g. the read command CMD and outputs it to the first controller.

In step S8106, the first controller 1033 outputs the received data DAT, a write command CMD, and an address ADD to the first NFC controller 1030.

In step S8107, the first NFC controller 1030 writes data DAT to the first memory part 1040 based on e.g. the received write command CMD.

In step S8108, the first NFC controller 1030 receives a read command CMD and an address ADD from the second host 1850 through the first wireless antenna 1020.

In step S8109, the first NFC controller 1030 reads data DAT from the first memory part 1040 based on e.g. the received read command CMD. The first NFC controller 1030 outputs data DAT to the second host 1850 through the first wireless antenna 1020.

The above procedure does not necessarily need to be performed continuously, but the steps may be separated temporally from each other.
(Variation of the First Operation Example)

A variation of the first operation example is described below.

In steps S8107-S8109 of the above operation example, the first wireless memory device 1005 is operable only by supply of power from the second host 1850 through the first wireless antenna 1020.

After step S8103, step S8104 and the subsequent steps may be processed after receiving input of e.g. a command from the second host 1850. In this case, only the data needed by the second host 1850 can be moved from the nonvolatile semiconductor memory 1025 to the first memory part 1040. In this case, step S8108 may be omitted.
(Data Stored in the First Memory Part)

In this operation example, the data DAT written in step S8106 and step S8107 (hereinafter referred to as DAT2 for convenience) does not necessarily need to coincide with the data DAT written in step S8103 (hereinafter referred to as DAT1 for convenience). That is, the data stored in the nonvolatile semiconductor memory 1025 does not need to coincide with the data stored in the first memory part 1040. This also applies to the following operation examples.

For instance, DAT2 may be part of DAT1. DAT2 may be data obtained by processing the data of DAT1. For instance, in the case where DAT1 is image data, DAT2 may be image data obtained by compressing DAT1. In the case where DAT2 is sound data, DAT2 may be a further compressed sound, or an initial portion of the sound data.

DAT2 may be data that is not necessarily in direct relation to DAT1. For instance, DAT1 may be the recognition ID of the first accessory 1520. In this case, DAT2 may be only the information of the kind of the first accessory 1520. More specifically, the first accessory 1520 may be a keychain of "flame sword". In this case, DAT1 may be a unique product ID corresponding to this keychain, and DAT2 may be flag information corresponding to "flame sword" (information representing the ownership of a flame sword). That is, DAT2 is data on the information of DAT1, and DAT2 includes metadata.

In another example, the first accessory 1520 may be a card of a monster, and DAT1 may be e.g. sound data corresponding to the monster or the recognition ID of the card. In this case, DAT2 may be flag information corresponding to the monster (information representing the ownership of the card of the monster).

In another example, DAT1 may be GPS-based positional information on the earth. In this case, DAT2 may be flag information representing passage through a place corresponding to the GPS information (e.g., a passage point in a game).

Thus, the data stored in the nonvolatile semiconductor memory 1025 does not necessarily coincide with the data stored in the first memory part 1040. Three methods for extracting the data to be stored in the first memory part 1040 are now described as a specific example.

As a first method, the first host 1800 outputs a special command CMD, an address ADD, data DAT and the like to the first controller 1033. In this method, the address ADD and data DAT specify which data is to be transferred to the first memory part 1040.

The first controller 1033 uses the memory controller 1035 to read the specified data from the nonvolatile semiconductor memory 1025. Furthermore, the first controller 1033 outputs the read data to the first NFC controller 1030 and uses the first NFC controller to write data to the first memory part 1040. This method can transfer data as intended by the user.

Next, as a second method, a configuration file is previously stored in the nonvolatile semiconductor memory 1025. In this method, the first controller 1033 uses the memory controller 1035 to read the configuration file when the nonvolatile semiconductor memory 1025 is made operable (e.g., when the first wireless memory device 1005 is powered by the first host 1800). Then, the first controller 1033 transmits data to the first memory part 1040 based on the read configuration file.

The configuration file includes one or more configurations of various conditions for e.g. the file name (e.g., beginning with a specific letter), the extension (e.g., a specific extension), the order of date (e.g., ten from the latest), or only the flag information. The first controller 1033 uses the first NFC controller 1030 to write the data satisfying the condition to the first memory part 1040. The first controller 1033 may write only the changed portion to the first memory part 1040. Alternatively, the first controller 1033 may rewrite all the data each time.

The method for reading data from the nonvolatile semiconductor memory 1025 and storing data in the first memory part 1040 is similar to the first method. Thus, the description thereof is omitted.

Furthermore, as a third method, a configuration file may be stored in the first memory part 1040. In this case, the configuration file can be written even when powered only by the second host 1850.

When the first controller 1033 is powered by the first host 1800, the first controller 1033 reads the configuration file from the first memory part 1040. At this time, the first controller 1033 may store the configuration file in the nonvolatile semiconductor memory 1025.

The subsequent flow is similar to the second method. Thus, the description thereof is omitted.

As described above, various methods can be used to extract the data to be stored in the first memory part 1040. It is understood that the above description is not intended to limit the extraction method to these three methods.

Second Operation Example

Figure 10:
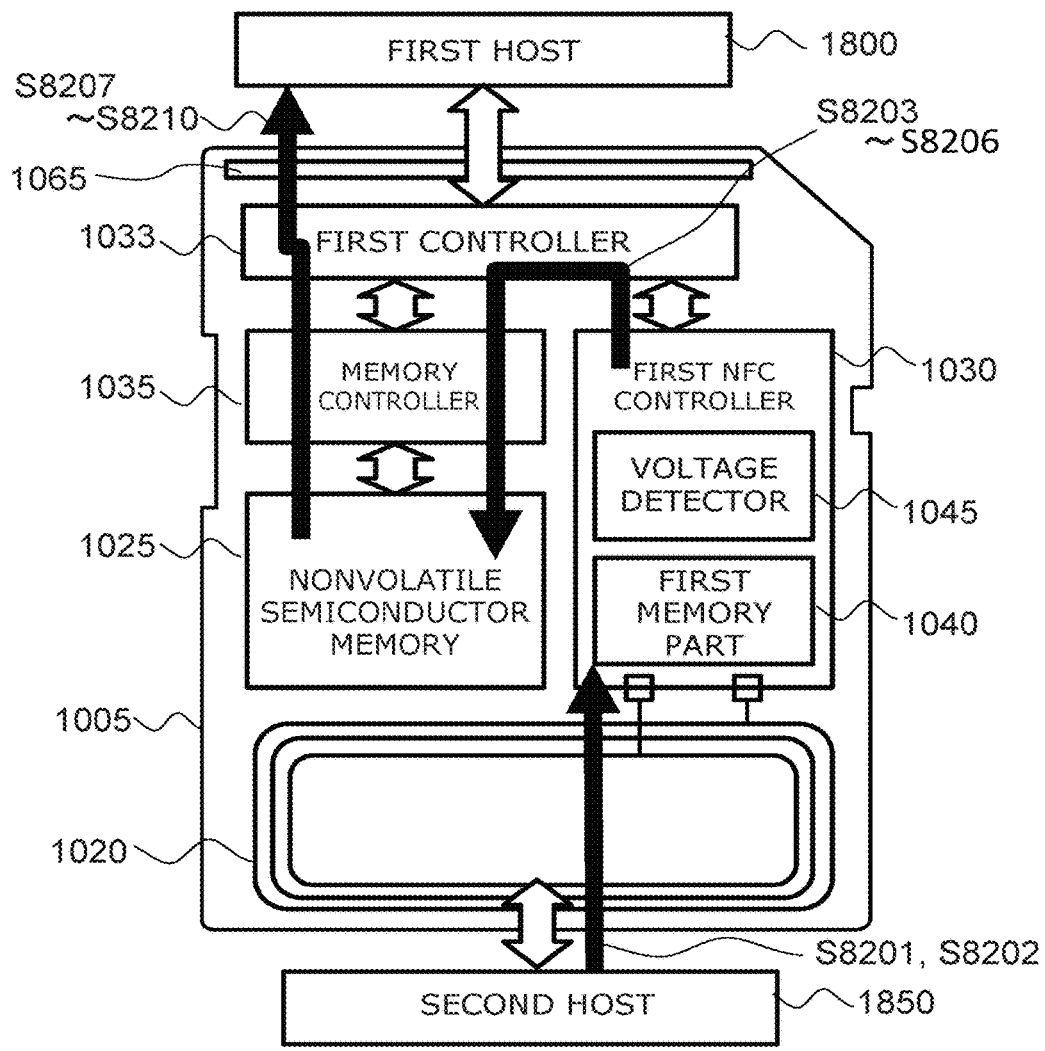
FIG. 10 is the block diagram showing a flow of data in a second operation example of the first wireless memory device according to the first embodiment.
Figure 11:
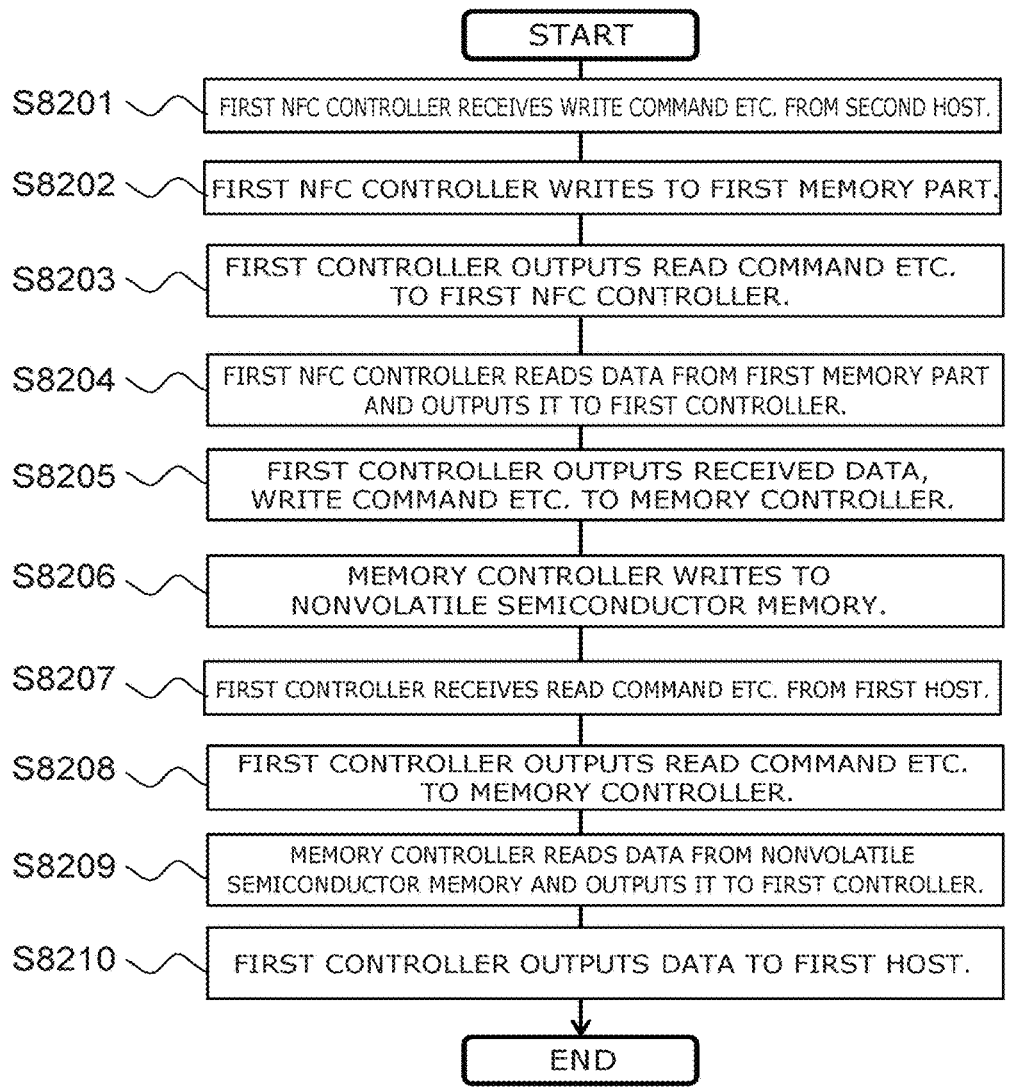
FIG. 11 is a flow chart showing the second operation example of the first wireless memory device according to the first embodiment.

FIG. 10 schematically shows the flow of data in a second operation example. FIG. 11 illustrates the second operation example as a flow chart.

In the second operation example, the data stored in the first memory part 1040 from the second host 1850 is stored in the nonvolatile semiconductor memory 1025. The first host 1800 reads data from the nonvolatile semiconductor memory 1025.

In step S8201, the first NFC controller 1030 receives a write command CMD, an address ADD, and data DAT from the second host 1850 through the first wireless antenna 1020.

In step S8202, the first NFC controller 1030 writes data to the first memory part 1040.

In step S8203, the first controller 1033 outputs a read command CMD and an address ADD to the first NFC controller 1030.

In step S8204, the first NFC controller 1030 reads data DAT from the first memory part 1040 based on e.g. the read command CMD. The first NFC controller 1030 outputs data DAT to the first controller.

In step S8205, the first controller 1033 outputs the read data DAT, a write command CMD, and an address ADD to the memory controller 1035.

In step S8206, the memory controller 1035 writes data to the nonvolatile semiconductor memory 1025 based on the write command CMD.

In step S8207, the first controller 1033 receives a read command CMD and an address ADD from the first host 1800 through the connection terminal 1065.

In step S8208, the first controller 1033 outputs a read command CMD and an address ADD to the memory controller 1035.

In step S8209, the memory controller 1035 reads data from the nonvolatile semiconductor memory 1025 based on e.g. the read command CMD. The memory controller 1035 outputs data to the first controller 1033.

In step S8210, the first controller 1033 outputs data to the first host 1800 through the connection terminal.

The above procedure does not necessarily need to be performed continuously, but the steps may be separated temporally from each other.
(Variation of the Second Operation Example)

A variation of the second operation example is described below.

In steps S8201-S8202 of the above operation example, the first wireless memory device 1005 is operable only by supply of power from the second host 1850 through the first wireless antenna 1020.

After step S8202, step S8203 and the subsequent steps may be processed after receiving input of e.g. a command from the first host 1800. In this case, only the data needed by the first host 1800 can be moved from the first memory part 1040 to the nonvolatile semiconductor memory 1025. In this case, step S8207 may be omitted.

After step S8202, step S8203 and the subsequent steps may be processed after power is supplied from the first host.

In step S8209, the memory controller 1035 may perform output directly to the first host 1800. That is, the memory controller 1035 may perform output directly to the first host 1800 through the connection terminal 1065.

Third Operation Example

Figure 12:
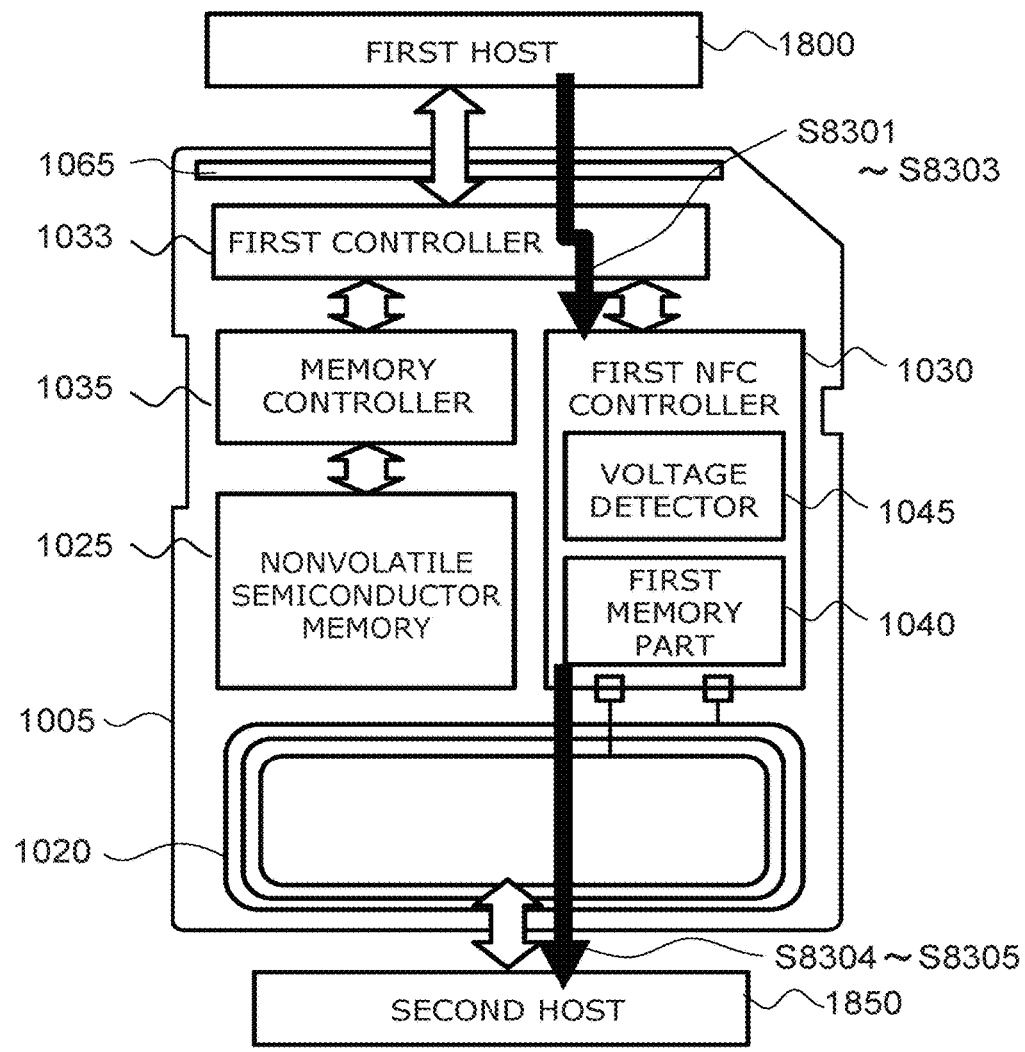
FIG. 12 is the block diagram showing a flow of data in a third operation example of the first wireless memory device according to the first embodiment.
Figure 13:
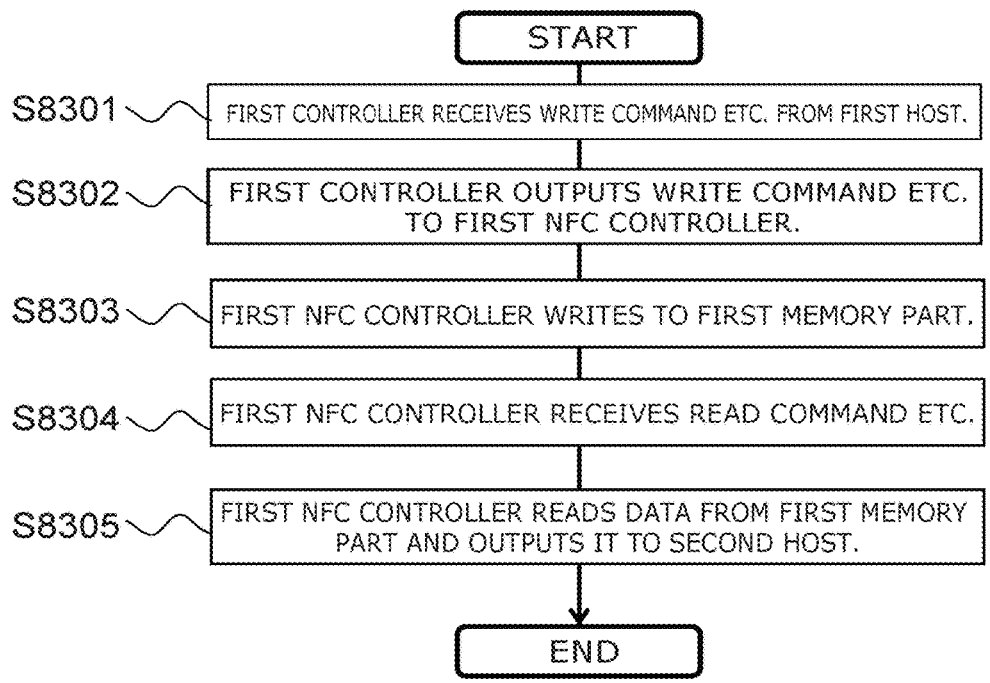
FIG. 13 is a flow chart showing the third operation example of the first wireless memory device according to the first embodiment.

FIG. 12 schematically shows the flow of data in a third operation example. FIG. 13 illustrates the third operation example as a flow chart.

In the third operation example, data is stored in the first memory part 1040 from the first host 1800. The second host 1850 reads data from the first memory part 1040.

In step S8301, the first controller 1033 receives a write command CMD, an address ADD, and data DAT from the first host 1800 through the connection terminal 1065.

In step S8302, the first controller 1033 outputs a write command CMD, an address ADD, and data DAT to the first NFC controller 1030.

In step S8303, the first NFC controller 1030 writes data DAT to the first memory part 1040 based on e.g. the write command.

In step S8304, the first NFC controller 1030 receives a read command CMD and an address ADD from the second host 1850 through the first wireless antenna 1020.

In step S8305, the first NFC controller 1030 reads data DAT from the first memory part 1040 and outputs data to the second host 1850.

The above procedure does not necessarily need to be performed continuously, but the steps may be separated temporally from each other.
(Variation of the Third Operation Example)

A variation of the third operation example is described below.

In steps S8303-S8305 of the above operation example, the first wireless memory device 1005 is operable only by supply of power from the second host 1850 through the first wireless antenna 1020.

Fourth Operation Example

Figure 14:
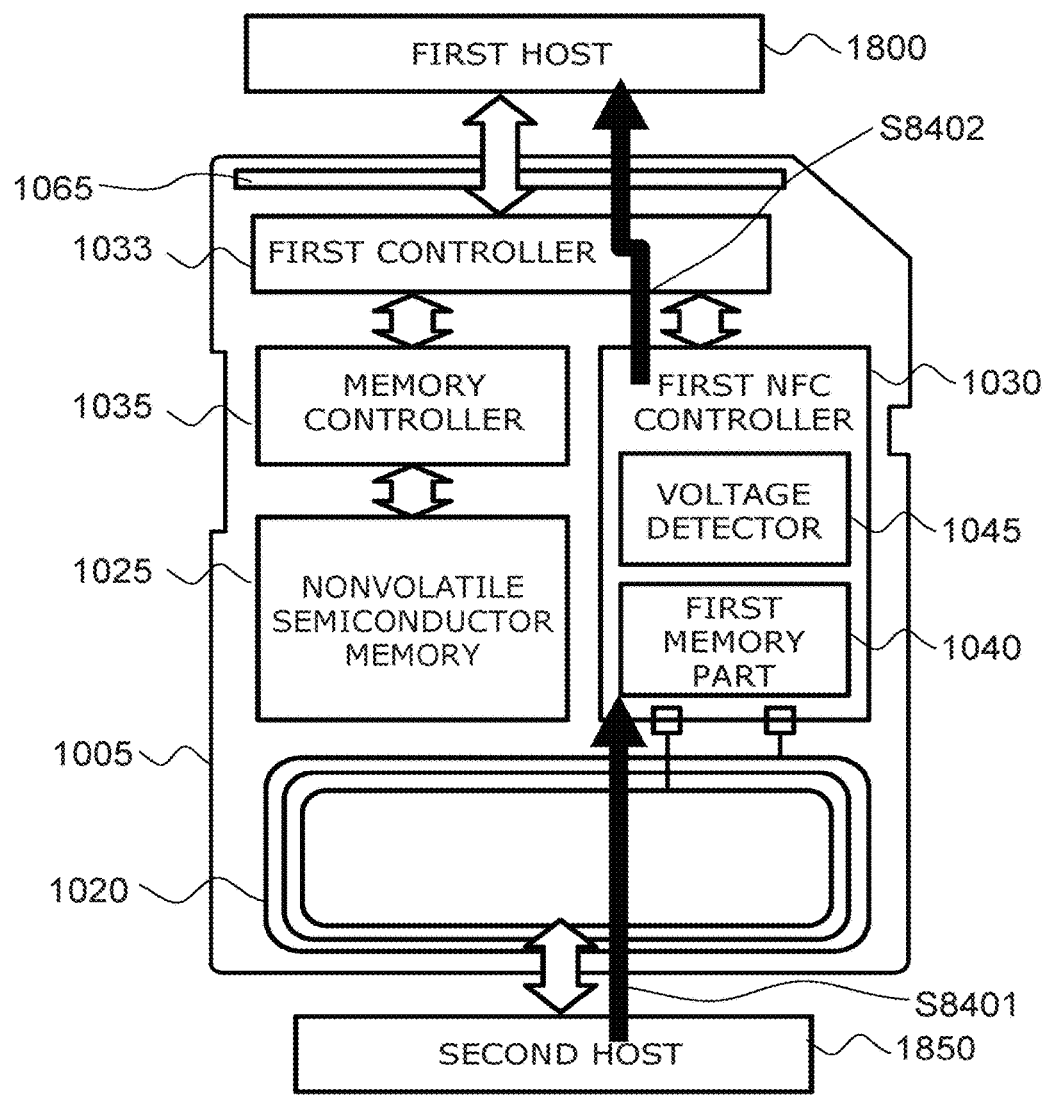
FIG. 14 is the block diagram showing a flow of data in a fourth operation example of the first wireless memory device according to the first embodiment.
Figure 15:
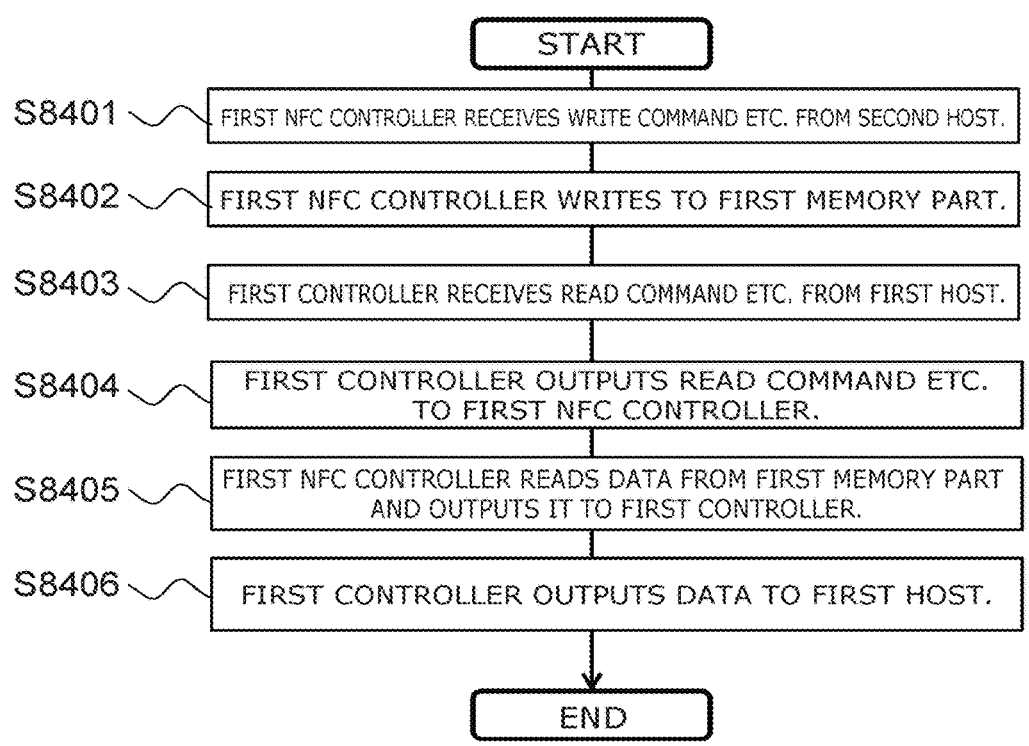
FIG. 15 is a flow chart showing the fourth operation example of the first wireless memory device according to the first embodiment.

FIG. 14 schematically shows the flow of data in a fourth operation example. FIG. 15 illustrates the fourth operation example as a flow chart.

In the fourth operation example, data is stored in the first memory part 1040 from the second host 1850. The first host 1800 reads data from the first memory part 1040.

In step S8401, the first NFC controller 1030 receives a write command CMD, an address ADD, and data DAT from the second host 1850 through the first wireless antenna 1020.

In step S8402, the first NFC controller 1030 writes data to the first memory part 1040.

In step S8403, the first controller 1033 receives a read command CMD and an address ADD from the first host 1800 through the connection terminal 1065.

In step S8404, the first controller 1033 outputs a read command CMD and an address ADD to the first NFC controller 1030.

In step S8405, the first NFC controller 1030 reads data from the first memory part 1040 based on e.g. the read command CMD. The first NFC controller 1030 outputs data to the first controller 1033.

In step S8406, the first controller 1033 outputs data to the first host 1800 through the connection terminal.

The above procedure does not necessarily need to be performed continuously, but the steps may be separated temporally from each other.

(Variation of the Fourth Operation Example)

A variation of the fourth operation example is described below.

In steps S8303-S8305 of the above operation example, the first wireless memory device 1005 is operable only by supply of power from the second host 1850 through the first wireless antenna 1020.

Fifth Operation Example

Figure 16:
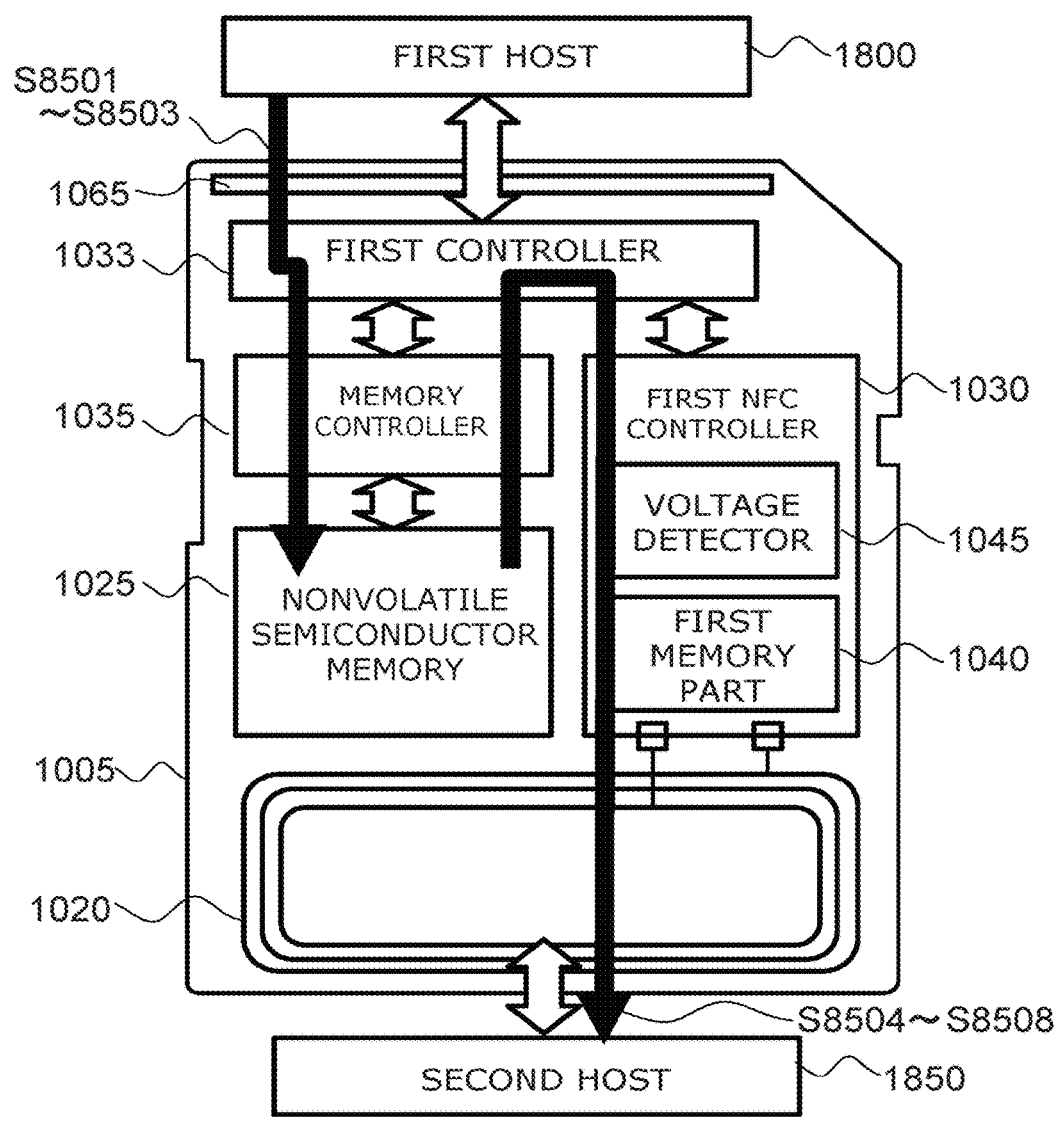
FIG. 16 is the block diagram showing a flow of data in a fifth operation example of the first wireless memory device according to the first embodiment.
Figure 17:
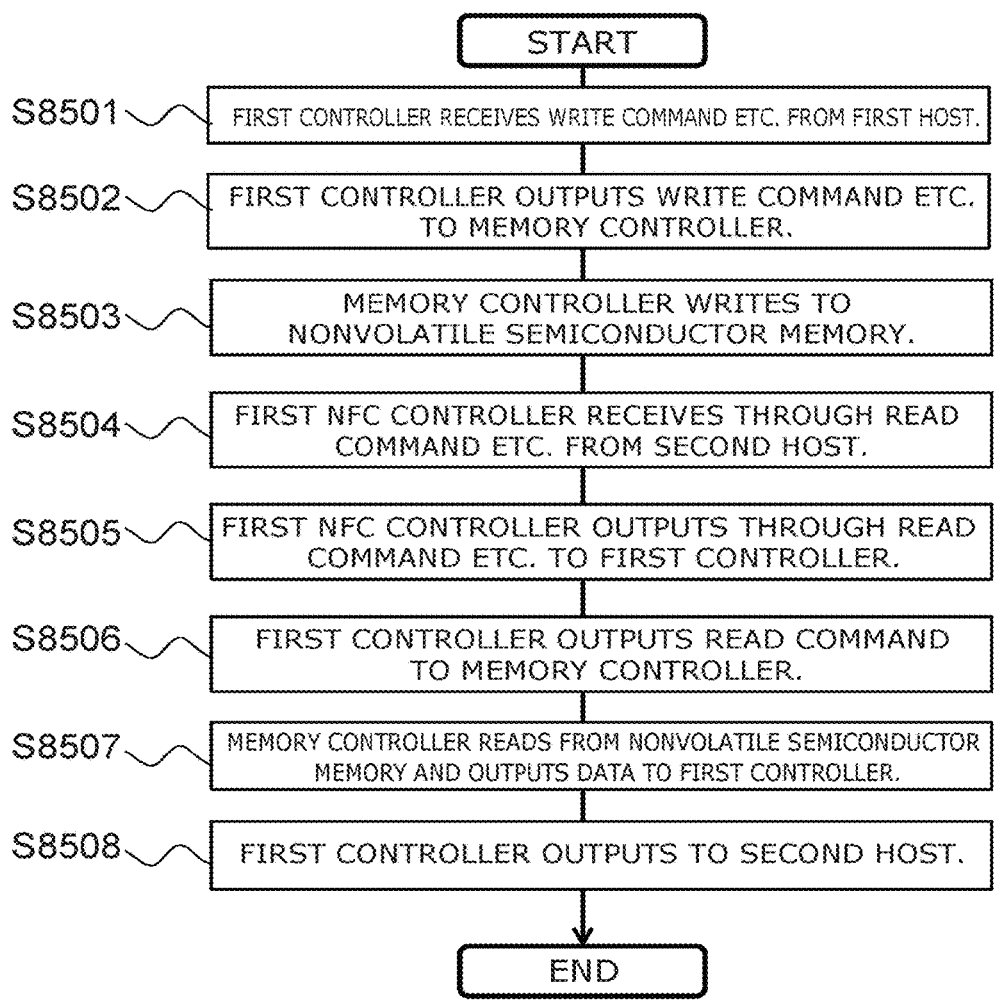
FIG. 17 is a flow chart showing the fifth operation example of the first wireless memory device according to the first embodiment.

FIG. 16 schematically shows the flow of data in a fifth operation example. FIG. 17 illustrates the fifth operation example as a flow chart.

In the fifth operation example, the data stored in the nonvolatile semiconductor memory 1025 from the first host 1800 is outputted to the second host 1850 without being stored in the first memory part 1040.

In step S8501, the first controller 1033 receives a write command CMD, an address ADD, and data DAT from the first host 1800 through the connection terminal 1065.

In step S8502, the first controller 1033 outputs a write command CMD, an address ADD, and data DAT to the memory controller 1035.

In step S8503, the memory controller 1035 writes to the nonvolatile semiconductor memory 1025 based on e.g. the received command CMD.

In step S8504, the first NFC controller 1030 receives a through read command CMD and an address ADD from the second host 1850 through the first wireless antenna 1020. The through read command CMD is a special command for outputting the data in the nonvolatile semiconductor memory 1025 to the second host 1850 without storing the data in the first memory part 1040.

In step S8505, the first NFC controller 1030 outputs a through read command CMD and an address ADD to the first controller 1033.

In step S8506, based on e.g. the address ADD, the first controller 1033 outputs a read command CMD and an address ADD to the memory controller 1035. This read command CMD does not need to be a special command, but may be a read command as in the aforementioned operation examples.

In step S8507, the memory controller 1035 reads data DAT from the nonvolatile semiconductor memory 1025 based on e.g. the read command CMD and outputs it to the first controller.

In step S8508, the first controller 1033 outputs the received data DAT to the second host 1850 through the first NFC controller 1030 and the first wireless antenna 1020.

Alternatively, the first controller 1033 may output the data to the second host 1850 through the first wireless antenna 1020 without the intermediary of the first NFC controller 1030.

The above procedure does not necessarily need to be performed continuously, but the steps may be separated temporally from each other.

Sixth Operation Example

Figure 18:
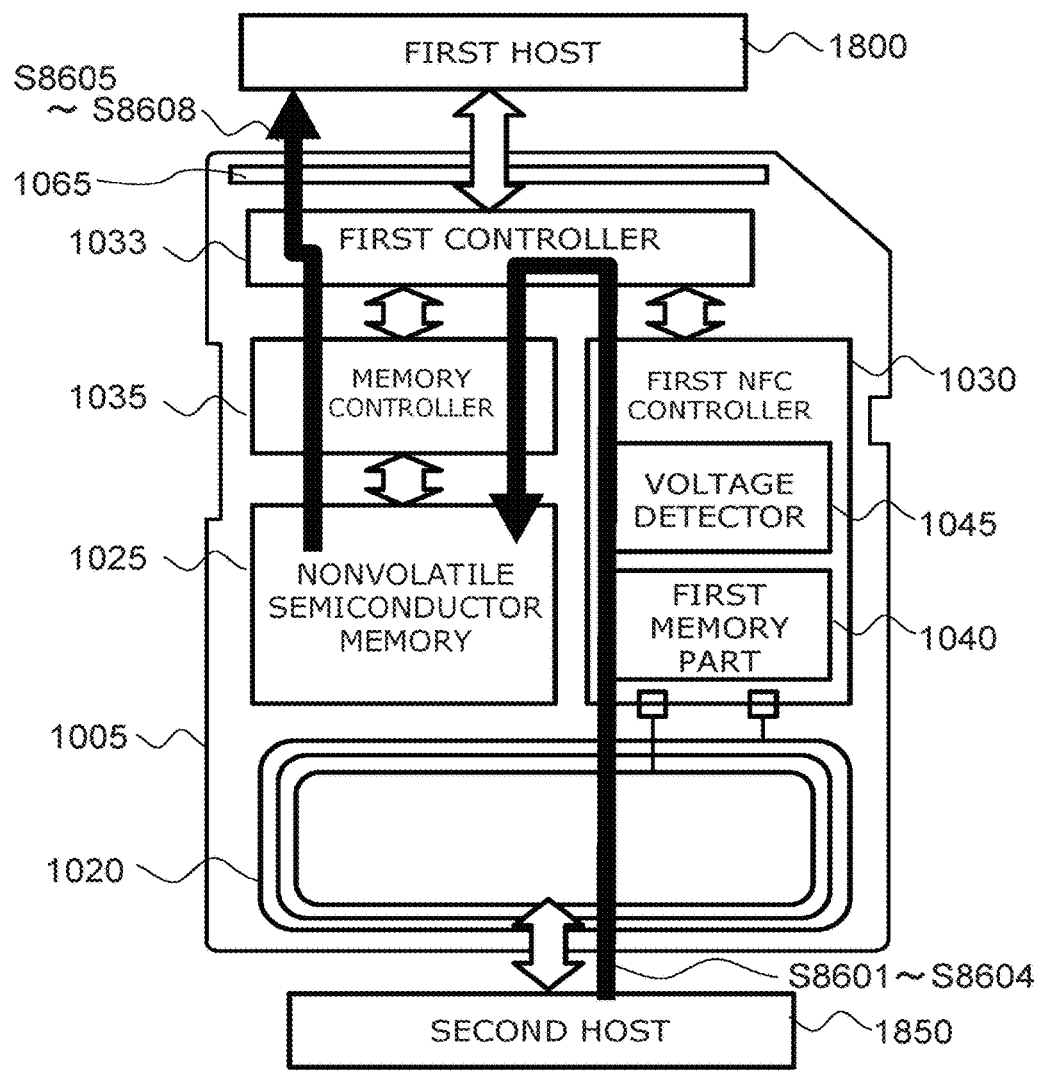
FIG. 18 is the block diagram showing a flow of data in a sixth operation example of the first wireless memory device according to the first embodiment.
Figure 19:
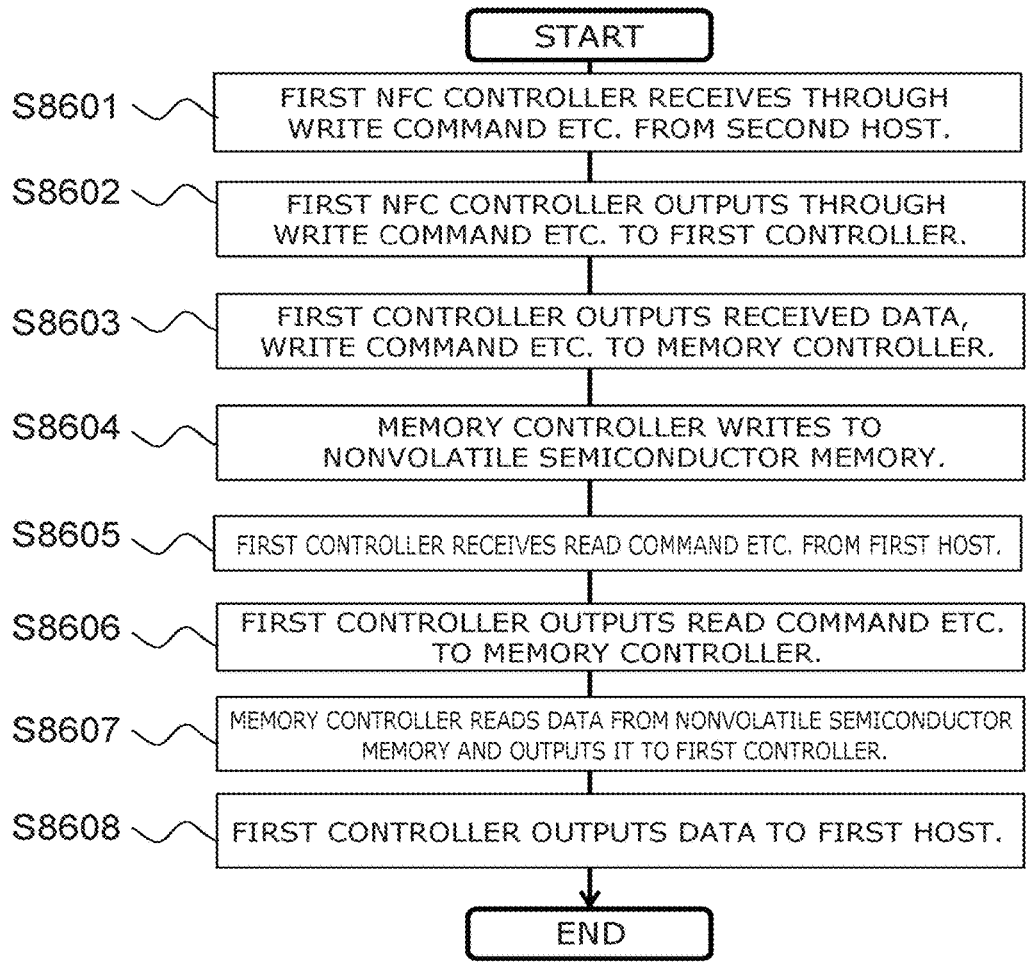
FIG. 19 is a flow chart showing the sixth operation example of the first wireless memory device according to the first embodiment.

FIG. 18 schematically shows the flow of data in a sixth operation example. FIG. 19 illustrates the sixth operation example as a flow chart.

In the sixth operation example, data is stored in the nonvolatile semiconductor memory 1025 from the second host 1850 without being stored in the first memory part 1040. The first host 1800 reads data from the nonvolatile semiconductor memory 1025.

In step S8601, the first NFC controller 1030 receives a through write command CMD, an address ADD, and data DAT from the second host 1850 through the first wireless antenna 1020. The through write command CMD is a special command for storing the data from the second host 1850 in the nonvolatile semiconductor memory 1025 without storing the data in the first memory part 1040.

In step S8602, the first NFC controller 1030 outputs a through write command CMD, an address ADD, and data DAT to the first controller 1033.

In step S8603, the first controller 1033 outputs a write command CMD, an address ADD, and data DAT to the memory controller 1035. This write command CMD does not need to be a special command, but may be a write command as in the aforementioned operation examples.

In step S8604, the memory controller 1035 writes data to the nonvolatile semiconductor memory 1025 based on e.g. the write command CMD.

In step S8605, the first controller 1033 receives a read command CMD and an address ADD from the first host 1800 through the connection terminal 1065.

In step S8606, the first controller 1033 outputs a read command CMD and an address ADD to the memory controller 1035.

In step S8607, the memory controller 1035 reads data from the nonvolatile semiconductor memory 1025 based on e.g. the read command CMD. The memory controller 1035 outputs data to the first controller 1033.

In step S8608, the first controller 1033 outputs data to the first host 1800 through the connection terminal.

The above procedure does not necessarily need to be performed continuously, but the steps may be separated temporally from each other.

(Variation of the Sixth Operation Example)

A variation of the sixth operation example is described below.

In step S8607, the memory controller 1035 may perform output directly to the first host 1800. That is, the memory controller 1035 may perform output directly to the first host 1800 through the connection terminal 1065.

Seventh Operation Example

Figure 20:
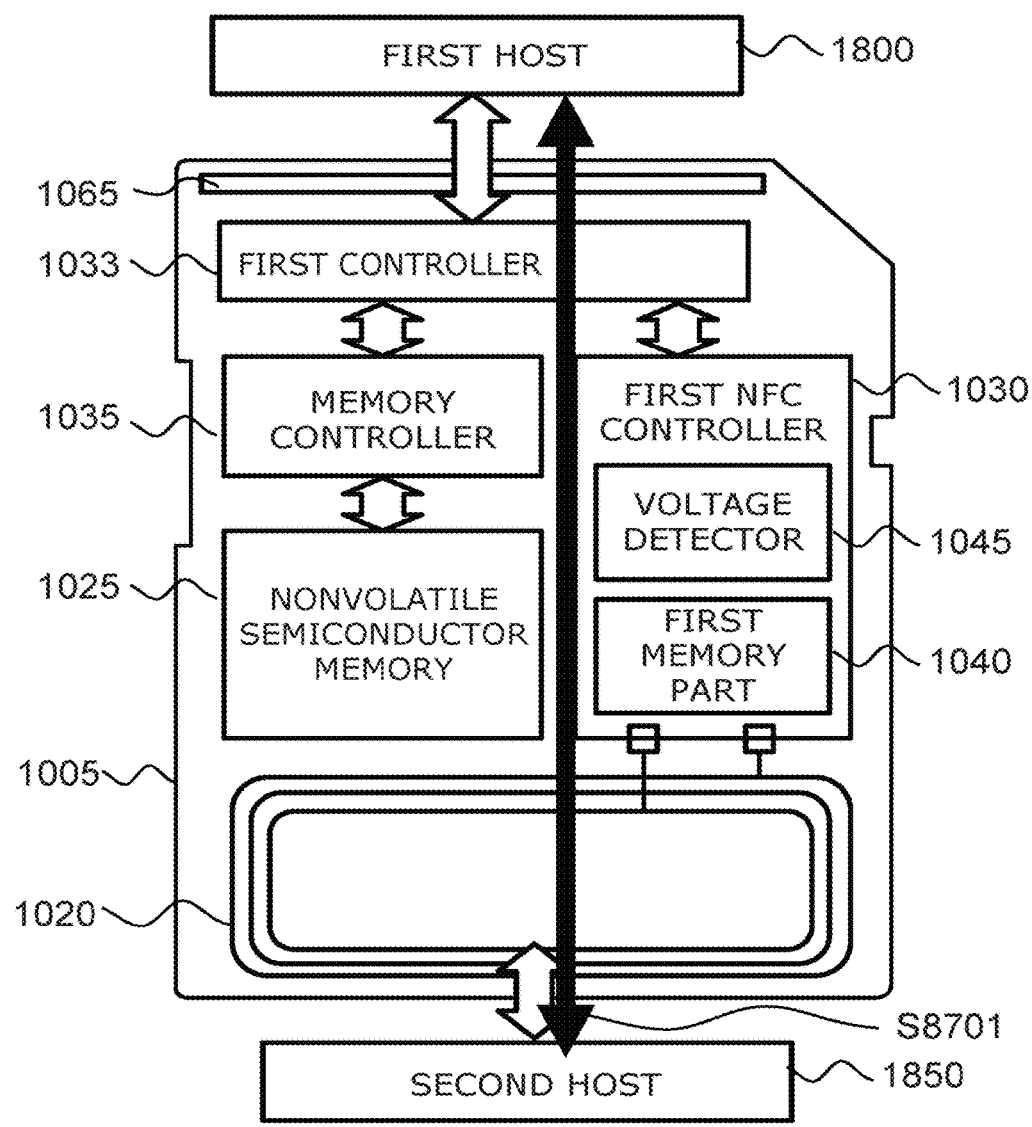
FIG. 20 is the block diagram showing a flow of data in a seventh operation example of the first wireless memory device according to the first embodiment.

FIG. 20 schematically shows the flow of data in a seventh operation example.

In the seventh operation example, the first host 1800 and the second host 1850 communicate with each other through the first wireless memory device 1005.

The first host 1800 can communicate with the first wireless memory device 1005 through the connection terminal 1065. The second host 1850 can communicate with the first wireless memory device 1005 through the first wireless antenna 1020. The connection terminal 1065 and the first wireless antenna 1020 can communicate with each other through the first controller 1033 and the first NFC controller 1030.

That is, the first host 1800 can communicate with the second host 1850 through the first wireless memory device 1005. The communication may completely pass through the first wireless memory device 1005. Alternatively, the first wireless memory device 1005 may convert part of the command CMD, address ADD, data DAT and the like.

By using the seventh operation example, the first communication terminal 1015 can communicate with the base station 1530 by NFC communication through the first wireless memory device 1005. That is, the first communication terminal 1015 itself does not have the NFC communication function. However, by using the seventh operation example, the first communication terminal 1015 can perform NFC communication with the base station 1530.

FIGS. 21 to 27 are timing charts schematically showing the time series of commands and data of the first to seventh operation examples, respectively. For convenience, the encircled numbers shown in each timing chart have the following meaning. The upper digit X of X-Y means as follows. The case of X=1 indicates exchanging a command CMD between the first host 1800 and the first controller 1033. The case of X=2 indicates exchanging a command CMD between the first controller 1033 and the nonvolatile semiconductor memory 1025. The case of X=3 indicates exchanging a command CMD between the first controller 1033 and the first memory part 1040. The case of X=4 indicates exchanging a command CMD between the first memory part 1040 and the second host 1850. The case of X=5 indicates exchanging a command CMD between the first host 1800 and the first memory part 1040. The case of X=6 indicates exchanging a command CMD between the nonvolatile semiconductor memory 1025 and the second host 1850. The case of X=7 indicates exchanging a command CMD between the second host 1850 and the first controller 1033. The case of X=8 indicates exchanging a command CMD between the first controller 1033 and the first host 1800. The lower digit Y means as follows. The case of Y=1 indicates that the command CMD is a write command (Write). The case of Y=2 indicates that the command CMD is a read command (Read). For instance, the label "1-1" indicates that the command CMD performs write operation between the first host 1800 and the first controller 1033.

FIG. 21 shows the first operation example. First, the first host 1800 outputs a write command CMD (1-1). Then, the first host 1800 transmits data DATA to the first controller 1033. The first controller 1033 interprets the command CMD and writes data DATA to the nonvolatile semiconductor memory 1025 through the memory controller 1035 (2-1). Then, the first controller 1033 outputs the written data DATA through the memory controller 1035 (2-2). The first controller 1033 writes data DATA to the first memory part 1040 through the first NFC controller 1030 (3-1). The second host 1850 transmits a read command CMD to the first NFC controller 1030 (4-2). The second host 1850 reads data DATA from the first memory part 1040 using the first NFC controller 1030.

FIG. 22 shows the second operation example. The second host 1850 outputs a write command CMD to the first memory part 1040 (4-1). Then, the second host 1850 transmits data DATA to the first controller 1033 (3-2). The first NFC controller 1030 writes data DATA to the first memory part 1040. The first NFC controller 1030 outputs the written data DATA to the first controller 1033. The first controller 1033 writes data DATA to the nonvolatile semiconductor memory 1025 through the memory controller 1035 (2-1). Then, the first host 1800 transmits a read command CMD to the first controller 1033 (1-2). The first controller 1033 receives the read command CMD and reads data DATA from the nonvolatile semiconductor memory 1025 through the memory controller 1035 (2-2). The first controller 1033 transmits the read data DATA to the first host 1800.

Figure 23:
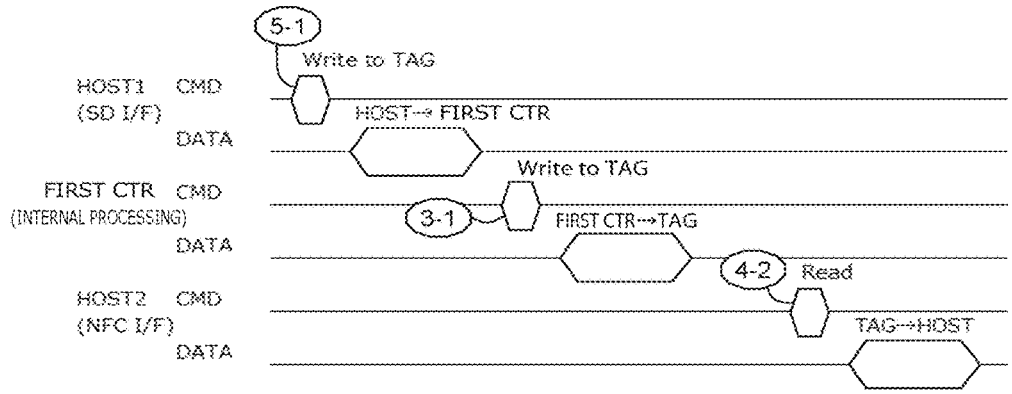
FIG. 23 is a timing chart showing the third operation example of the first wireless memory device according to the first embodiment.

FIG. 23 shows the third operation example. The first host 1800 outputs a write command CMD to the first memory part 1040 (5-1). Then, the first host 1800 transmits data DATA to the first controller 1033. The first controller 1033 receives the data DATA and writes data DATA to the first memory part 1040 through the first NFC controller 1030 (3-1). The second host 1850 transmits a read command CMD to the first NFC controller 1030 and reads data DATA from the first memory part 1040 using the first NFC controller 1030 (4-2).

Figure 24:
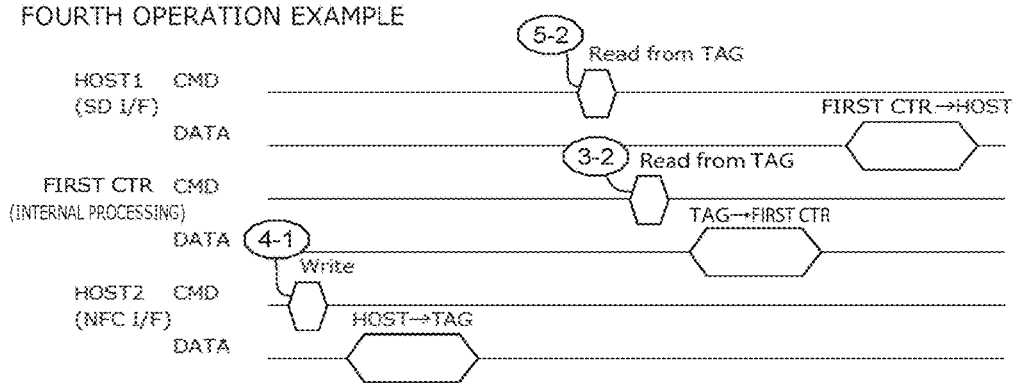
FIG. 24 is a timing chart showing the fourth operation example of the first wireless memory device according to the first embodiment.

FIG. 24 shows the fourth operation example. The second host 1850 outputs a write command CMD (4-1). Then, the second host 1850 transmits data DATA to the first controller 1033. The first NFC controller 1030 writes data DATA to the first memory part 1040. The first host 1800 transmits a read command CMD to the first memory part 1040 (5-2). The first controller 1033 reads data DATA from the first memory part 1040 through the first NFC controller 1030 (3-2). The first controller 1033 transmits the read data DATA to the first host 1800.

Figure 25:
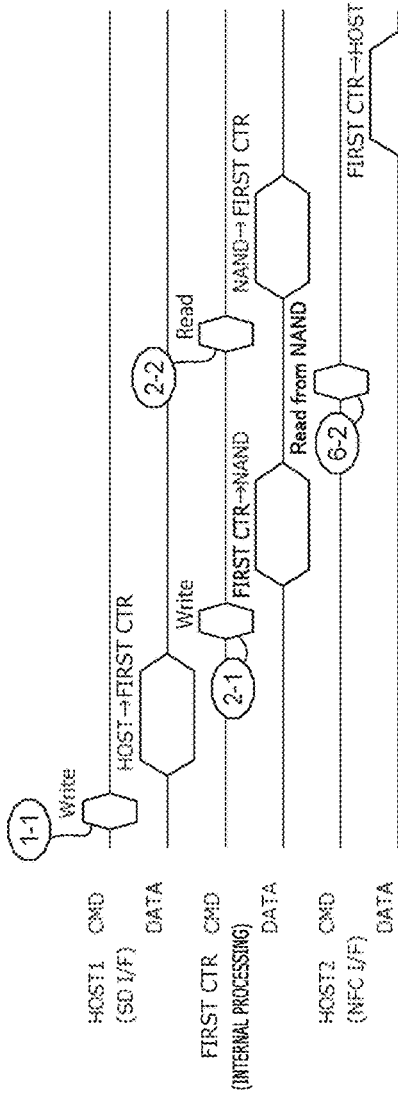
FIG. 25 is a timing chart showing the fifth operation example of the first wireless memory device according to the first embodiment.

FIG. 25 shows the fifth operation example. The first host 1800 outputs a write command CMD to the first controller 1033 (1-1). This command is a through write command for passing through writing to the first memory part 1040. The first controller 1033 receives the data DATA and writes data DATA to the nonvolatile semiconductor memory 1025 through the memory controller 1035 (2-1). The second host 1850 transmits a read command CMD to the nonvolatile semiconductor memory 1025 (6-2). This read command is a through read command for passing through reading from the first memory part 1040. The first controller 1033 reads data DATA from the nonvolatile semiconductor memory 1025 by the through read command (2-2).

Figure 26:
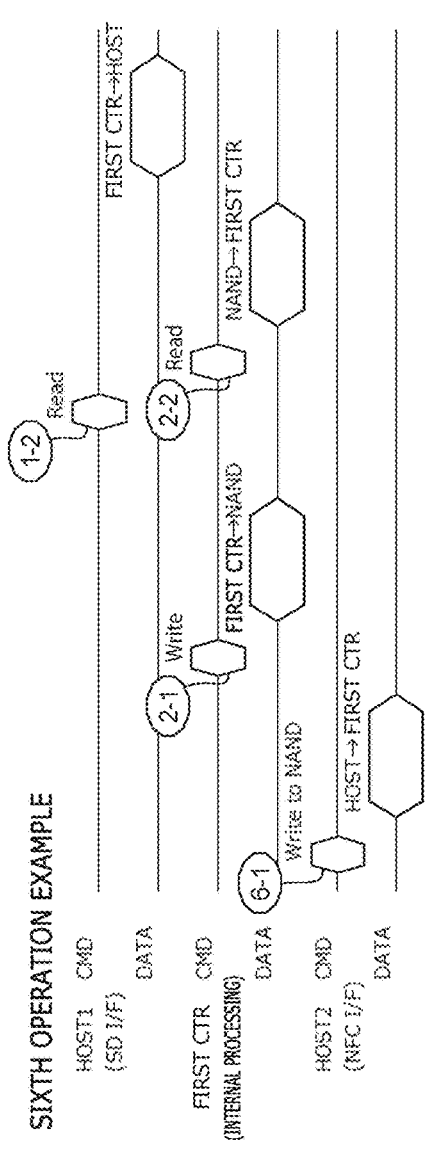
FIG. 26 is a timing chart showing the sixth operation example of the first wireless memory device according to the first embodiment.

FIG. 26 shows the sixth operation example. The second host 1850 transmits a write command to the nonvolatile semiconductor memory 1025, and transmits data DATA (6-1). The first controller 1033 writes the transmitted data DATA to the nonvolatile semiconductor memory 1025 through the memory controller 1035 (2-1). The first host 1800 transmits a read command to the first controller 1033 (1-2). Then, the first controller 1033 reads data DATA from the nonvolatile semiconductor memory 1025 through the memory controller 1035 (2-2).

Figure 27:
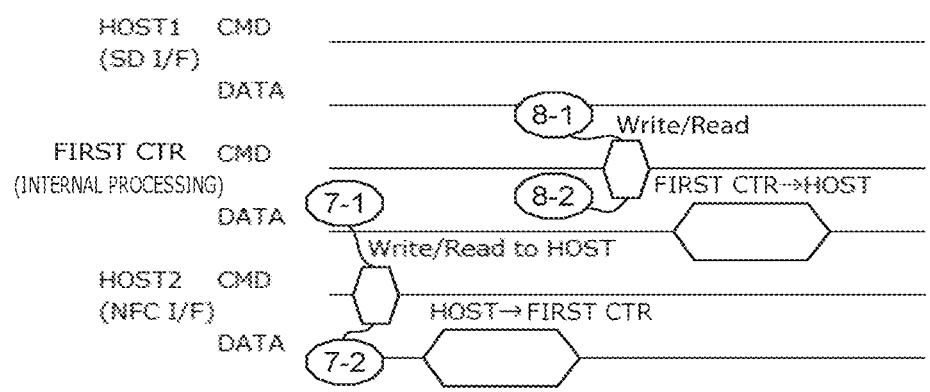
FIG. 27 is a timing chart showing the seventh operation example of the first wireless memory device according to the first embodiment.

FIG. 27 shows the seventh operation example. The second host 1850 transmits a write command or read command (7-1 or 7-2). Then, the second host 1850 transmits data DATA. The first controller 1033 transmits the transmitted data DATA to the first host 1800 based on either the write command or read command (8-1 or 8-2). This command of the first controller 1033 may be either a write command or read command, or a command arbitrarily specified by the user.

FIG. 28 shows a table summarizing the above operation examples of the first wireless memory device 1005 and the advantages thereof. The arrow represents the flow of data. The hatched region represents being operable when powered from the first host 1800 side. In the case of only maintaining data, the nonvolatile semiconductor memory 1025 and the first memory part 1040 can maintain data even without being powered from the first host side.

As shown in the first row of FIG. 28, in the first operation example, the transfer of data from the first host 1800 to the second host 1850 is performed through writing and reading in the nonvolatile semiconductor memory 1025 and the first memory part 1040. In the first operation example, data transmission from the first memory part 1040 to the second host 1850 is performed by NFC communication. Thus, the second host 1850 can obtain data from the first memory part 1040 even without power supply from the first host 1800.

As shown in the second row of FIG. 28, in the second operation example, the transfer of data from the second host 1850 to the first host 1800 is performed through writing and reading in the first memory part 1040 and the nonvolatile semiconductor memory 1025. As in the first operation example, data transfer between the first memory part 1040 and the second host 1850 is performed by NFC communication. Thus, the data transfer can be performed even without power supply from the first host 1800.

As shown in the third row and the fourth row of FIG. 28, also in the third operation example and the fourth operation example, data transfer between the first memory part 1040 and the second host 1850 is performed by NFC communication. Thus, the data transfer is performed without power supply from the first host.

As shown in the fifth row and the sixth row of FIG. 28, in the fifth operation example and the sixth operation example, data in the nonvolatile semiconductor memory 1025 is transferred without the intermediary of writing and reading in the first memory part 1040. This enables high-capacity data transfer.

As shown in the seventh row of FIG. 28, in the seventh operation example, data transfer between the first host 1800 and the second host 1850 can be performed directly. Thus, data transfer can be performed without limit to the data capacity of the nonvolatile semiconductor memory 1025 and the first memory part 1040.

(Operation of the First Embodiment)

Operation examples of the game system according to this embodiment are described below.

(Scenario 1)

Scenario 1 relates to NFC communication between the first communication terminal (game console) 1015 and the base station 1530. Scenario 1 is described assuming that the first accessory 1520 and the first wireless memory device 1005 have already been housed in the first communication terminal (game console) 1015. It is also assumed that the recognition ID of the first communication terminal (game console) 1015 is maintained in the memory part of the first communication terminal (game console) 1015.

Figure 29:
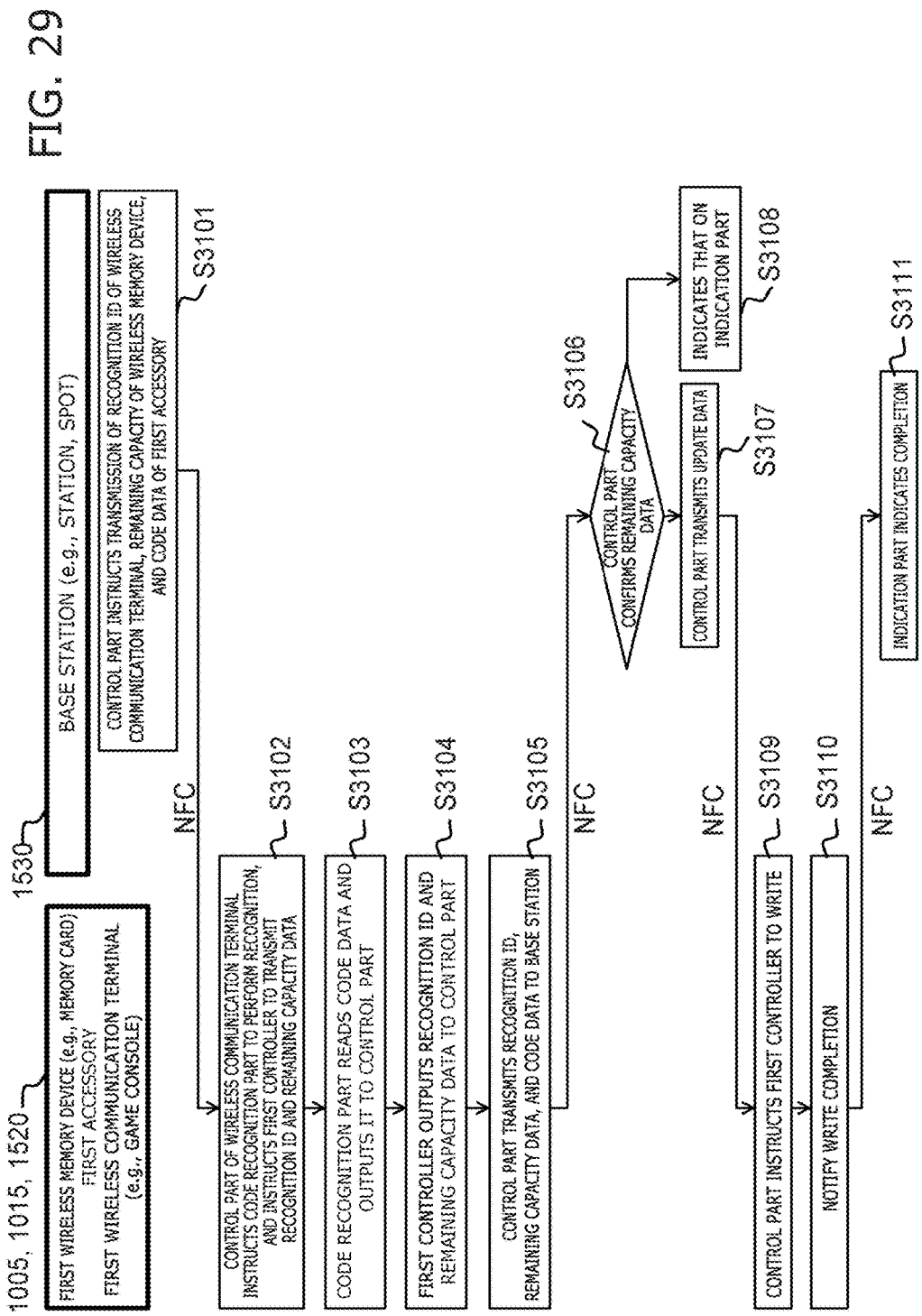
FIG. 29 is a flow chart illustrating a first scenario of the game system according to the first embodiment.

Scenario 1 is described with reference to FIG. 29.

Scenario 1 is a method for operating the game system in the case where the data maintained in the first wireless memory device 1005 is updated through the base station 1530.

In step S3101, the base station 1530 transmits a transmission instruction to the first communication terminal (game console) 1015. The transmission instruction requests transmission of the recognition ID of the first communication terminal (game console) 1015, data on the remaining capacity of the first wireless memory device 1005, and the code data corresponding to the first accessory 1520 housed in the first communication terminal (game console) 1015.

This transmission instruction is inputted to the control part 1390 through the first wireless antenna 1020 of the first wireless memory device 1005.

In step S3102, the control part 1390 instructs the code recognition part 1320 to determine the code of the first accessory 1520. In response to this instruction, the code recognition part 1320 reads the code data of the first accessory 1520 and temporarily stores it in the memory part of the control part 1390 (S3103).

In step S3104, the control part 1390 transmits a transmission instruction to the first wireless memory device 1005. The transmission instruction requests transmission of data on the remaining capacity of the nonvolatile semiconductor memory of the first wireless memory device 1005 to the control part 1390. The first controller 1033 of the first wireless memory device 1005 accesses the management region of the nonvolatile semiconductor memory through the memory controller 1035. This management region maintains the recognition ID of the first wireless memory device 1005 and data on the capacity and the remaining capacity of the first wireless memory device 1005.

The first controller 1033 of the first wireless memory device 1005 transmits data on the remaining capacity of the nonvolatile semiconductor memory to the control part 1390. The control part 1390 temporarily stores this data on the remaining capacity in the memory part (S3105).

The control part 1390 transmits the recognition ID of the first communication terminal (game console) 1015, the data on the remaining capacity of the first wireless memory device 1005, and the code data corresponding to the first accessory 1520 housed in the first communication terminal (game console) 1015 to the base station 1530 through the first wireless memory device 1005.

The control part 1670 of the base station 1530 receives the recognition ID of the first communication terminal (game console) 1015, the data on the remaining capacity of the first wireless memory device 1005, and the code data corresponding to the first accessory 1520 housed in the first communication terminal (game console) 1015. The control part 1670 extracts the update data corresponding to the code data from the memory part 1650. The memory part 1650 of the base station 1530 maintains a plurality of code data and update data corresponding to respective code data in a table form.

The control part 1670 computes the volume of the extracted update data. The control part 1670 computes remaining capacity from the data on the remaining capacity of the first wireless memory device 1005. The control part 1670 compares the remaining capacity with the volume of the update data (step S3106).

When the remaining capacity of the first wireless memory device 1005 is larger than the volume of the update data (step S3106, Yes), the control part 1670 transmits the update data and an address for writing the update data to the first communication terminal 1015 through the NFC transceiver part 1610 (step S3107).

On the other hand, when the remaining capacity of the first wireless memory device 1005 is smaller than the volume of the update data (step S3106, No), the control part 1670 indicates that on the indication part 1620 (step S3108).

In step S3109, the first wireless memory device 1005 of the first communication terminal 1015 receives the update data and the address for writing the update data, and temporarily stores them in the control part 1390.

The control part 1390 controls the first wireless memory device 1005 so as to write the update data to the specified address. As a result, the first wireless memory device 1005 stores the update data corresponding to the code data in the nonvolatile semiconductor memory.

When the update data is written to the first wireless memory device 1005, the first wireless memory device 1005 sends a notification of write completion of the update data to the control part 1670.

In response to this notification, the control part 1670 sends a notification of write completion of the update data to the base station 1530 (step S3110).

The control part 1670 of the base station 1530 indicates on the display 1620 that writing the update data is completed (step S3111).

(Variation 1 of Scenario 1)

Figure 30:
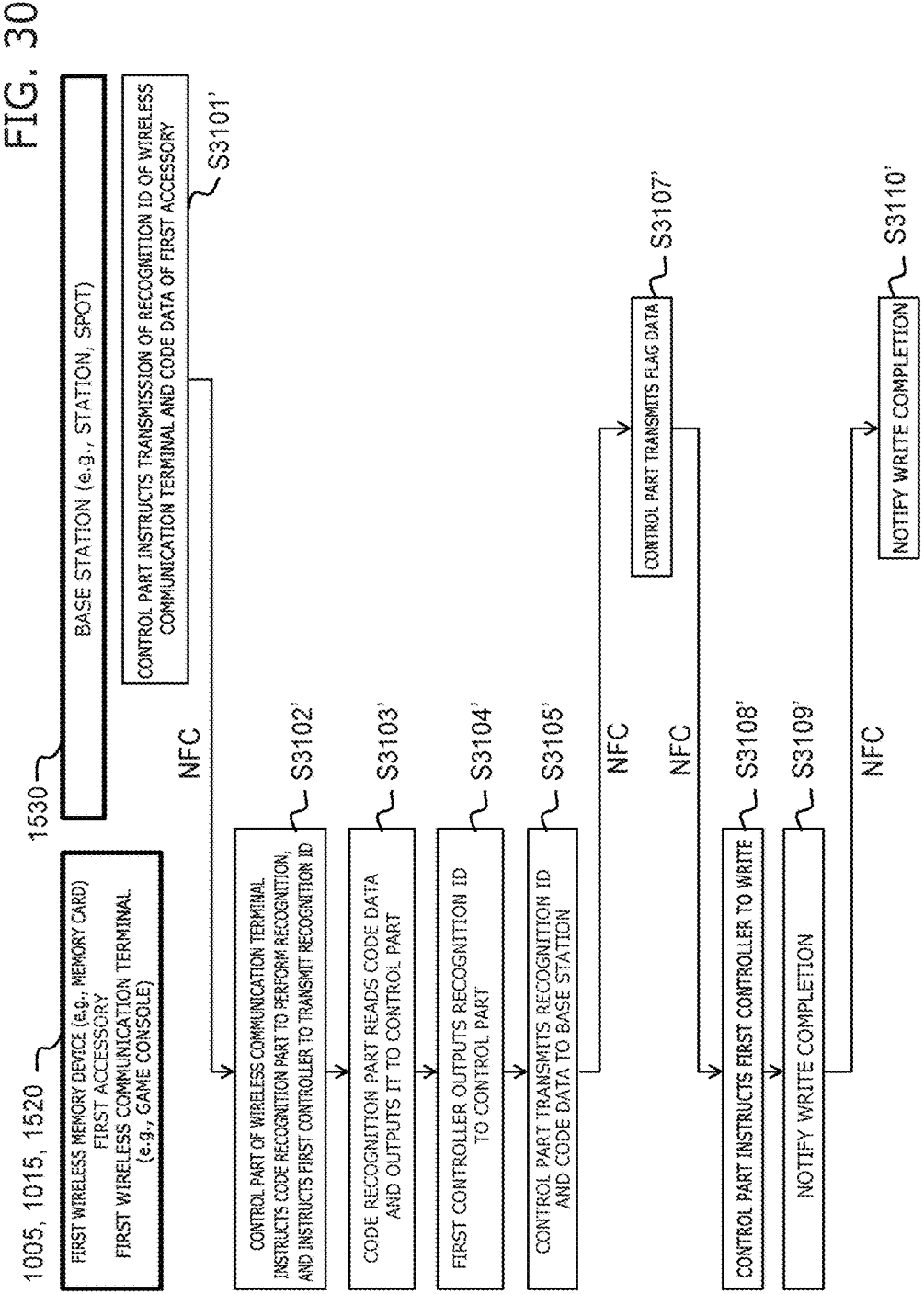
FIG. 30 is a flow chart illustrating the first scenario of game system of a variation according to the first embodiment.

Next, variation 1 of scenario 1 is described with reference to FIG. 30.

In scenario 1, in step S3106, the control part 1670 compares the remaining capacity with the volume of the update data. When the remaining capacity of the first wireless memory device 1005 is larger than the volume of the update data (step S3106, Yes), the control part 1670 transmits the update data and an address for writing the update data to the first communication terminal 1015 through the NFC transceiver part 1610 (step S3107). Instead of these steps S3106-S3108, the control part 1670 may transmit data of flag information (step S3107').

The data of flag information indicates e.g. having communicated with a certain base station 1530. The data of flag information can be used instead of the stamp of a stamp rally.

(Variation 2 of Scenario 1)

In variation 2, the control part 1670 transmits data of flag information. This data of flag information may be key data for accessing a certain region in the nonvolatile semiconductor memory 1025.

This variation is specifically described below.

Specific data is stored in the nonvolatile semiconductor memory of the first wireless memory device 1005. This specific data is encrypted. The first wireless memory device 1005 of the first communication terminal 1015 receives key data for decryption from the base station 1530 and decrypts the specific data. After the specific data is decrypted, the user can access the specific data.

This scenario is described with reference to the case of decrypting specific data. This scenario is not limited thereto. This scenario can be implemented in any mode as long as the user is allowed to use a partial region of the nonvolatile semiconductor memory 1025 of the first wireless memory device 1005 after NFC communication between the first communication terminal 1015 and the base station 1530. For instance, the first wireless memory device 1005 has flag information on whether a partial region of the nonvolatile semiconductor memory is accessible. The first wireless memory device 1005 rewrites this flag information by NFC communication between the first communication terminal 1015 and the base station 1530. This may allow the user to access the partial region of the nonvolatile semiconductor memory.

The control part 1670 of the base station 1530 transmits key data to the first communication terminal 1015 through the NFC transceiver part 1610. The first controller 1033 of the first wireless memory device 1005 receives the key data through the first NFC controller 1030 and maintains it on RAM. The first controller 1033 specifies the address of the region maintaining the specific data and reads the specific data onto the RAM through the memory controller 1035. The first controller 1033 decrypts the specific data based on the key data.

The first controller 1033 transfers the decrypted specific data to the original address of the nonvolatile semiconductor memory 1025 and stores it therein.

The first controller 1033 notifies the NFC transceiver part 1610 of the base station 1530 that decryption of the specific data is completed. When the NFC transceiver part 1610 receives this notification, the control part 1670 indicates the completion on the indication part 1620.

This variation 2 has been described with reference to the example in which the first communication terminal 1015 receives one key from one base station 1530 to decrypt specific data. This variation is not limited thereto. For instance, the first communication terminal 1015 may receive a plurality of key data from a plurality of base stations 1530. The first wireless memory device 1005 may decrypt specific data using a plurality of keys.

The nonvolatile semiconductor memory of the first wireless memory device 1005 may include a plurality of regions for maintaining encrypted data. The plurality of regions are denoted as e.g. region 1, region 2, region 3, etc. In this case, the first wireless memory device 1005 may receive a key for decrypting data in region 1 from a first base station by NFC communication with the first base station. The first wireless memory device 1005 may receive a key for decrypting data in region 2 from a second base station different from the first base station by NFC communication with the second base station.

(Variation 3 of Scenario 1)

In scenario 1, the base station 1530 transmits update data and an address for writing the update data to the first communication terminal 1015. The scenario is not limited thereto. For instance, the base station 1530 may transmit firmware of the first wireless memory device 1005 and an address for writing the firmware instead of update data and an address for writing the update data.

(Scenario 2)

Scenario 2 relates to NFC communication between the first communication terminal (game console) 1015 and the base station 1530. Scenario 2 is described assuming that the first accessory 1520 and the first wireless memory device 1005 have already been housed in the first communication terminal (game console) 1015. It is also assumed that the recognition ID of the first communication terminal (game console) 1015 is maintained in the memory part of the first communication terminal (game console) 1015.

Figure 31:
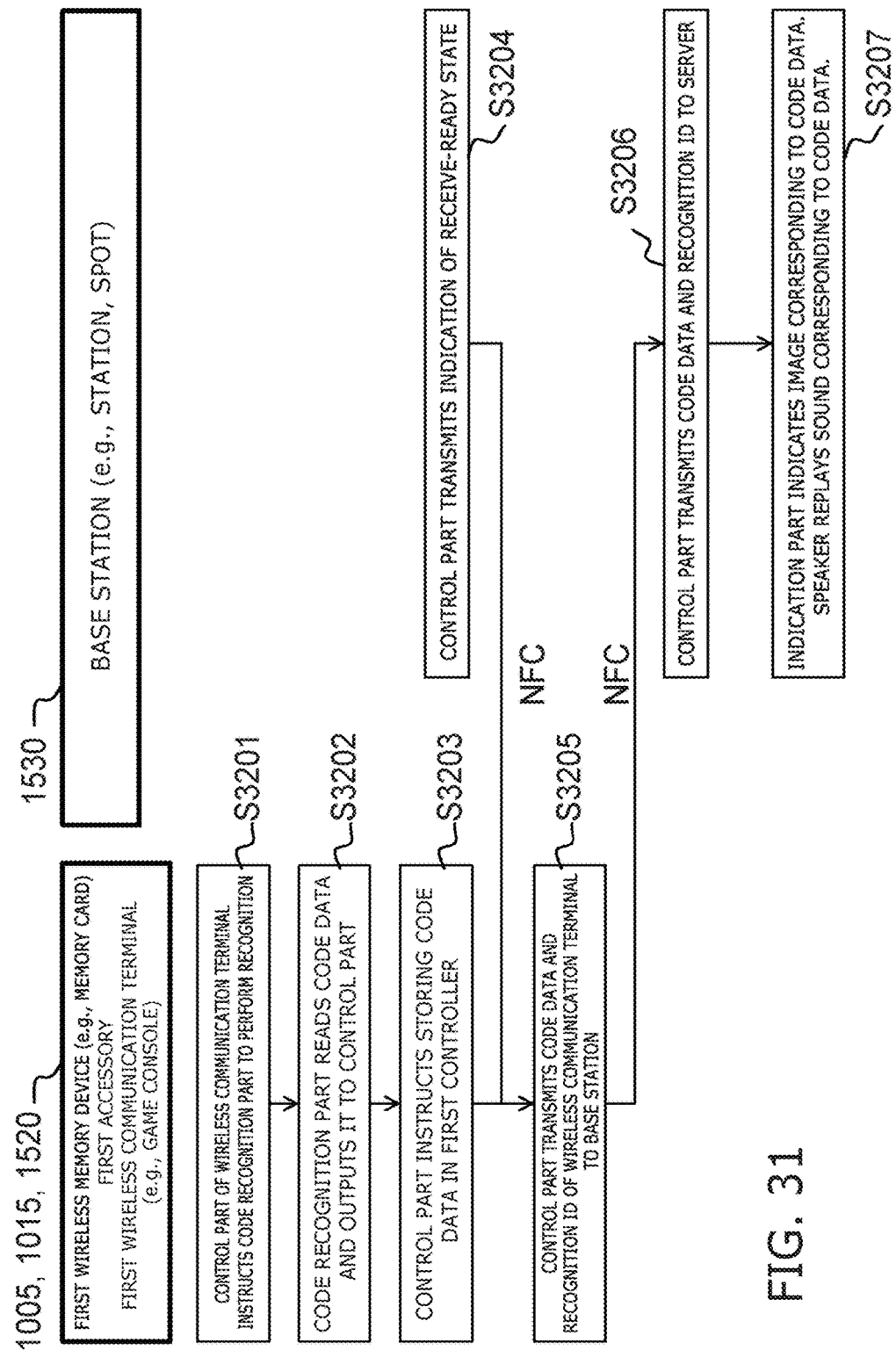
FIG. 31 is a flow chart illustrating a second scenario of the game system according to the first embodiment.

Scenario 2 is described with reference to FIG. 31.

First, in step S3201, based on an external instruction, the control part 1390 of the first communication terminal (game console) 1015 instructs the code recognition part 1320 to determine the code of the first accessory 1520. In response to this instruction, the code recognition part 1320 reads the code data of the first accessory 1520 and temporarily stores it in the memory part of the control part 1390 (S3202).

In step S3203, the control part 1390 controls the first wireless memory device 1005 so as to temporarily maintain the code data and the recognition ID of the first communication terminal (game console) 1015 in the first wireless memory device 1005. The first wireless memory device 1005 temporarily stores the code data of the first accessory 1520 housed in the first communication terminal (game console) 1015 and the recognition ID of the first communication terminal (game console) 1015.

The control part 1390 receives a ready signal indicating being ready for receiving a signal from the NFC transceiver part 1610 of the base station 1530 (step S3204). The control part 1390 transmits the code data and the recognition ID of the first communication terminal (game console) 1015 to the base station 1530 (step S3205).

In step S3206, the control part 1670 receives the code data and the recognition ID of the first communication terminal (game console) 1015. The control part 1670 transmits these data to the server 1535 through the communication part 1660. The server 1535 maintains a table associating the recognition ID of the first communication terminal (game console) 1015 with the code data of the first accessory 1520 installed in the first communication terminal (game console). The server 1535 also maintains a table associating the code data with image data, video data, or audio data.

In step S3207, the control part 1670 extracts image data or video data corresponding to the code data from the server 1535 and indicates it on the indication part 1620. The control part 1670 extracts audio data corresponding to the code data from the server 1535 and outputs it to the speaker 1630.
(Scenario 3)

Scenario 3 relates to a communication method in the case where data used in the first communication terminal (game console) 1015 is moved to a different second communication terminal (game console) 1017. This occurs in e.g. the following cases. The first communication terminal (game console) 1015 may become faulty for some reason. Alternatively, the first communication terminal (game console) 1015 may be upgraded to a new version. Alternatively, data may be shared among a plurality of first communication terminals (game consoles) 1015.

Figure 32:
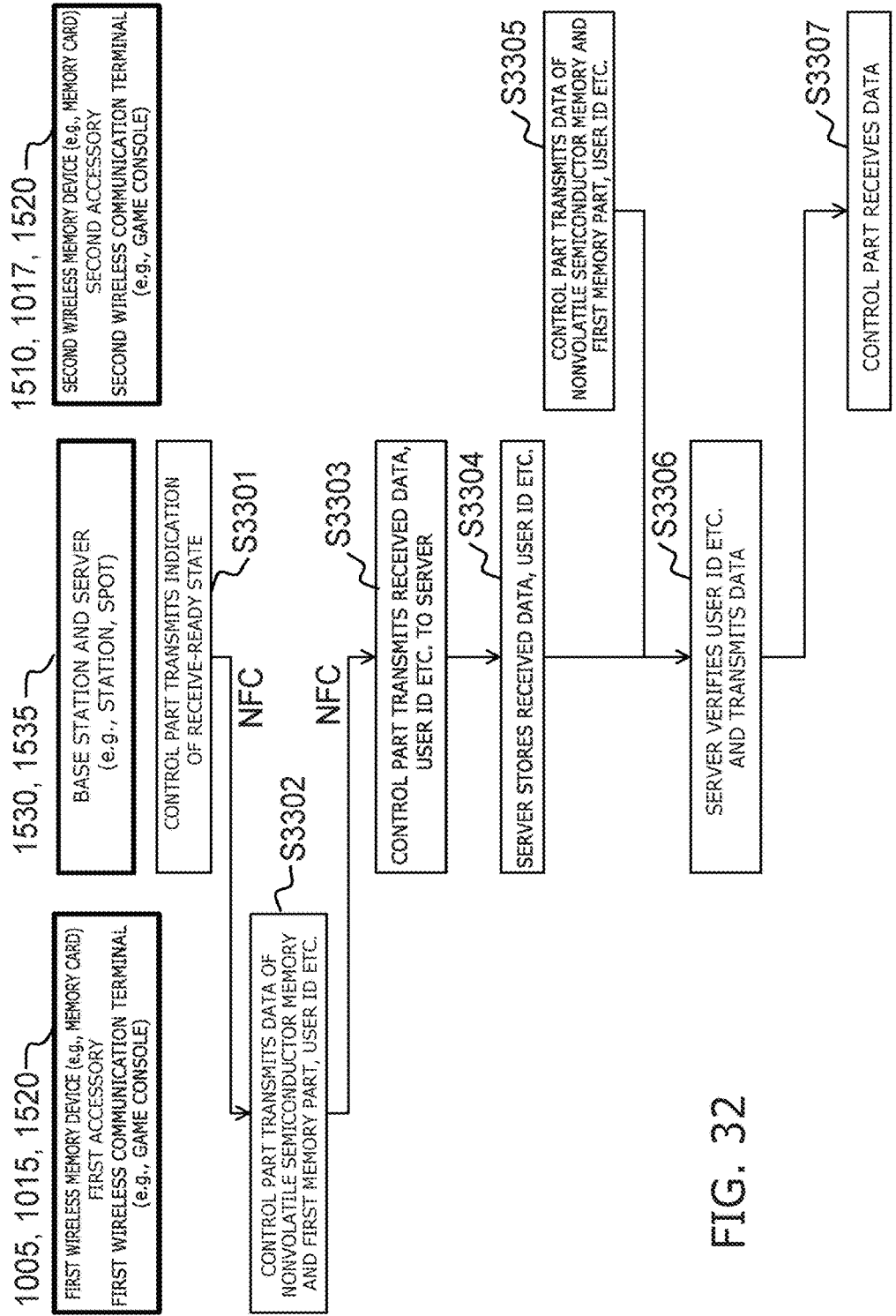
FIG. 32 is a flow chart illustrating a third scenario of the game system according to the first embodiment.

Scenario 3 is specifically described with reference to FIG. 32.

In scenario 3, data used in the first communication terminal (game console) 1015 is moved to a different second communication terminal (game console) 1017 using the base station 1530.

First, in step S3301, the control part 1670 of the base station 1530 notifies the first communication terminal (game console) 1015 that the control part 1670 can receive data. The first communication terminal (game console) 1015 receives this notification through the first wireless memory device 1005. The first communication terminal (game console) 1015 transmits the recognition ID of the first communication terminal (game console) 1015, data of the cache memory 1395 in the control part 1390, and data of e.g. the nonvolatile semiconductor memory 1025 and the first memory part 1040 to the base station 1530 (step S3302).

The control part 1670 of the base station 1530 receives e.g. the recognition ID of the first communication terminal (game console) 1015 and the data of the cache memory 1395 in the control part 1390 through the NFC transceiver part 1610. The control part 1670 transfers them to the server 1535 through the communication part 1660 (step S3303).

In step S3304, the server 1535 stores e.g. the received recognition ID of the first communication terminal (game console) 1015 and data of the cache memory 1395 in the control part 1390.

In step S3305, under the user's control, the second communication terminal (game console) 1017 transmits the recognition ID of the second communication terminal (game console) 1017, data of the cache memory 1395 in the control part 1390, and data of e.g. the nonvolatile semiconductor memory 1025 and the first memory part 1040 to the base station 1530 through the second wireless memory device 1510.

In step S3306, the server 1535 receives the recognition ID of the second communication terminal (game console) 1017. The server 1535 verifies that the user is identical to the user having the recognition ID of the first communication terminal (game console) 1015. If the verification is successfully completed, the server 1535 transmits e.g. the data of the cache memory 1395 in the control part 1390 corresponding to the recognition ID of the first communication terminal (game console) 1015 to the second communication terminal (game console) 1017.

As a result, the user can use the second communication terminal (game console) 1017 in the same environment as the first communication terminal (game console) 1015.
(Scenario 4)

Scenario 4 relates to NFC communication between the first communication terminal 1015 and the base station 1530, and NFC communication between the second communication terminal 1017 and the base station 1530. The base station 1530 includes a plurality of NFC transceiver parts 1610. For convenience of description, it is assumed that the base station 1530 includes two NFC transceiver parts 1610. The first NFC transceiver part 1610 performs NFC communication with the first communication terminal 1015. The second NFC transceiver part 1610 performs NFC communication with the second communication terminal 1017. The base station 1530 provides a match-up game between the user owning the first communication terminal 1015 and the user owning the second communication terminal 1017.

Figure 33:
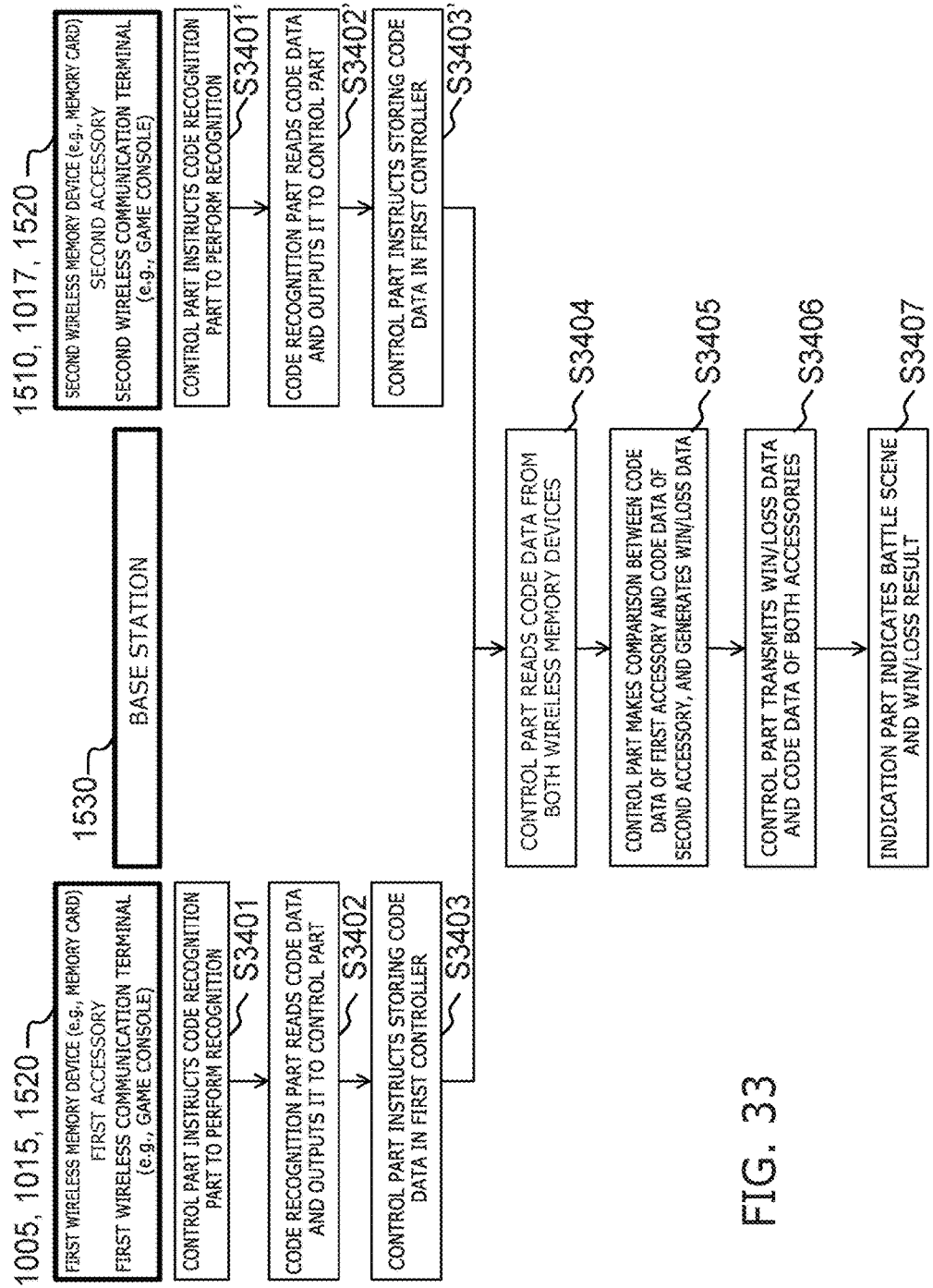
FIG. 33 is a flow chart illustrating a fourth scenario of the game system according to the first embodiment.

Scenario 4 is described with reference to FIG. 33.

First, in step S3401, based on an external instruction, the control part 1390 of the first communication terminal (game console) 1015 instructs the code recognition part 1320 to determine the code of the first accessory 1520. In response to this instruction, the code recognition part 1320 reads the code data of the first accessory 1520 and temporarily stores it in the memory part of the control part 1390 (S3402).

In step S3403, the control part 1390 controls the first wireless memory device 1005 so as to temporarily maintain the code data and the recognition ID of the first communication terminal (game console) 1015 in the first wireless memory device 1005. The first wireless memory device 1005 temporarily stores the code data of the first accessory 1520 housed in the first communication terminal (game console) 1015 and the recognition ID of the first communication terminal (game console) 1015.

Steps S3401'-S3403' are similar to steps S3401-S3403. Thus, the detailed description thereof is omitted.

By step S3403', the second wireless memory device 1510 temporarily stores the code data of the second accessory 1525 housed in the second communication terminal (game console) 1017 and the recognition ID of the second communication terminal (game console) 1017.

In step S3404, the control part 1670 reads the code data of the first accessory 1520 and the recognition ID of the first communication terminal (game console) 1015 from the first wireless memory device 1005. The control part 1670 reads the code data of the second accessory 1525 and the recognition ID of the second communication terminal (game console) 1017 from the second wireless memory device 1510.

In step S3405, the control part 1670 makes a comparison between the code data of the first accessory 1520 and the code data of the second accessory 1525, and generates win/loss data.

In step S3406, the control part 1670 determines which user wins from the win/loss data and indicates it on the indication part 1620.

In scenario 4, the win/loss data is generated by comparison between the code data of the accessories. The scenario is not limited thereto. The control part 1670 may generate win/loss data by scores based on the code data of the accessory and the information on the level of the user. Specifically, the user with a higher score is determined to be a winner. The user with a lower score is determined to be a loser.

The information on the level is comprehensively calculated from e.g. the kind of the accessory held by the user, the number of times of communication with the base station, and the number of communicated base stations. This information on the level is maintained in e.g. the management region of the first wireless memory device 1005 installed on each game console.

(Scenario 5)

Scenario 5 relates to NFC communication between the first communication terminal 1015 and the second communication terminal 1017. Both the first communication terminal 1015 and the second communication terminal 1017 further include a display. The first wireless memory device 1005 installed on the first communication terminal 1015 and the second wireless memory device 1510 installed on the second communication terminal 1017 further have the function of NFC reader and NFC writer. In this case, the code data and the like maintained in the first wireless memory device 1005 and the second wireless memory device 1510 can be exchanged with each other by NFC communication. Thus, the match-up game of scenario 3 can be played without using the base station 1530.

Scenario 5 is specifically described below with reference to FIG. 34.

In step S3501, based on an external instruction, the control part 1390 of the first communication terminal (game console) 1015 instructs the code recognition part 1320 to determine the code of the first accessory 1520. In response to this instruction, the code recognition part 1320 reads the code data of the first accessory 1520 and temporarily stores it in the memory part of the control part 1390 (S3502).

In step S3503, the control part 1390 controls the first wireless memory device 1005 so as to temporarily maintain the code data in the first wireless memory device 1005. The first wireless memory device 1005 temporarily stores the code data of the first accessory 1520 housed in the first communication terminal (game console) 1015.

Steps S3501'-S3503' are similar to steps S3501-S3503. Thus, the detailed description thereof is omitted.

In step S3504, the control part 1390 of the first wireless memory device 1005 reads the code data of the second accessory 1525 from the second wireless memory device 1510.

Likewise, the control part 1390 of the second wireless memory device 1510 reads the code data of the first accessory 1520 from the first wireless memory device 1005.

In step S3505, the control part 1390 of the first wireless memory device 1005 makes a comparison between the code data of the first accessory 1520 and the code data of the second accessory 1525, and generates win/loss data.

The control part 1390 of the second wireless memory device 1510 also makes a comparison between the code data of the first accessory 1520 and the code data of the second accessory 1525, and generates win/loss data.

In step S3506, the control part 1390 of the first wireless memory device 1005 determines which user wins from the win/loss data and indicates it on the indication part 1620. Likewise, the control part 1390 of the second wireless memory device 1510 determines which user wins from the win/loss data and indicates it on the indication part 1620.

In this scenario, each of the first wireless memory device 1005 and the second wireless memory device 1510 obtains both the code data of the first accessory 1520 and the code data of the second accessory 1525. This scenario is not limited thereto. For instance, only the first wireless memory device 1005 may obtain the code data of the first accessory 1520 and the code data of the second accessory 1525 to generate win/loss data. This win/loss data may be transmitted from the first wireless memory device 1005 to the second wireless memory device 1510 to indicate which user is the winner and which user is the loser on the display of the second wireless memory device 1510.

(Scenario 6)

Scenario 6 describes an example in which a character moves on the display of the third communication terminal 1019 by augmented reality (AR) when the first wireless memory device 1005 detached from the first communication terminal 1015 is acquired by the image acquisition device (camera) of the third communication terminal 1019.

As shown in FIG. 35, when the first wireless memory device 1005 is shot by the image acquisition part 1110 of the third communication terminal 1019, an image or video of the character is indicated around the first wireless memory device 1005 in the indication part 1095.

In scenario 6, the recognition ID of the first communication terminal (game console) 1015 and the video/image data associated therewith are stored in the server 1535.

A specific operation is described below with reference to FIG. 36.

First, in step S3601, the third communication terminal 1019 is connected to the server 1535 through a network (e.g., Internet). The third communication terminal 1019 transmits the recognition ID of the first communication terminal (game console) 1015 to the server 1535.

In step S3602, the server 1535 extracts image/video data corresponding to the recognition ID of the first communication terminal (game console) 1015. The server 1535 transmits the image/video data to the third communication terminal 1019 through the network (e.g., Internet).

In step S3603, the third communication terminal 1019 stores the received image/video data and the recognition ID of the first communication terminal (game console) 1015 associated therewith in a memory part (not shown).

In step S3604, the third communication terminal 1019 activates a camera application. When the third communication terminal 1019 senses the first wireless memory device 1005 through the camera of the third communication terminal 1019, the third communication terminal 1019 determines the recognition ID of the first wireless memory device 1005 (step S3605, S3606).

In steps S3607 and S3608, the third communication terminal 1019 combines the image/video data corresponding to the recognition ID of the first wireless memory device 1005 with the shot image. The third communication terminal 1019 indicates the combined image on the indication part 1095.

In this embodiment, in step S3603, the third communication terminal 1019 stores the received image/video data and the recognition ID of the first communication terminal (game console) 1015 associated therewith in a memory part (not shown). This embodiment is not limited thereto. For instance, audio data may be associated with the recognition ID of the first communication terminal (game console) 1015 and stored.

When indicating the image/video data associated with the recognition ID of the first wireless memory device 1005, audio data may be outputted from the speaker of the third communication terminal 1019.

FIG. 37 shows an example table summarizing the correspondence between the operation examples of the first wireless memory device 1005 and the steps of the operation example of the game system. The arrow represents the flow of data. The hatched region represents being operable when powered from the first host 1800 side. In the case of only maintaining data, the nonvolatile semiconductor memory 1025 and the first memory part 1040 can maintain data even without being powered from the first host side.

As shown in FIG. 37, the first operation example is realized by performing the flow of scenario 2 (S3201-S3207) to scenario 5 (S3501-S3507). The second operation example is realized by performing the flow of scenario 1 (S3101-S3111), scenario 3 (S3301-S3307), and scenario 5 (S3501-S3507). The third operation example is realized by performing the flow of scenario 2 (S3201-S3207) to scenario 5 (S3501-S3507). The fourth operation example is realized by performing the flow of scenario 1 (S3101-S3111), scenario 3 (S3301-S3307), and scenario 5 (S3501-S3507). The fifth operation example is realized by performing the flow of scenario 2 (S3201-S3207) to scenario 5 (S3501-S3507). The sixth operation example is realized by performing the flow of scenario 1 (S3101-S3111), scenario 3 (S3301-S3307), and scenario 5 (S3501-S3507). The seventh operation example is realized by performing the flow of scenario 1 (S3101-S3111) to scenario 5 (S3501-S3507).

The first to sixth operation examples are applicable depending on the location of data. The embodiment is not limited to the case where each scenario is based on the same operation examples. The operation examples may be switchably applied to one or more steps. The first communication terminal 1015 connected with the first wireless memory device 1005 may include another memory part. In this case, the seventh operation example can be applied to perform e.g. verification operation and data transfer. These operation examples may be performed as a continuous flow, or may be performed separately depending on the condition of power supply from the first communication terminal 1015.

Second Embodiment

Figure 38:
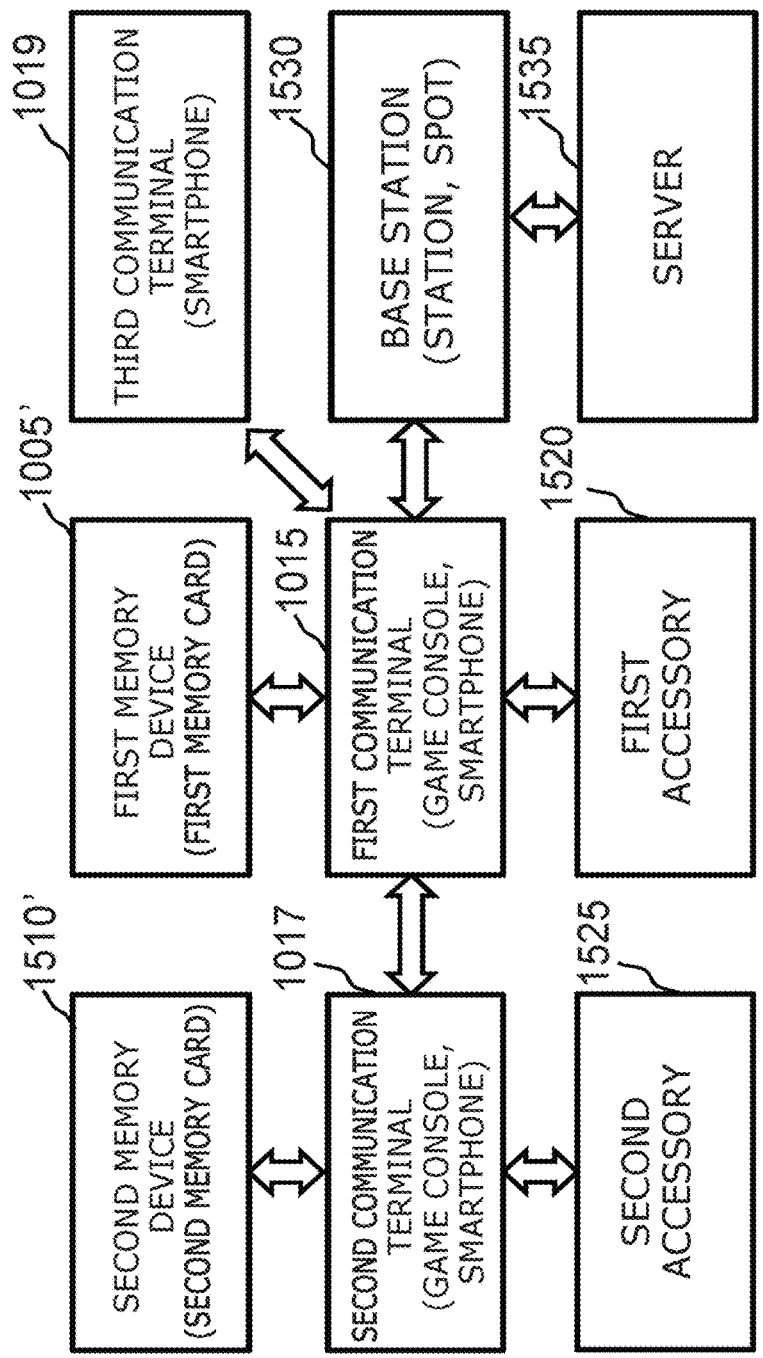
FIG. 38 is a block diagram describing a wireless communication method according to a second embodiment.

FIG. 38 is a block diagram schematically showing a second embodiment.

In the aforementioned embodiment, the first wireless memory device 1005 includes a first NFC controller 1030 operable for wireless communication. The aforementioned embodiment is not limited thereto. That is, as shown in FIG. 38, the first memory device 1005' has no function operable for wireless communication. The first communication terminal 1015' may be provided with a wireless communication function of NFC.

The first communication terminal 1015' communicates with the first memory device 1005', the second communication terminal 1017, the first accessory 1520, the third communication terminal 1019, and the base station 1530. The communication between the first communication terminal 1015' and the first memory device 1005' is wireline communication. The communication among the second communication terminal 1017, the third communication terminal 1019, and the base station 1530 is e.g. wireless. The communication with the first accessory 1520 may be either wireline or wireless.

Figure 39:
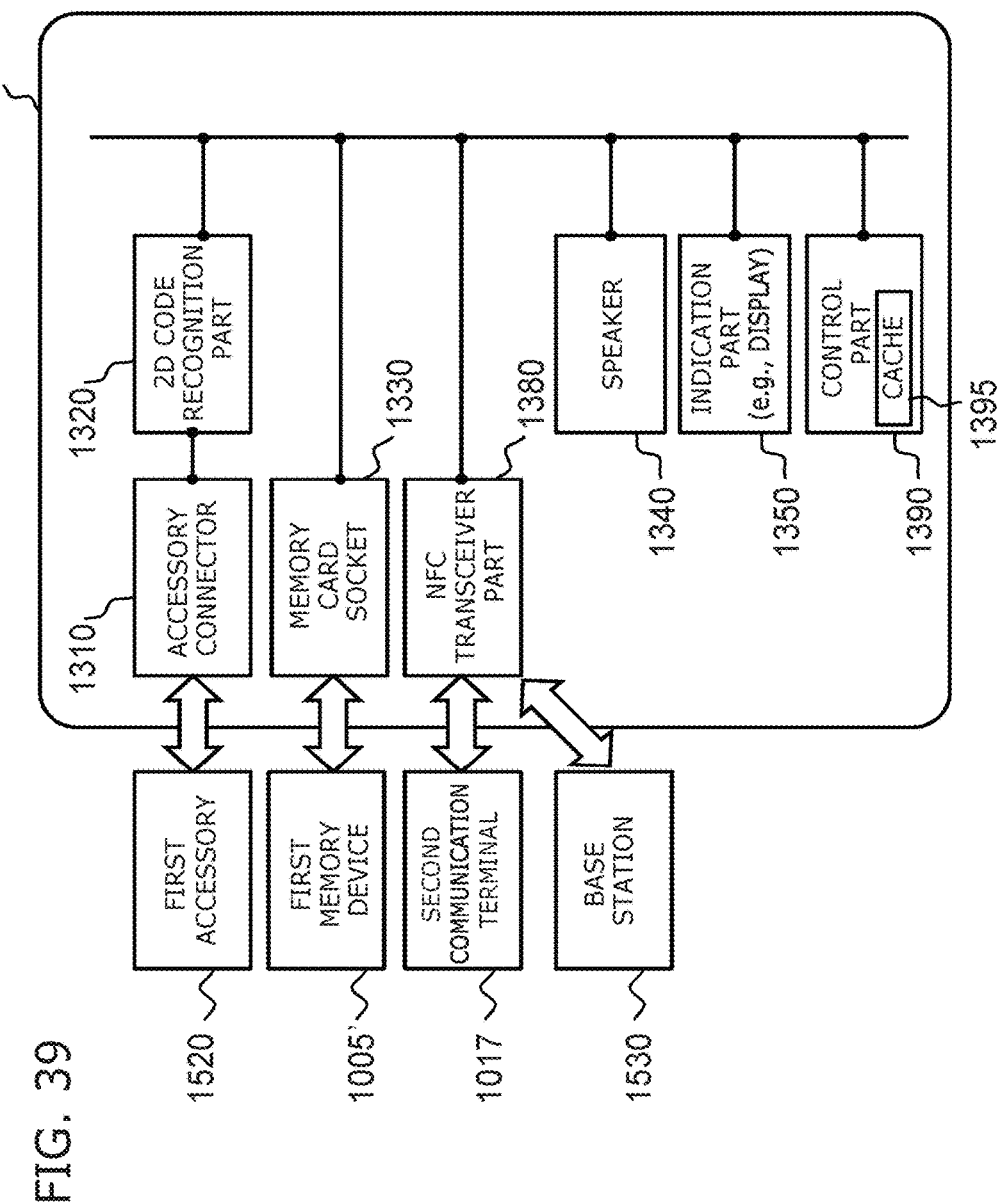
FIG. 39 is a schematic block diagram showing a configuration of the first communication terminal according to the second embodiment.

FIG. 39 is a schematic block diagram showing the configuration of the first communication terminal 1015' of this embodiment. The configuration remains similar except that it includes an NFC transceiver part 1380.

This first communication terminal 1015' can also be used to provide a configuration nearly similar to the first embodiment. Thus, the description thereof is omitted.

Third Embodiment

Figure 40:
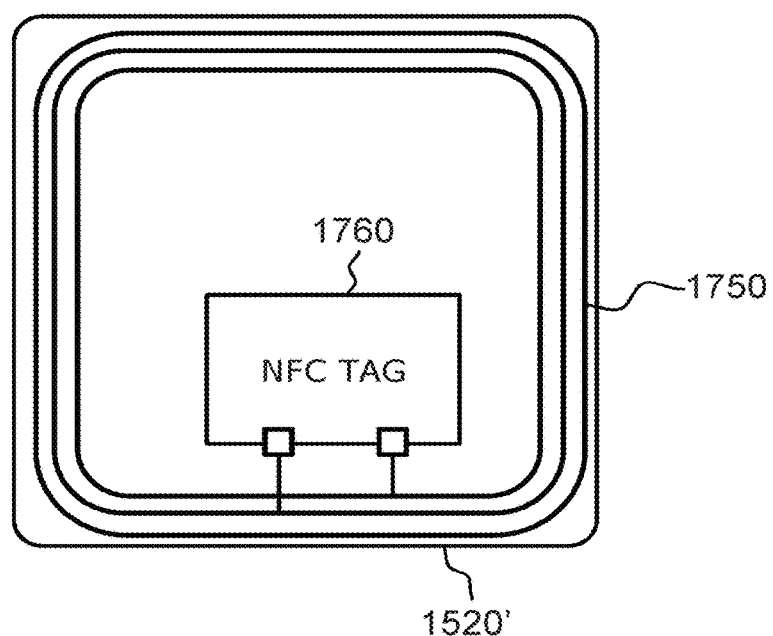
FIG. 40 is a configuration of a first accessory according to a third embodiment.

FIG. 40 shows a case where the first accessory 1520' includes an NFC tag 1760 and a third wireless antenna 1750. The first accessory 1520' can perform NFC communication with the outside through the third wireless antenna 1750. This first accessory 1520' can also be used to provide a configuration nearly similar to the first embodiment.

Fourth Embodiment

The first wireless memory device 1005 having a plurality of operation examples (operation modes) and provided with the NFC communication function as described above is not limited to the use for the match-up game system as described above. The first wireless memory device 1005 can be used with other game systems such as content rally and other memory systems. The content rally is a game in which the first wireless memory device 1005 retained by the user is used to obtain content data from e.g. stations placed in a plurality of shops.

The first wireless memory device of this embodiment can use the NFC communication function to specify partial data of a plurality of data stored in a high-capacity nonvolatile semiconductor memory 1025. The data can be retrieved by NFC communication.

Figure 41:
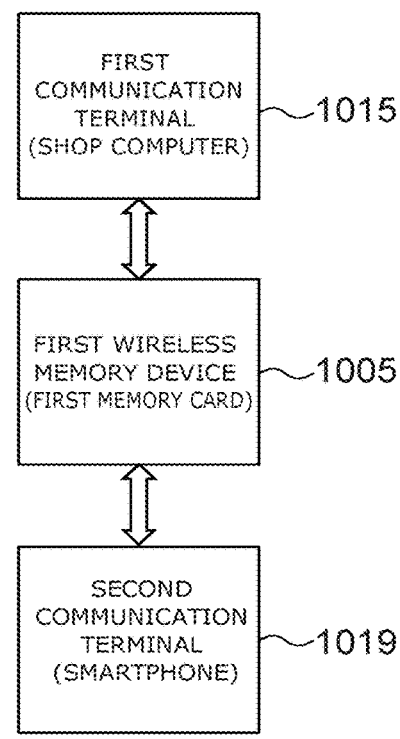
FIG. 41 is a schematic block diagram describing the memory system according to a fourth embodiment.

FIG. 41 is a schematic block diagram describing the memory system according to this embodiment and its configuration.

Figure 42:
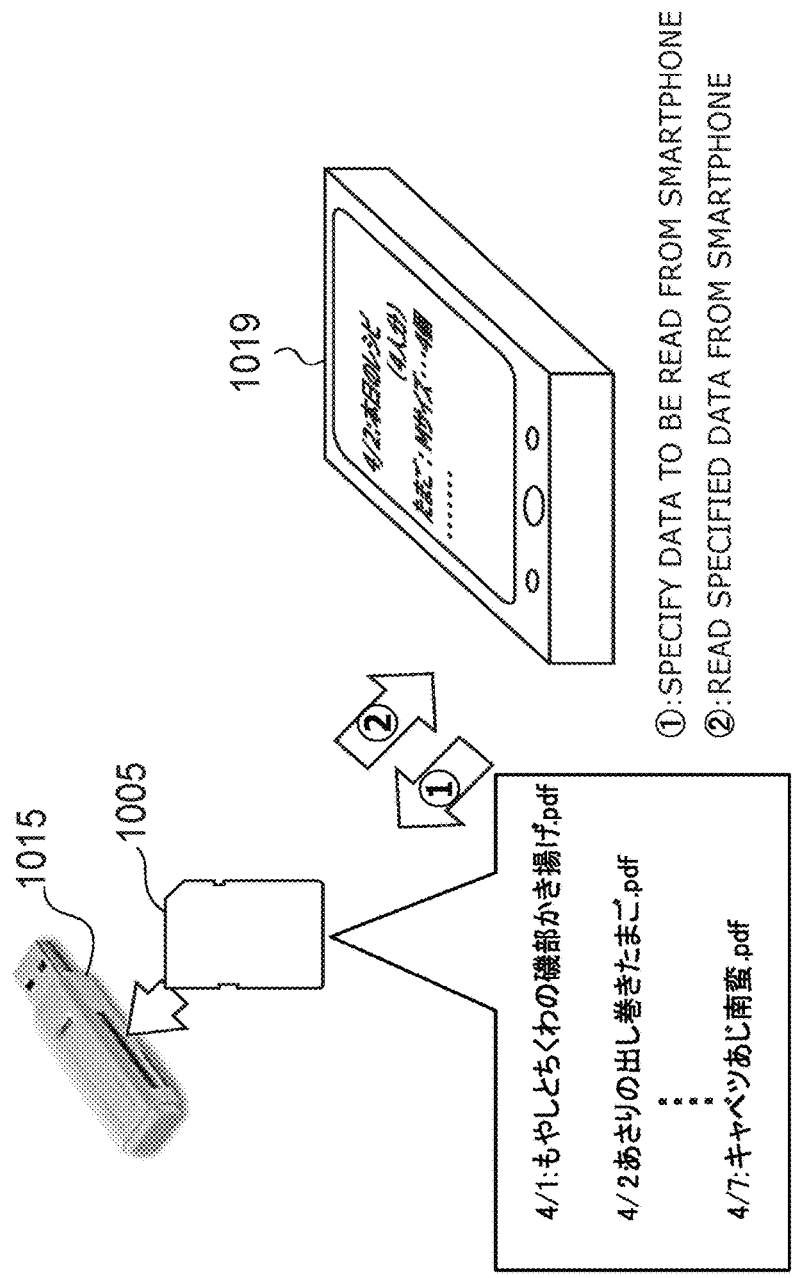
FIG. 42 is a schematic perspective view illustrating a more specific practical example of the memory system according to the fourth embodiment.

FIG. 42 schematically illustrates a more specific practical example of the memory system of this embodiment.

Figure 43:
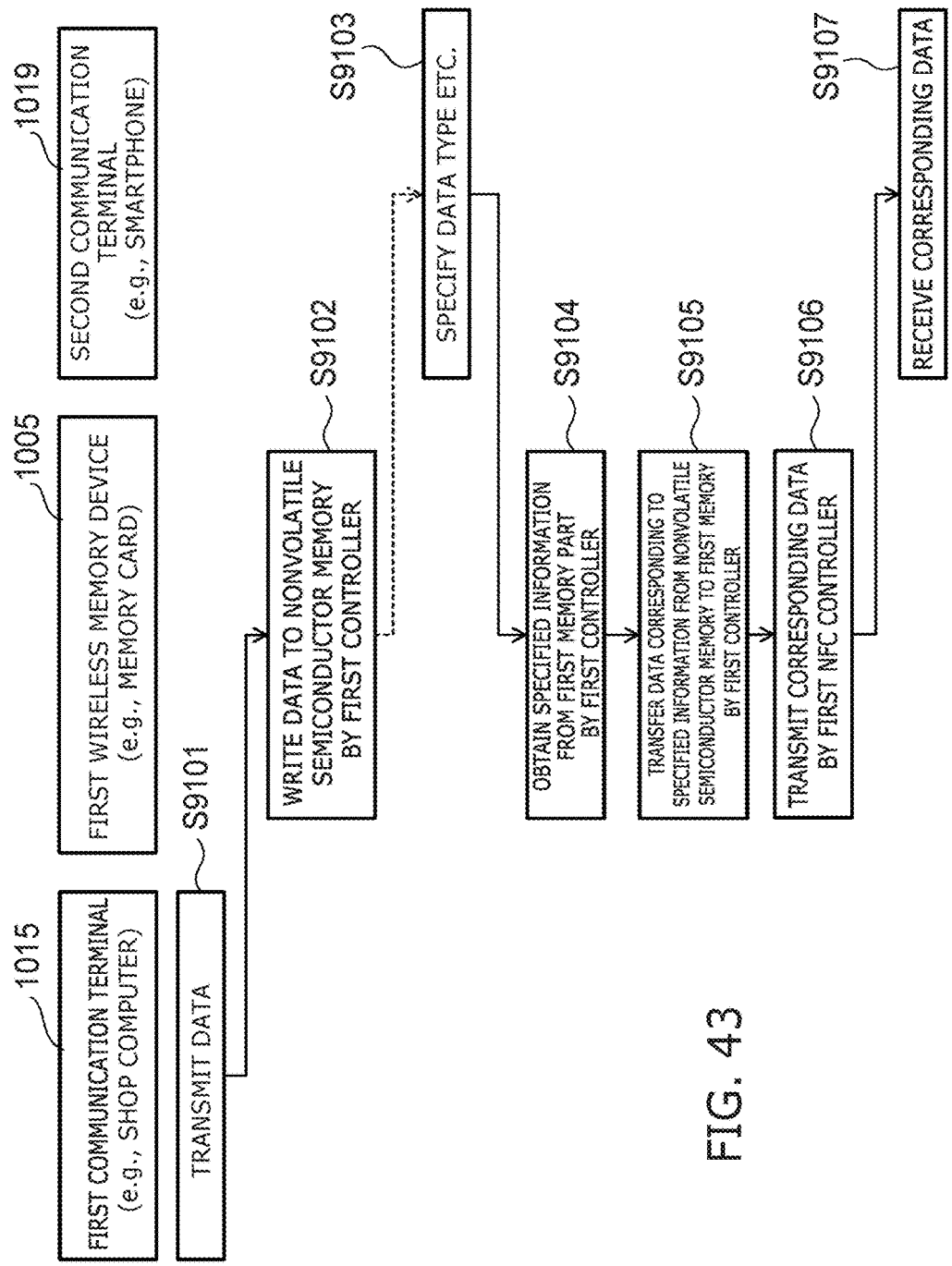
FIG. 43 is a flow chart showing an operation of the memory system according to the fourth embodiment.

FIG. 43 is a schematic flow chart for describing the operation of the memory system of this embodiment.

Figures 44A, 44B, 44C:
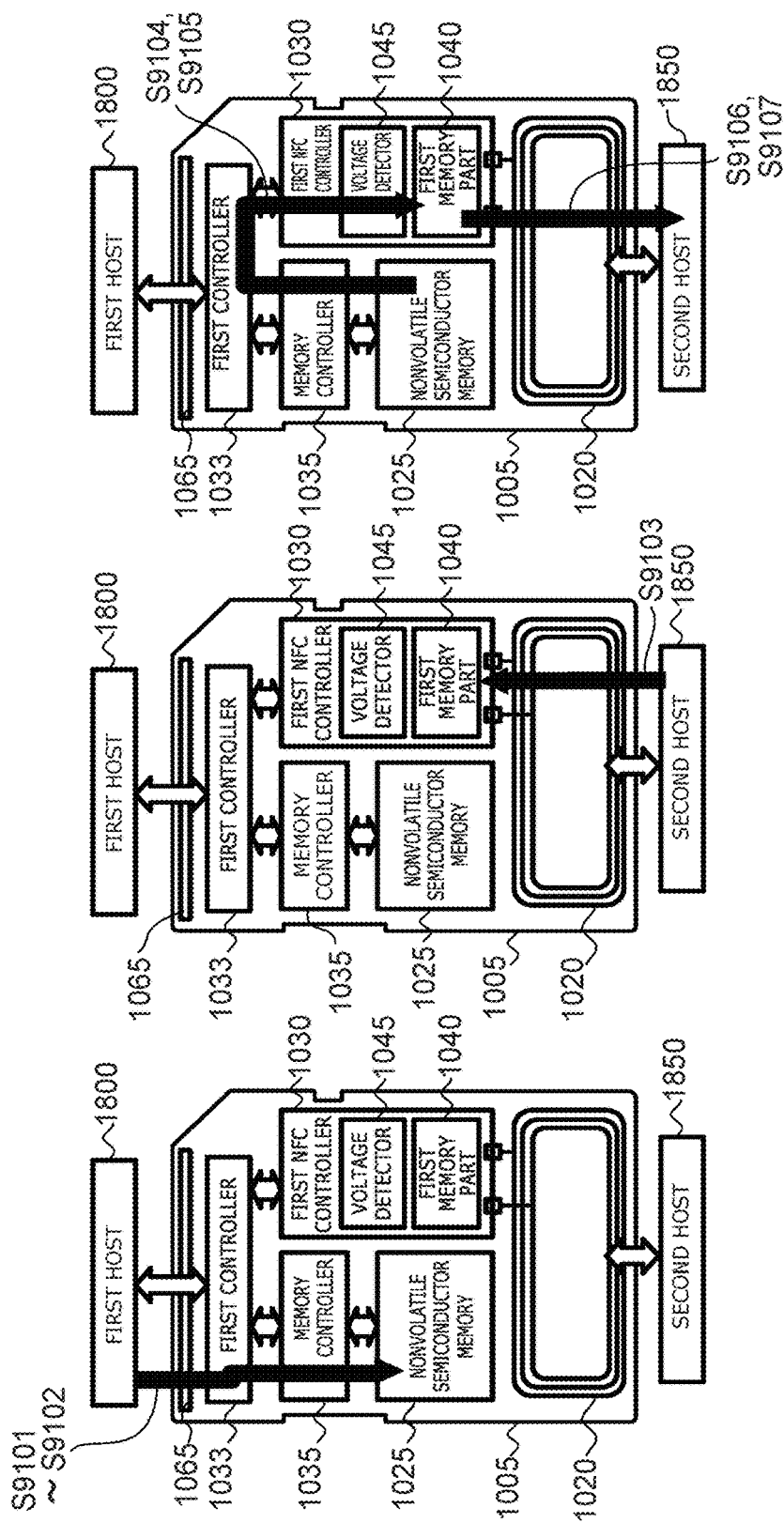
FIG. 44A is a schematic block diagram illustrating the operation of the first wireless memory device according to the fourth embodiment.
FIG. 44B is a schematic block diagram illustrating the operation of the first wireless memory device according to the fourth embodiment.
FIG. 44C is a schematic block diagram illustrating the operation of the first wireless memory device according to the fourth embodiment.

FIGS. 44A to 44C are schematic block diagrams for describing the operation of the first wireless memory device of this embodiment.

As shown in FIG. 41, the memory system of this embodiment includes a first wireless memory device 1005, a first communication terminal 1015, and a second communication terminal 1019. This first wireless memory device 1005 is identical to that described above, and the detailed description thereof is omitted. The first wireless memory device 1005 is electrically connected to the first communication terminal 1015. In this embodiment, the first communication terminal 1015 is e.g. a computer terminal placed in a shop. The first communication terminal 1015 is electrically connected through the connection terminal 1065 of the first wireless memory device 1005. The first communication terminal 1015 transfers a plurality of its own data to the first wireless memory device 1005. The first wireless memory device 1005 stores the plurality of data in e.g. the nonvolatile semiconductor memory 1025. The first communication terminal 1015 only needs to be able to power the first wireless memory device 1005 through the connection terminal 1065. The first wireless memory device 1005 may be powered by other means instead of the first communication terminal 1015.

The first wireless memory device 1005 is electrically connected to the second communication terminal 1019. This connection is based on wireless communication. The second communication terminal 1019 is e.g. a smartphone retained by a user (customer) of the shop. The second communication terminal 1019 is connected through the first wireless antenna 1020 of the first wireless memory device 1005.

More specifically, as shown in FIG. 42, the memory system of this embodiment includes a memory card, a computer terminal connected with the memory card, and a smartphone for specifying data to be obtained. The memory card is the first wireless memory device 1005. The computer terminal is the first communication terminal 1015. The smartphone is the second communication terminal 1019. In this example, the first communication terminal 1015 such as a terminal computer is configured to be powered by USB through a conversion adapter.

The nonvolatile semiconductor memory 1025 of the first wireless memory device 1005 stores e.g. a plurality of data owned by the first communication terminal 1015 and transferred to the nonvolatile semiconductor memory 1025. In this example, the plurality of data are data of documents describing recipes for daily dishes. One data item is stored for each date. The plurality of data transferred to the nonvolatile semiconductor memory 1025 of the first wireless memory device 1005 do not need to be the data owned by the first communication terminal 1015. The plurality of data may be data written by e.g. another computer terminal. The first wireless memory device 1005 is connected to the first communication terminal 1015. Thus, the first wireless memory device 1005 can be powered by the first communication terminal 1015.

In this example, the first wireless memory device 1005 and the first communication terminal 1015 are placed in a retail shop such as a supermarket selling material of the recipes for dishes included in the plurality of data.

A user visits e.g. the retail shop provided with the first wireless memory device 1005 and the first communication terminal 1015. The user retains a smartphone, which is the second communication terminal 1019. The user can operate the second communication terminal 1019 to perform the operation of specifying information for obtaining specific data from among the plurality of data.

The user operates the second communication terminal 1019 to perform the operation of specifying information for obtaining specific data. The user holds the second communication terminal 1019 over the first wireless memory device 1005. This establishes connection between the first wireless memory device 1005 and the second communication terminal 1019. The information specified by the second communication terminal 1019 is transmitted to the first wireless memory device 1005. The first wireless memory device 1005 obtains data corresponding to the specified information from the nonvolatile semiconductor memory 1025. The first wireless memory device 1005 transmits the data to the second communication terminal 1019.

More specifically, as shown in FIG. 43, the first wireless memory device 1005 writes data transferred from the first communication terminal (first host) 1015 to the nonvolatile semiconductor memory 1025 (steps S9101, S9102).

In step S9103, the second communication terminal (second host) 1019 specifies the type of data to be obtained, e.g., the date of the day. After establishment of connection between the second communication terminal 1019 and the first wireless memory device 1005, the specified information such as the date of the day (April 2) is stored in the first memory part 1040 by the first NFC controller 1030.

In step S9104, the first controller 1033 obtains the specified information such as the date of the day (April 2) stored in the first memory part 1040.

In step S9105, the first controller 1033 reads data (document file of the recipe on April 2) corresponding to the specified information such as the date of the day (April 2) from the nonvolatile semiconductor memory 1025. The first controller 1033 writes the data to the first memory part 1040.

In step S9106, the first NFC controller 1030 transmits the corresponding data (document file of the recipe on April 2) to the second communication terminal 1019 through the first wireless antenna 1020.

As shown in FIG. 44A, the first wireless memory device 1005 has a plurality of data written to the nonvolatile semiconductor memory 1025. When writing to the nonvolatile semiconductor memory 1025, the first wireless memory device 1005 is powered by a host at write time such as the first communication terminal 1015. The computer terminal used for writing a plurality of data may be different from the computer terminal powering the first wireless memory device 1005 when the user visits the shop. In this case, the first wireless memory device 1005 may be configured so as not to overwrite the content of the nonvolatile semiconductor memory 1025 with the data of the computer terminal of the visited shop. A specific region of the nonvolatile semiconductor memory 1025 can be defined as an identification region for write protection to prevent e.g. overwriting.

As shown in FIG. 44B, transmission of specified information from the second communication terminal 1019 (step S9103) is based on NFC communication. Thus, the first wireless memory device 1005 can exchange data even without power supply from the first communication terminal 1015.

As shown in FIG. 44C, under the control of the first controller 1033, data matched with the specified information can be transferred from the nonvolatile semiconductor memory 1025 to the first memory part 1040.

In the memory system of this embodiment, transfer of data from the first communication terminal 1015 to the second communication terminal 1019 through the first wireless memory device 1005 can be performed in accordance with the procedure of the first operation example. This data transfer can transfer partial data matched with the specified information. Thus, data can be transferred depending on the communication capacity of NFC and the memory capacity of the first memory part 1040. Transfer of data from the first memory part 1040 to the second communication terminal 1019 is based on NFC communication. Thus, this data transfer does not need power supply to the first wireless memory device 1005. For instance, on the shop side, only the data of the day is transferred to the first memory part 1040 when the first wireless memory device 1005 is connected to the first communication terminal 1015. Thus, data matched with the specified information can be transmitted to the second communication terminal 1019 by the first NFC controller 1030. Accordingly, a small amount of data can be transferred to the first memory part 1040 in advance. This can operate the memory system even without power supply from the first communication terminal 1015.

Fifth Embodiment

The first wireless memory device 1005 provided with the NFC communication function is not limited to the use for the match-up game system as described above. The first wireless memory device 1005 can be used also for e.g. a touring-type game system such as content rally. The memory system of this embodiment is a game imitating what is called the stamp rally in which the user tours stations placed at different places.

Figure 45:
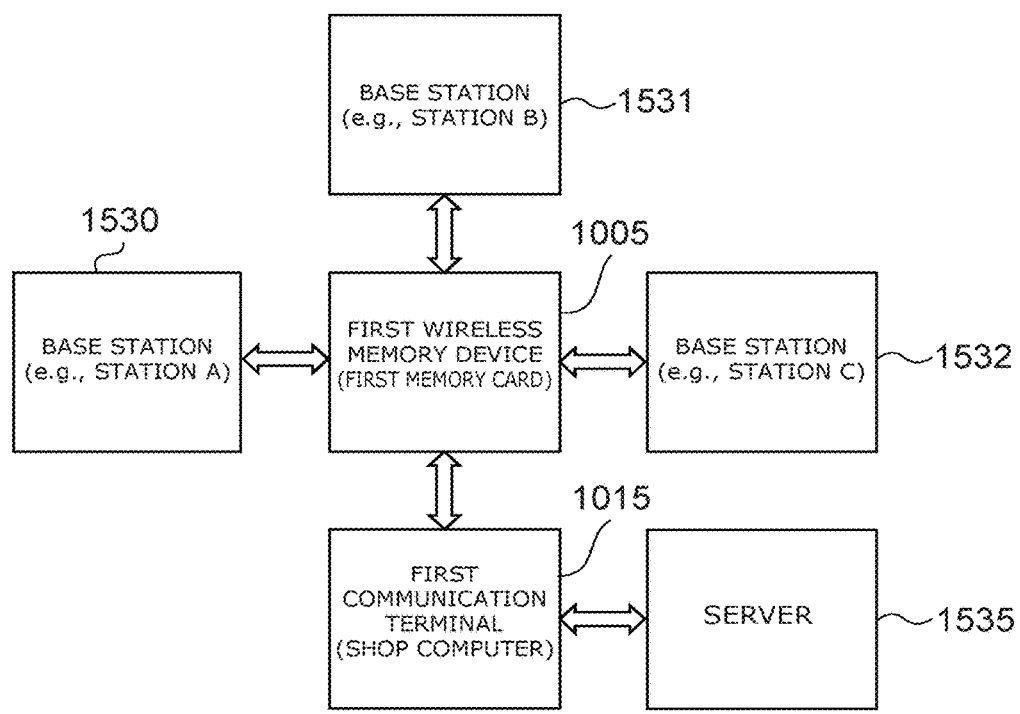
FIG. 45 is a block diagram describing a memory system according to fifth embodiment.

FIG. 45 is a schematic block diagram describing the memory system according to this embodiment and its configuration.

Figure 46:
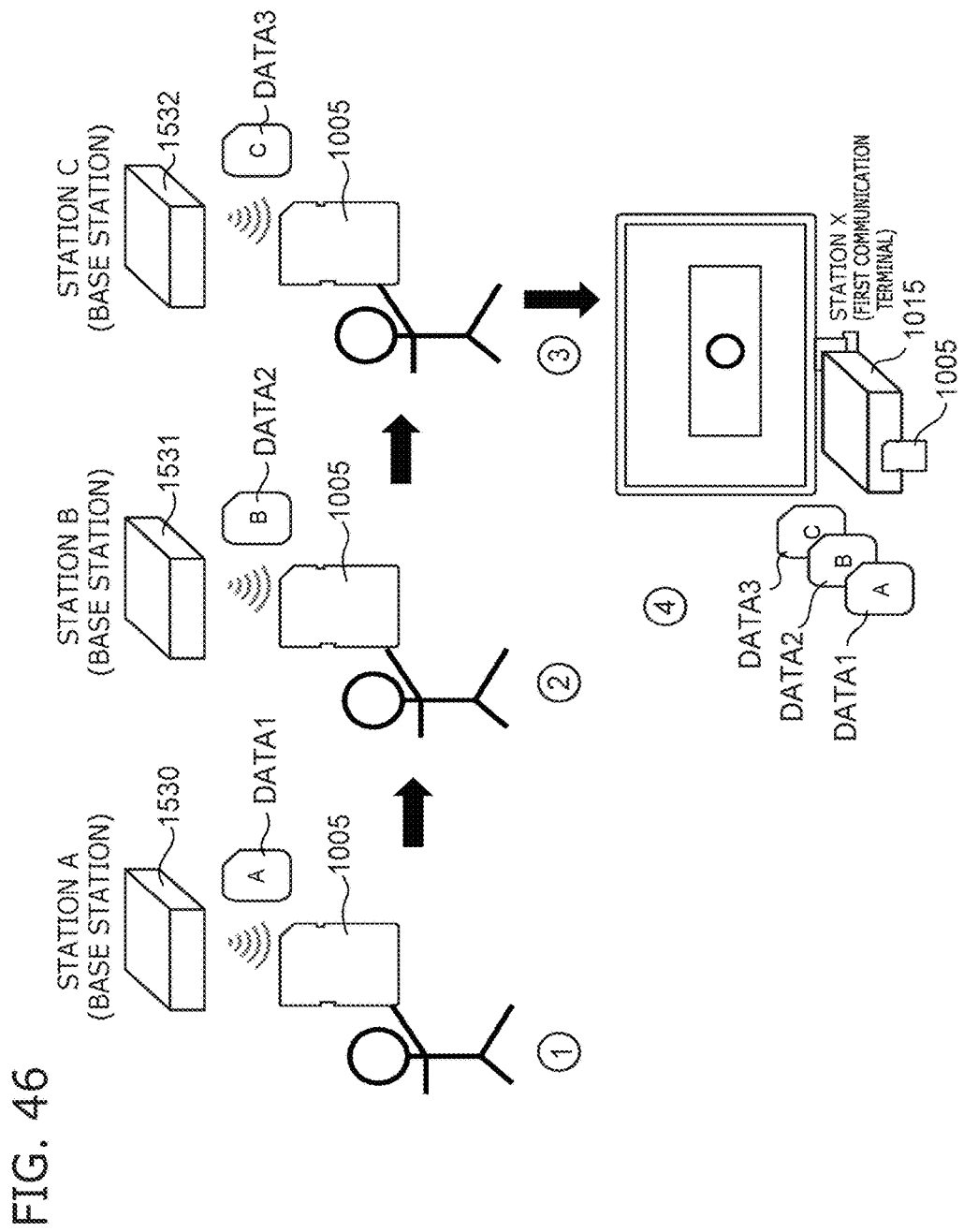
FIG. 46 is a schematic perspective view illustrating a more specific practical example of the memory system according to the fifth embodiment.

FIG. 46 schematically illustrates a more specific practical example of the memory system of this embodiment.

FIG. 47 is a schematic flow chart for describing the operation of the memory system of this embodiment.

FIGS. 48A to 48C are schematic block diagrams for describing the operation of the first wireless memory device of this embodiment.

As shown in FIG. 45, the memory system of this embodiment includes a first wireless memory device 1005. This first wireless memory device 1005 is identical to that described above, and the detailed description thereof is omitted. The first wireless memory device 1005 can be connected to base stations 1530, 1531, 1532. The base stations 1530, 1531, 1532 have the same configuration as the aforementioned base station 1530. The wireless memory device 1005 is sequentially connected to a plurality of base stations 1530, 1531, 1532. The plurality of base stations 1530, 1531, 1532 are a station A, a station B, and a station C placed at different places. The number of base stations is not limited. The number of base stations may be one, two, or four or more. Each base station 1530, 1531, 1532 transmits data to the first wireless memory device 1005 when connected to the first wireless memory device 1005. The type of the data is not limited as long as the size of the data is such that the data can be stored in the first memory part 1040. For instance, the data may be image data, audio data, or text data. The data may be simply data of flag information. The data may be a combination of the foregoing.

The first wireless memory device 1005 can be electrically connected to the first communication terminal 1015 through the connection terminal 1065. The first wireless memory device 1005 receives data from the first communication terminal 1015 when connected to the first communication terminal 1015. The received data is stored in the nonvolatile semiconductor memory 1025 of the first wireless memory device 1005. The type of the data received from the first communication terminal 1015 by the first wireless memory device 1005 is not limited as long as the size of the data is such that the data can be stored in the nonvolatile semiconductor memory 1025. For instance, the data may be image data, audio data, or text data. The data may be simply data of flag information. The data may be a combination of the foregoing.

In this example, the first communication terminal 1015 is connected to the server 1535. The first communication terminal 1015 may be standalone as long as the first communication terminal 1015 has a sufficient memory capacity storable in the first memory part 1040 and can exchange data with the first wireless memory device 1005.

The first communication terminal 1015 is e.g. a computer terminal placed in e.g. a shop. As described later, the first communication terminal 1015 may be combined with each base station 1530, 1531, 1532. That is, the station A can be connected to the first wireless memory device 1005 by NFC communication to exchange data, and can be connected through the connection terminal 1065. In this example, the base stations 1530, 1531, 1532 and the first communication terminal 1015 are configured as separate devices. Each base station 1530, 1531, 1532 may be configured integrally with the first communication terminal 1015. That is, each station of NFC communication may be configured to have an interface for a memory card.

More specifically, as shown in FIG. 46, in this embodiment, instead of a stamp, electronic data is used as a token of the visit. The electronic data is e.g. still image data DATA1, DATA2, DATA3. The plurality of stations each store the still image data DATA1, DATA2, DATA3 of e.g. comic characters. When the user holds the first wireless memory device 1005 such as a memory card over the station, the first wireless memory device 1005 can receive one of the still image data DATA1, DATA2, DATA3 of characters. The user may visit all the stations and obtain the still image data DATA1, DATA2, DATA3 of all the characters. Then, the user can receive data having larger data volume than the still image data DATA1, DATA2, DATA3 of characters, such as video data, by connecting the first wireless memory device 1005 to the first communication terminal 1015. That is, the memory system of this embodiment can configure the following game system. The user collects still image data DATA1, DATA2, DATA3 of characters instead of stamps. A bonus of electronic data is provided to the user having collected all the still image data DATA1, DATA2, DATA3.

More specifically, as shown in FIG. 47, in step S9201, the base station 1530 such as station A transmits a write command. Then, the station A transmits still image data to the first wireless memory device 1005. The still image data DATA1, DATA2, DATA3 are each provided with flag information and transmitted to the first wireless memory device 1005 with the flag information. When the user obtains all the still image data DATA1, DATA2, DATA3, the flag information is all turned on. Then, specific URL data is written to the first memory part 1040.

In step S9202, the still image data DATA1, DATA2, DATA3 and the flag information are written to the first memory part 1040 by the first NFC controller 1030 of the first wireless memory device 1005.

In step S9203, another base station 1531 such as station B checks whether all the data of flag information have been written to the first memory part 1040 of the first wireless memory device 1005. When there is any insufficient flag information, the first wireless memory device 1005 waits for receiving the unreceived data of the still image data DATA1, DATA2, DATA3 from the next base station. This base station 1531 subsequently performs nothing on the first wireless memory device 1005.

When all the contents have been written, in step S9204, the first controller 1033 transmits a specific URL to the first communication terminal 1015. The URL represents where bonus data is stored. The specific URL data may be retained by the first communication terminal 1015 in advance.

In step S9205, the first communication terminal 1015 receives the URL data. In step S9206, the first communication terminal 1015 accesses the transmitted URL to obtain stored bonus data such as image data (or video data) rewarding the completion of contents.

In step S9207, the first controller 1033 of the first wireless memory device 1005 connected to the first communication terminal 1015 through the connection terminal 1065 receives the bonus data.

In step S9208, the first controller 1033 writes the bonus data to the nonvolatile semiconductor memory 1025.

As shown in FIG. 48A, the first wireless memory device 1005 includes the first NFC controller 1030. Thus, the first wireless memory device 1005 can write data to the first memory part 1040 even without power supply from e.g. the first communication terminal 1015. Accordingly, the user can bring the first wireless memory device 1005 among the stations without carrying e.g. driving equipment for driving the first wireless memory device 1005.

As shown in FIG. 48B, the data written to the first memory part 1040 is transferred to the first communication terminal 1015 under the control of the first controller 1033 without the intermediary of writing and reading in the nonvolatile semiconductor memory 1025. The first communication terminal 1015 can perform processing based on the obtained still image data DATA1, DATA2, DATA3 and the like. For instance, the following complex processing can be performed. The content data is obtained in an encrypted form. When all the content data are collected, the encryption can be decrypted.

As shown in FIG. 48C, the first wireless memory device 1005 can store a large volume of data in the nonvolatile semiconductor memory 1025 from the first communication terminal 1015 through the connection terminal 1065.

In the memory system of this embodiment, the volume of data transmitted from the base station 1530 to the first wireless memory device 1005 is small. Thus, data exchange can be realized without power supply using communication through NFC communication. Based on the small volume of data obtained through NFC communication, a large volume of data can be obtained from the first communication terminal 1015 through e.g. a high-speed network and the connection terminal 1065. That is, the small-volume data communication enables large-volume data communication. In the foregoing, the procedure for obtaining data from the base station 1530 and transferring the data to the first communication terminal 1015 can be based on e.g. the fourth operation example described above. In the case of obtaining bonus data, the data may be written to the first memory part 1040 directly through NFC communication. Then, the data can be transferred from the first memory part 1040 to the nonvolatile semiconductor memory 1025 using e.g. a computer terminal retained by the user (second operation example). Alternatively, the bonus data may be written to the first memory part 1040 in advance. When all the content data are collected, reading from the first memory part 1040 may be permitted to allow data transfer to e.g. the nonvolatile semiconductor memory 1025.

In what is called the stamp rally, stamps are affixed to a paper card to compete in the number of collected stamps. However, there is no use of the stamps except appreciating the affixed stamps because the stamps are affixed to a paper card. The stamp rally may aim for competition of whether the number of collected stamps reaches a prescribed number. When the number of stamps reaches the prescribed number, the stamp rally may provide a bonus such as the right to receive a prize in exchange. However, it is necessary to prepare resources for exchanging goods such as securing the place for the stock of prizes and assigning staff for the exchange service.

In contrast, the range of use is expanded in the memory system of this embodiment. For instance, the user can use the obtained electronic data such as still image data to decorate an electronic mail using the user's own computer terminal and smartphone. The user may transmit a copy of the obtained still image data to third parties such as the user's friends. Furthermore, the bonus data is also electronic data. Thus, its use such as modification and transfer is expanded as described above.

On the other hand, there has been a game imitating the stamp rally. For instance, the user tours a plurality of stations with an IC card equipped with the NFC communication function. In this case, the identification information of NFC communication of the IC card is used to update the information of the host connected to the station. When a prescribed number of stations are visited, a prize can be obtained in exchange.

In contrast, in the memory system of this embodiment, the first wireless memory device 1005 includes the first memory part 1040. Thus, the first wireless memory device 1005 can store e.g. the still image data DATA1, DATA2, DATA3 obtained by NFC communication and use them for application such as modification and transfer. This memory system includes the first controller 1033 and the high-capacity nonvolatile semiconductor memory 1025. Thus, a large volume of data different from the still image data DATA1, DATA2, DATA3 can be obtained and stored in the first memory part 1040. Accordingly, the user can obtain bonus data without exchange of e.g. goods.

Sixth Embodiment

As described above with reference to FIGS. 3A and 3B, the first wireless memory device 1005 of this embodiment has a code 1120 such as a two-dimensional matrix code attached to the enclosure surface besides the identification information used in NFC communication. The first wireless memory device 1005 can be identified by selecting one of using the identification information in NFC communication and using the code 1120 attached to the surface.

The identification information for NFC communication is stored in the first memory part 1040 of the first wireless memory device 1005. The code 1120 is also provided with information including the identification information. For instance, the user purchases a memory card being the first wireless memory device 1005 as described above. After purchasing this memory card, the user can obtain the announced winning number of the lot from e.g. a specified URL by the second communication terminal 1019 such as a smartphone. This winning number is associated with the identification information or a portion thereof of NFC communication of one of the memory cards. The user can use the NFC communication function of the smartphone to obtain the identification information of NFC communication of the memory card. Thus, the user can determine whether the identification information is associated with the obtained winning number. Instead of the second communication terminal 1019, NFC communication may be performed with the base station 1530 prepared in e.g. a shop where the first wireless memory device 1005 is purchased. Thus, the identification information may be matched with the winning number. Even if the smartphone is not equipped with the NFC communication function, the identification information for NFC communication can be obtained by shooting the code 1120 using the camera of the smartphone. The presence of a winning number can be found by determining the association between the information of the obtained code 1120 and the winning number.

Furthermore, a memory card having the identification information associated with the winning number may be connected to the first communication terminal 1015 such as a shop computer through the connection terminal 1065. Thus, winning data such as image data can be obtained by step S9204 and the subsequent steps of the fifth embodiment. Alternatively, winning data may be obtained by NFC communication using the base station 1530 instead of the first communication terminal 1015 or using the base station 1530 integrated with the first communication terminal 1015. In the case of using NFC communication, winning data may be obtained directly through NFC communication as in the fifth embodiment.

As described above, the identification information of NFC communication can be matched with the data associated therewith by using one of NFC communication and the code 1120 attached to the enclosure surface of the first wireless memory device 1005. Furthermore, a large volume of data can be transferred between the first communication terminal 1015 and the first wireless memory device 1005 by recognizing the identification information of NFC communication on the first communication terminal 1015 side.

Seventh Embodiment

The memory system of this embodiment can prevent e.g. impersonation by associating the identification information used in NFC communication with the code 1120 attached to the surface.

In NFC communication, data communication may be performed without such processing as encryption. Thus, another malicious person or the like having the same identification information may impersonate the original owner of the first wireless memory device 1005 by using this identification information. The first wireless memory device 1005 of this embodiment has a code 1120 associated with this identification information besides the identification information of NFC communication. Thus, such impersonation can be prevented by authentication using both the identification information and the code 1120.

For instance, the first wireless memory device 1005 is connected by NFC communication to the second communication terminal (second host, smartphone) 1019 to obtain identification information used for NFC communication. The code 1120 is associated with that identification information. It can be determined whether the code 1120 is matched with the identification information of the first wireless memory device 1005 by shooting the code 1120 using the camera of the second communication terminal 1019.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A wireless communication device comprising:
a first interface configured to electrically connect to a first host device, the first interface communicating with the first host device in accordance with an SD (secure digital) interface;
a first memory part including a nonvolatile memory, the nonvolatile memory operating based on power supplied through the first interface from the first host device;
a wireless antenna generating power based on a radio wave from a second host device different from the first host device;
a second memory part configured to operate based on power generated by the wireless antenna; and
a second interface being configured to operate based on power generated by the wireless antenna, and communicating with the second host device in compliance with an NFC (near field communication), wherein
when the first interface is electrically connected from the first host device, the first interface sends a first data read from at least one of the first memory part and the second memory part to the first host device in accordance with a first command sent from the first host device, and the second interface sends a second data read from at least one of the first memory part and the second memory part to the second host device in accordance with a second command received through the wireless antenna from the second host device, and
when the first interface is electrically disconnected from the first host device, the second interface sends a third data read from the second memory part through the wireless antenna to the second host device in accordance with a third command received through the wireless antenna from the second host device.

2. The wireless communication device according to claim 1, further comprising a controller controlling the second memory part, wherein
when the controller receives a fourth command only, the controller communicates with the second host device.

3. The wireless communication device according to claim 2, further comprising a voltage detector detecting a voltage supplied from the wireless antenna to the controller, wherein
when a prescribed voltage is reached, the voltage detector outputs the forth command to the controller.

4. The wireless communication device according to claim 3, wherein
the voltage detector outputs a fifth command to the controller until reaching the prescribed voltage.

5. The wireless communication device according to claim 1, wherein
the first host device and the second host device communicate with each other through the wireless communication device.

6. The wireless communication device according to claim 5, further comprising a connection terminal, wherein
the wireless communication device communicates with the first host device through the connection terminal, and the wireless communication device communicates with the second host through the wireless antenna.

* * * * *